United States Patent
Dellinger et al.

(10) Patent No.: US 11,269,483 B2
(45) Date of Patent: Mar. 8, 2022

(54) DEVICE, METHOD, AND GRAPHICAL USER INTERFACE FOR MANAGING CONTENT ITEMS AND ASSOCIATED METADATA

(71) Applicant: Apple Inc., Cupertino, CA (US)

(72) Inventors: Richard R. Dellinger, San Jose, CA (US); Raymond S. Sepulveda, Campbell, CA (US); Chun Kin Minor Wong, San Jose, CA (US)

(73) Assignee: APPLE INC., Cupertino, CA (US)

( * ) Notice: Subject to any disclaimer, the term of this patent is extended or adjusted under 35 U.S.C. 154(b) by 257 days.

(21) Appl. No.: 15/978,121

(22) Filed: May 12, 2018

(65) Prior Publication Data

US 2018/0373415 A1  Dec. 27, 2018

Related U.S. Application Data

(60) Provisional application No. 62/506,687, filed on May 16, 2017.

(51) Int. Cl.
| | | |
|---|---|---|
| *G06F 3/0481* | (2013.01) | |
| *G06F 3/0486* | (2013.01) | |
| *G06F 3/0485* | (2013.01) | |
| *G06F 3/0482* | (2013.01) | |
| *G06F 3/0488* | (2013.01) | |
| *G06F 3/0484* | (2013.01) | |
| *G06F 3/04817* | (2022.01) | |
| *G06F 3/04842* | (2022.01) | |

(52) U.S. Cl.
CPC ........ *G06F 3/04817* (2013.01); *G06F 3/0482* (2013.01); *G06F 3/0485* (2013.01); *G06F 3/0486* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 8,126,863 B2 * | 2/2012 | Williams | G06F 16/3323 707/705 |
| 9,489,119 B1 * | 11/2016 | Smith, Jr. | G06F 40/117 |
| 2004/0001093 A1 * | 1/2004 | Sellers | G06F 40/103 715/766 |
| 2005/0251748 A1 * | 11/2005 | Gusmorino | G06F 3/0481 715/713 |

(Continued)

OTHER PUBLICATIONS

Cagliero, L., et al., "Personalized Tag Recommendation Based on Generalized Rules", ACM Transactions on Intelligent Systems and Technology, Jan. 2014 Article No. 12 https://doi.org/10.1145/2542182. 2542194 (Year: 2014).*

*Primary Examiner* — James T Tsai
(74) *Attorney, Agent, or Firm* — Fernando & Partners, LLP

(57) ABSTRACT

An electronic device: detects, via one or more input devices, a first input that corresponds to selection of a transport affordance while displaying a content item; and, in response to detecting the selection of the transport affordance, displays, on a display, a transport interface provided to perform one or more operations on the content item, including: a tag modification affordance provided to modify tags associated with the content item; and one or more transport option affordances associated with different selectable options for performing the one or more operations on the content item.

20 Claims, 61 Drawing Sheets

(56) References Cited

U.S. PATENT DOCUMENTS

| | | | |
|---|---|---|---|
| 2008/0065995 A1* | 3/2008 | Bell | G06F 40/117 |
| | | | 715/751 |
| 2011/0078600 A1* | 3/2011 | Guertler | G06F 9/451 |
| | | | 715/765 |
| 2013/0132876 A1* | 5/2013 | Kobayashi | G06F 3/0486 |
| | | | 715/769 |
| 2014/0129981 A1* | 5/2014 | Soderberg | G06F 16/58 |
| | | | 715/810 |
| 2014/0359505 A1* | 12/2014 | Cisler | G06F 16/144 |
| | | | 715/769 |
| 2015/0020091 A1* | 1/2015 | Roberts | H04N 21/47214 |
| | | | 725/28 |
| 2015/0293983 A1* | 10/2015 | Bastide | G06F 16/24578 |
| | | | 707/751 |
| 2016/0062557 A1* | 3/2016 | Kim | G06F 3/0482 |
| | | | 715/748 |
| 2016/0140125 A1* | 5/2016 | Goyal | G06N 20/00 |
| | | | 707/751 |
| 2016/0260130 A1* | 9/2016 | Chand | G06F 16/5854 |
| 2016/0261532 A1* | 9/2016 | Garbin | H04W 12/02 |
| 2016/0380990 A1* | 12/2016 | Jarroush | G06F 16/93 |
| | | | 726/5 |
| 2018/0052589 A1* | 2/2018 | Forman | A61F 9/007 |
| 2018/0095653 A1* | 4/2018 | Hasek | G06F 1/1626 |
| 2018/0225025 A1* | 8/2018 | Rahnama | G06F 3/0482 |
| 2019/0096439 A1* | 3/2019 | Brouwer | H04N 21/4725 |

\* cited by examiner

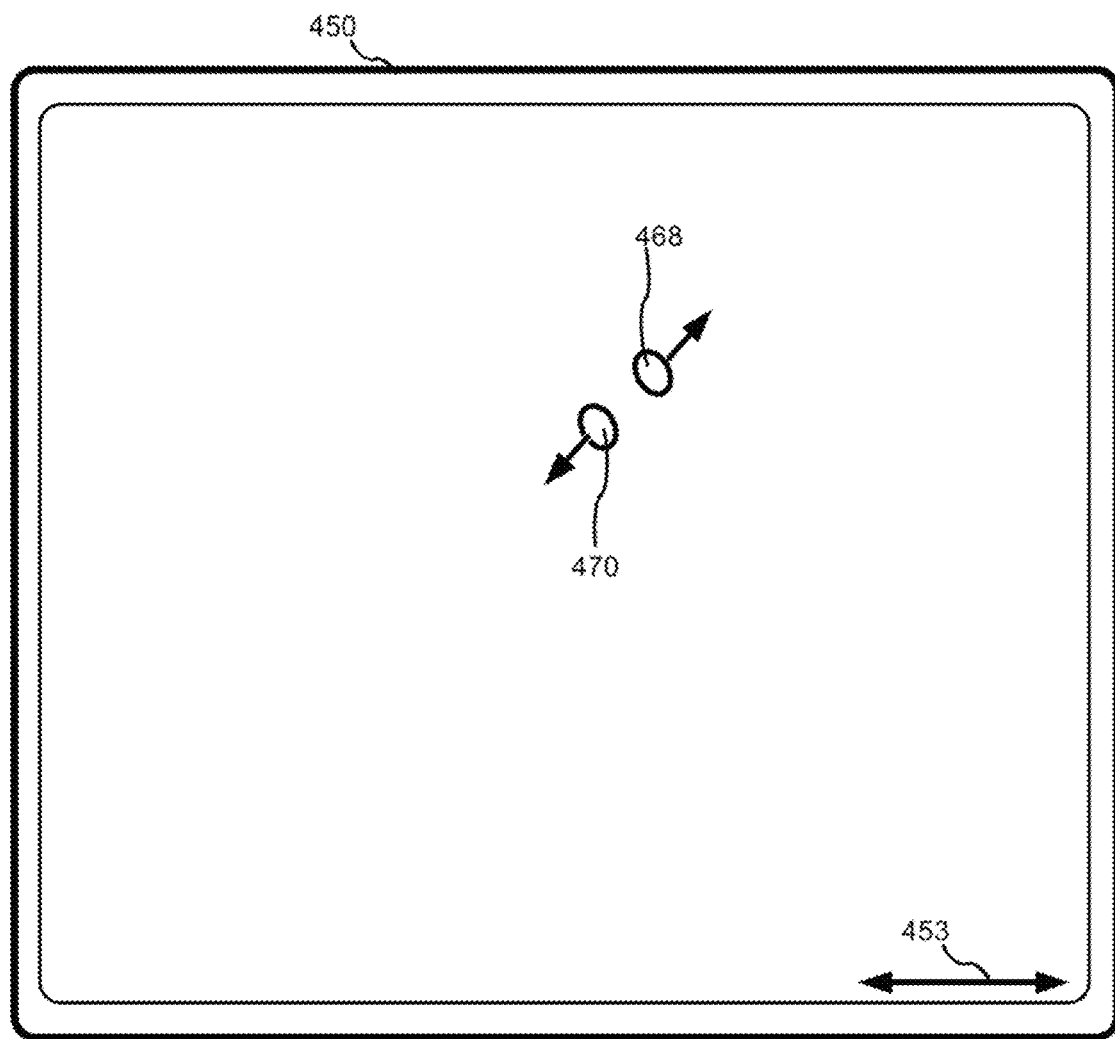
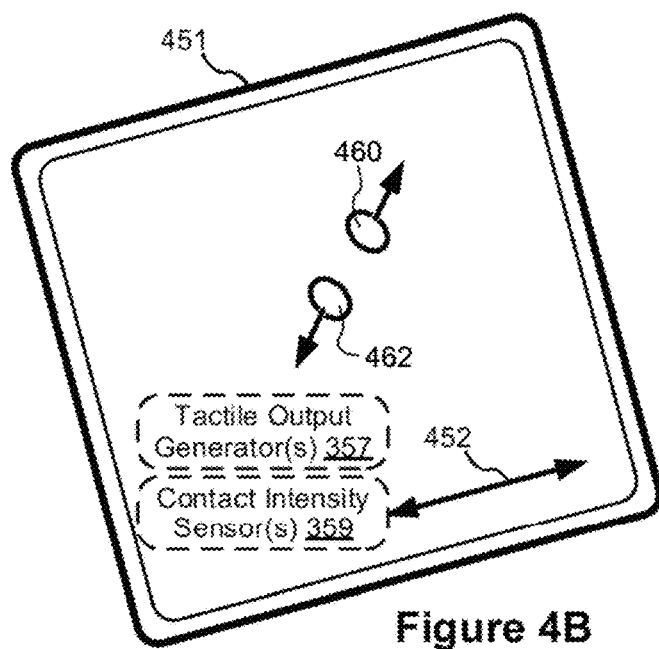
Figure 4B

800

802 — At a device with one or more processors, non-transitory memory, a display, and one or more input devices:

While displaying a content item, detect, via the one or more input devices, a first input that corresponds to selection of a transport affordance

804 — In response to detecting the selection of the transport affordance, display, on the display, a transport interface provided to perform one or more operations on the content item, including:

A tag modification affordance provided to modify tags associated with the content item; and One or more transport option affordances associated with different selectable options for performing the one or more operations on the content item

806 — The transport interface includes an indication of one or more nearby users with which the content item can be shared

808 — The transport interface includes an indication of one or more selectable tags currently associated with the content item

810 — Displaying the transport interface that includes the indication of one or more selectable tags currently associated with the content item includes:

In accordance with a determination that a dimension of the indication of the one or more selectable tags currently associated with the content item satisfies a predefined dimensional constraint of the transport interface, displaying the indication of the one or more selectable tags currently associated with the content item includes displaying expanded representations of the one or more selectable tags currently associated with the content item, and In accordance with a determination that the dimension of the indication of the one or more selectable tags currently associated with the content item does not satisfy the predefined dimensional constraint of the transport interface, displaying the indication of the one or more selectable tags currently associated with the content item includes displaying collapsed representations of the one or more selectable tags currently associated with the content items

Figure 8A

```
┌─────────────────────────────────────────────────────────────────┐──824
│    Detect, via the one or more input devices, a sequence of one or more inputs │
│ that corresponds to inputting a string of one or more characters for a new tag within │
│ the user-modifiable tag creation field and completing the string for the new tag; and │
│                                                                 │
│    In response to detecting completion of the string of one or more characters │
│ for the new tag:                                                │
│                                                                 │
│       Associate the new tag with the content item; and          │
│                                                                 │
│       Display, on the display, the new tag among the one or more │
│ selectable tags currently associated with the content item      │
└─────────────────────────────────────────────────────────────────┘
```

```
┌─────────────────────────────────────────────────────────────────┐──826
│    Detect, via the one or more input devices, a fourth input that corresponds to │
│ selection of a respective tag among the one or more selectable tags currently │
│ associated with the content item; and                           │
│                                                                 │
│    In response to detecting the selection of the respective tag, displaying, on │
│ the display, an option menu that includes a first affordance provided to dissociate │
│ the respective tag with the content item when selected and a second affordance │
│ provided to display representations of one or more content items associated with │
│ respective tag, where the one or more content items include the content item │
└─────────────────────────────────────────────────────────────────┘
```

```
┌─────────────────────────────────────────────────────────────────┐──828
│    Detect, via the one or more input devices, a fifth input that corresponds to │
│ selection of a respective transport option affordance among the one or more │
│ transport option affordances; and                               │
│                                                                 │
│    In response to detecting the selection of the respective transport option │
│ affordance:                                                     │
│                                                                 │
│       In accordance with a determination that the respective transport │
│ option affordance corresponds to sharing the content item via a first application, │
│ cause the content item to be shared via the first application; and │
│                                                                 │
│       In accordance with a determination that the respective transport │
│ option affordance corresponds to sharing the content item via a second application │
│ different from the first application, cause the content item to be shared via the │
│ second application                                              │
└─────────────────────────────────────────────────────────────────┘
```

Figure 8C

928 — Detect, via the one or more input devices, a fourth input that corresponds to navigating within the collaboration interface; and In response to detecting the fourth input:

In accordance with a determination that the fourth input corresponds to a first input type, scroll a portion of at least one of the recent-items region or the collaborative-items region substantially horizontally; and In accordance with a determination that the fourth input corresponds to a second input type, scroll a portion of the collaboration interface substantially vertically

930 — Detect, via the one or more input devices, a fifth input that corresponds to selection of a respective representation from among the plurality of representations in the recent-items region or the plurality of representations in the collaborative-items region; and In response to detecting the selection of the respective representation and in accordance with a determination that the fifth input satisfies a content preview criterion, display, on the display, a preview of a content item associated with the respective representation 932 — In response to detecting the selection of the respective representation and in accordance with a determination that the fifth input satisfies an application launch criterion:

Launch an application that corresponds to the content item associated with the respective representation; and Replace display of the collaboration interface with an interface associated with the application that includes the content item associated with the respective representation

Figure 9D

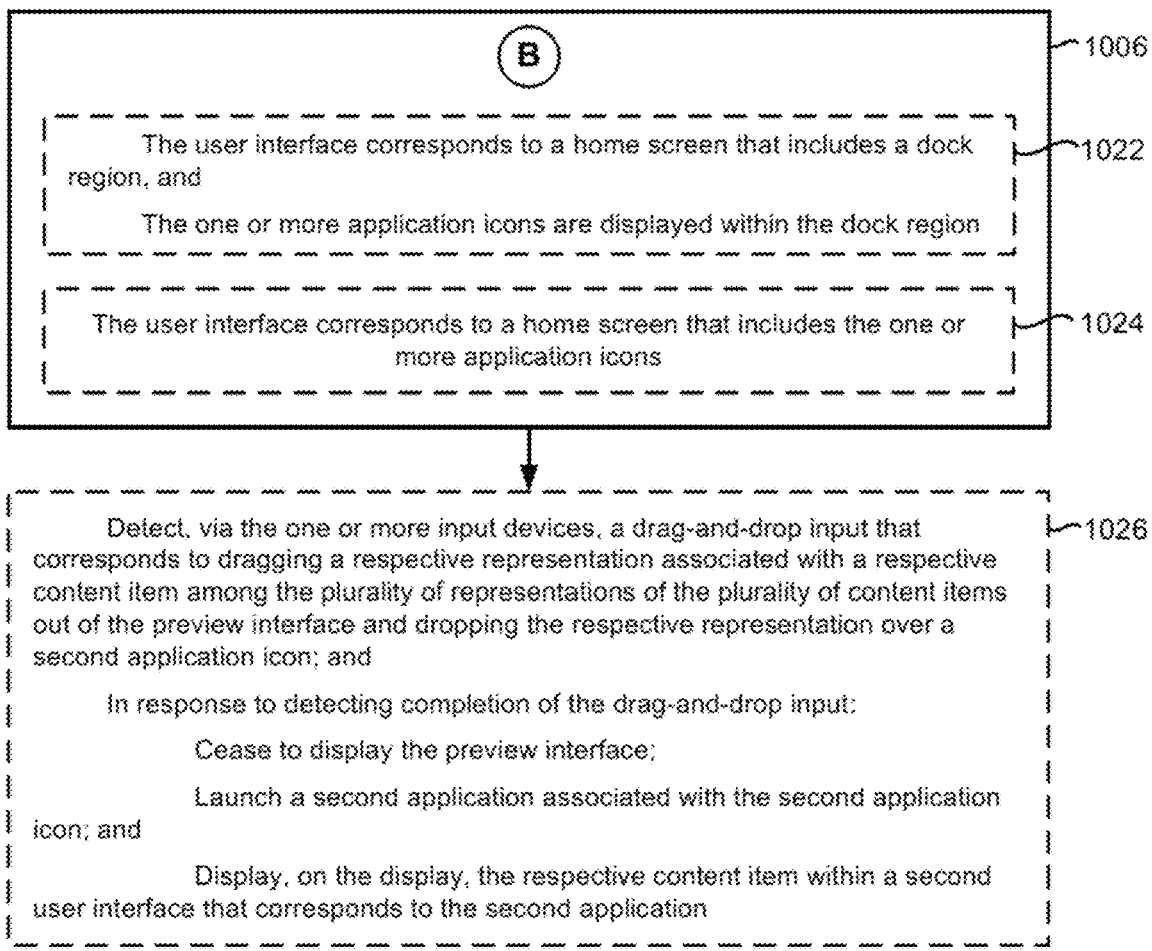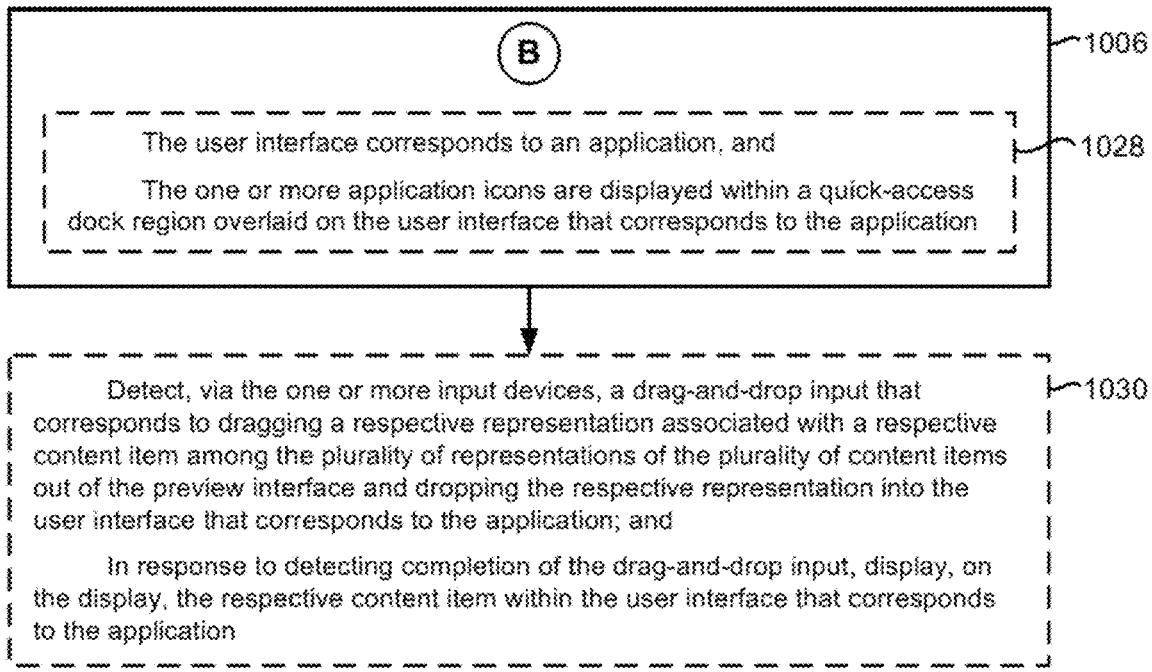
Figure 10C

DEVICE, METHOD, AND GRAPHICAL USER INTERFACE FOR MANAGING CONTENT ITEMS AND ASSOCIATED METADATA

RELATED APPLICATION

This application claims priority to U.S. Provisional Patent Application No. 62/506,687, filed on May 16, 2017, entitled "Device, Method, and Graphical User Interface for Managing Content Items and Associated Metadata," the entire contents of which are incorporated herein by reference.

TECHNICAL FIELD

This relates generally to electronic devices with touch-sensitive surfaces, including but not limited to electronic devices with touch-sensitive surfaces that enable the management of content items and associated metadata.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for managing content items and associated metadata. Such methods and interfaces optionally complement or replace conventional methods for managing content items and associated metadata. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and one or more input devices. The method includes detecting, via the one or more input devices, a first input that corresponds to selection of a transport affordance while displaying a content item. The method also includes, in response to detecting the selection of the transport affordance, displaying, on the display, a transport interface provided to perform one or more operations on the content item, including: a tag modification affordance provided to modify tags associated with the content item; and one or more transport option affordances associated with different selectable options for performing the one or more operations on the content item.

In accordance with some embodiments, a method is performed at a device with one or more processors, non-transitory memory, a display, and one or more input devices. The method includes: detecting, via the one or more input devices, a first input that corresponds to selection of a collaboration affordance; and, in response to detecting the selection of the collaboration affordance, displaying, on the display, a collaboration interface, including concurrently displaying: a recent-items region that includes a plurality of representations of a plurality of recently modified content items that includes one or more content items that are not jointly accessible by other users; and a collaborative-items region that includes a plurality of representations of a plurality of jointly accessible content items that are jointly accessible by the other users.

In accordance with some embodiments, a method is performed at a device with one or more processors, non-transitory memory, a display, and one or more input devices. The method includes: displaying, on the display, a user interface that includes one or more application icons; and, while displaying the user interface, detecting, via the one or more input devices, a first input that corresponds to selection of a respective application icon among the one or more application icons. In response to detecting the selection of the respective application icon, and in accordance with a determination that the first input satisfies an application launch criterion, the method includes launching an application associated with the respective application icon. In response to detecting the selection of the respective application icon, and in accordance with a determination that the first input satisfies a content preview criterion, the method includes displaying, on the display, a preview interface without launching the application, where the preview interface includes: a plurality of representations of a plurality of content items corresponding to the application associated with the respective application icon; and a plurality of representations of a plurality of tags corresponding to the application associated with the respective application icon.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for managing content items and associated metadata, thereby increasing the effectiveness, efficiency, and user satisfaction with such devices. Such methods and interfaces may complement or replace conventional methods for managing content items and associated metadata.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 8A-8C illustrate a flow diagram of a method of managing tags from a transport interface in accordance with some embodiments.

FIGS. 9A-9D illustrate a flow diagram of a method of jointly accessible content items within a collaboration interface in accordance with some embodiments.

FIGS. 10A-10C illustrate a flow diagram of a method of previewing content items and tags associated with an application in accordance with some embodiments.

DESCRIPTION OF EMBODIMENTS

Some applications and/or operating systems enable users to organize files and/or documents according to organizational indicators. However, these existing capabilities are often limited to file browser applications. Accordingly, in embodiments described below, a transport interface includes regions and/or affordances provided to quickly view and/or modify tags for an associated content item in order to provide a more seamless and intuitive user experience. In turn, this also reduces power usage and improves battery life of the device by enabling the user to use the device more quickly and efficiently.

Some document management applications allow users to collaborate on documents. However, these existing document management applications often lack contextual information and/or visibility into other content items. Accordingly, in embodiments described below, in order to provide a more seamless and intuitive user experience when collaborating on content items, a collaboration interface includes: a recent-items region that includes a plurality of representations of a plurality of recently modified content items that includes one or more content items that are not jointly accessible by other users; and a collaborative-items region that includes a plurality of representations of a plurality of jointly accessible content items that are jointly accessible by the other users. This also reduces power usage and improves battery life of the device by enabling the user to use the device more quickly and efficiently.

Typically, when a user selects an application icon, an application associated with the application icon is launched. Alternatively, in some existing operating systems, when a user hovers over an application icon, a preview of open windows for the application associated with the application icon is shown. However, these existing capabilities lack contextual information and/or visibility into content items for the application associated with the application icon. Accordingly, in embodiments described below, after selecting an application icon, a preview interface is displayed without launching the application, where the preview interface includes: a plurality of representations of a plurality of content items corresponding to the application associated with the respective application icon; and a plurality of representations of a plurality of tags corresponding to the application associated with the respective application icon. In turn, the preview interface provides a more seamless and intuitive user experience with additional contextual information. This also reduces power usage and improves battery life of the device by enabling the user to use the device more quickly and efficiently.

Figure 7A:
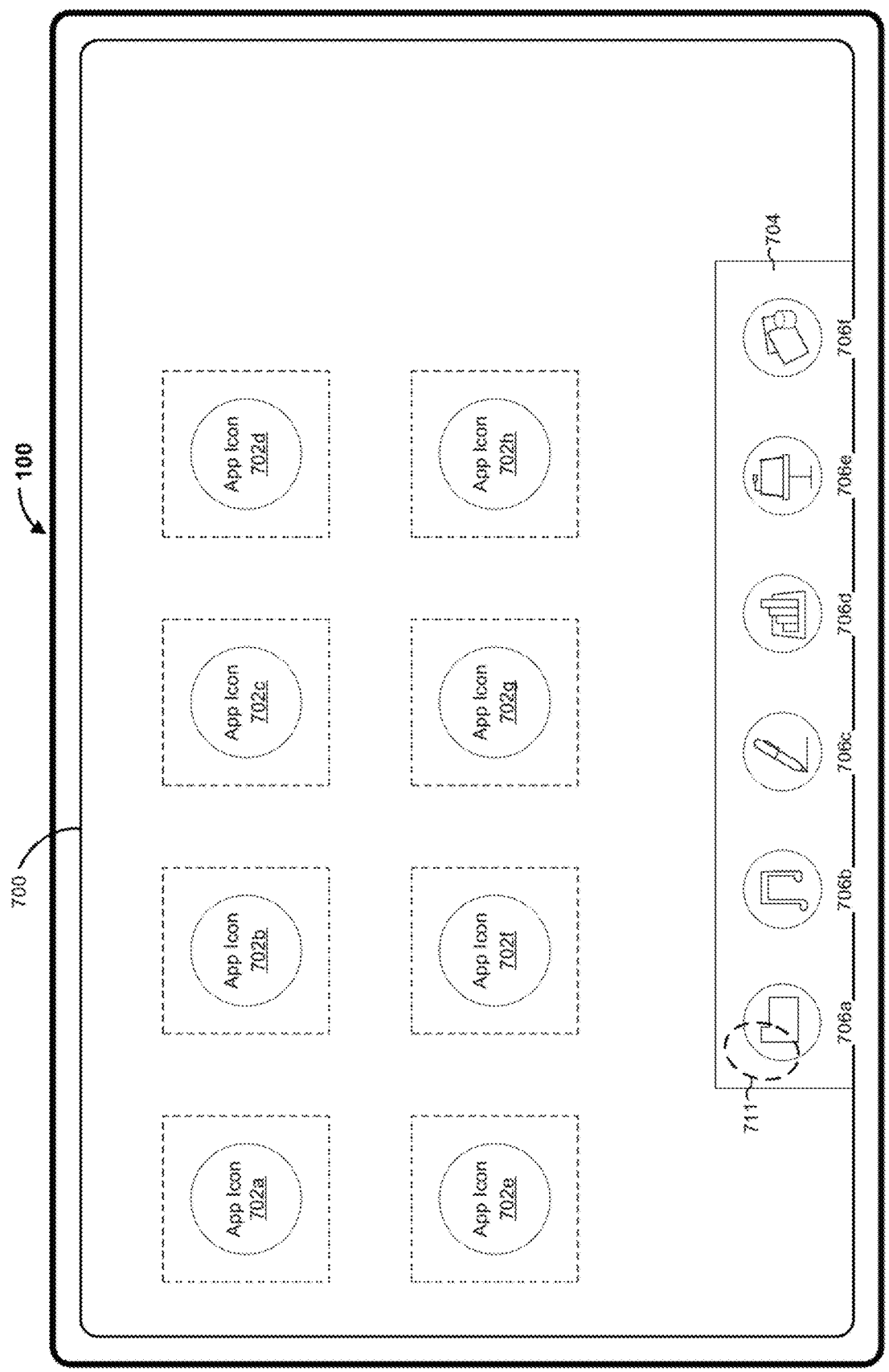
FIGS. 7A-7P illustrate example user interfaces for previewing content items and tags associated with application in accordance with some embodiments.
Figure 7P:
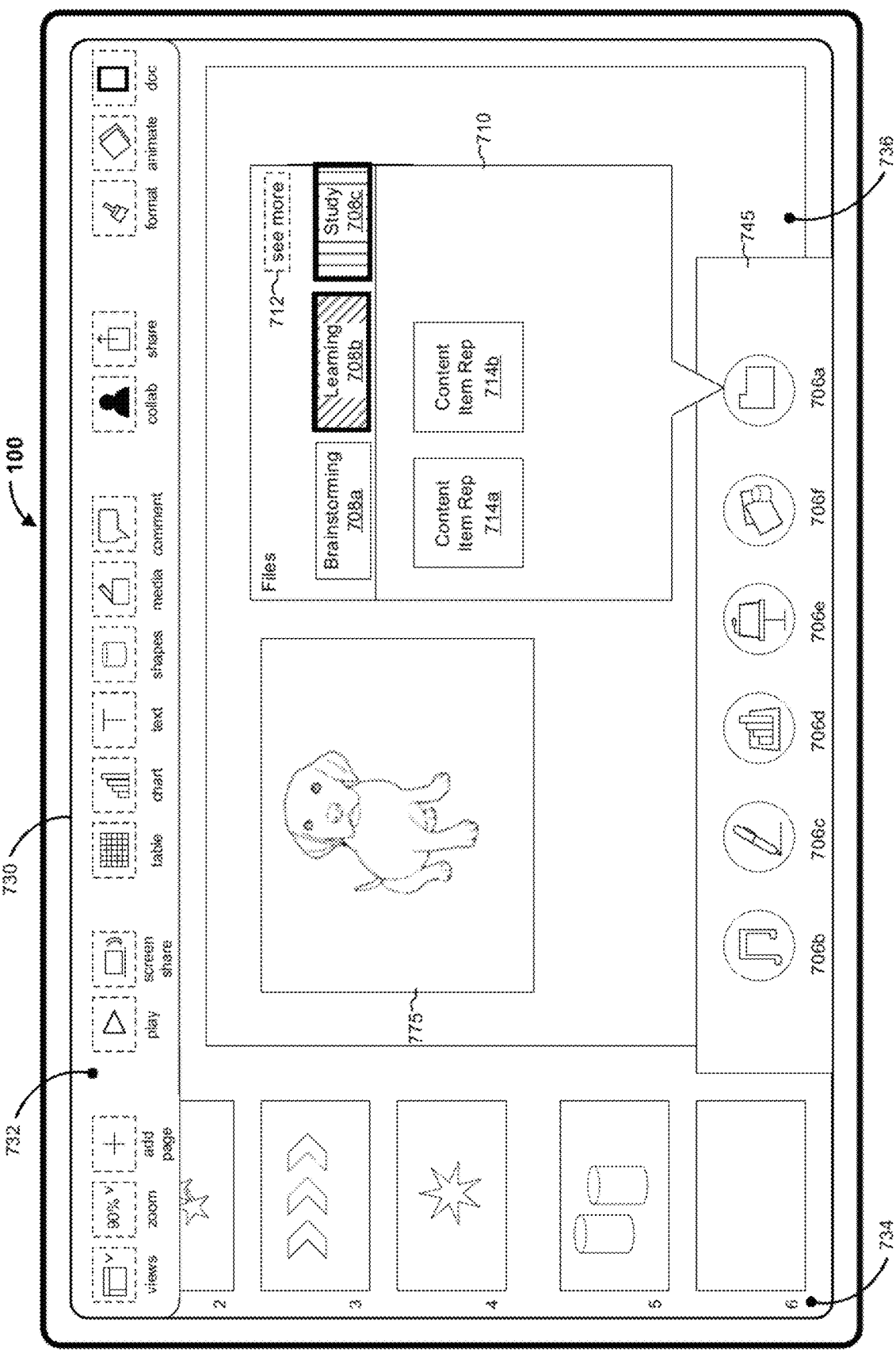
Figure 8B:
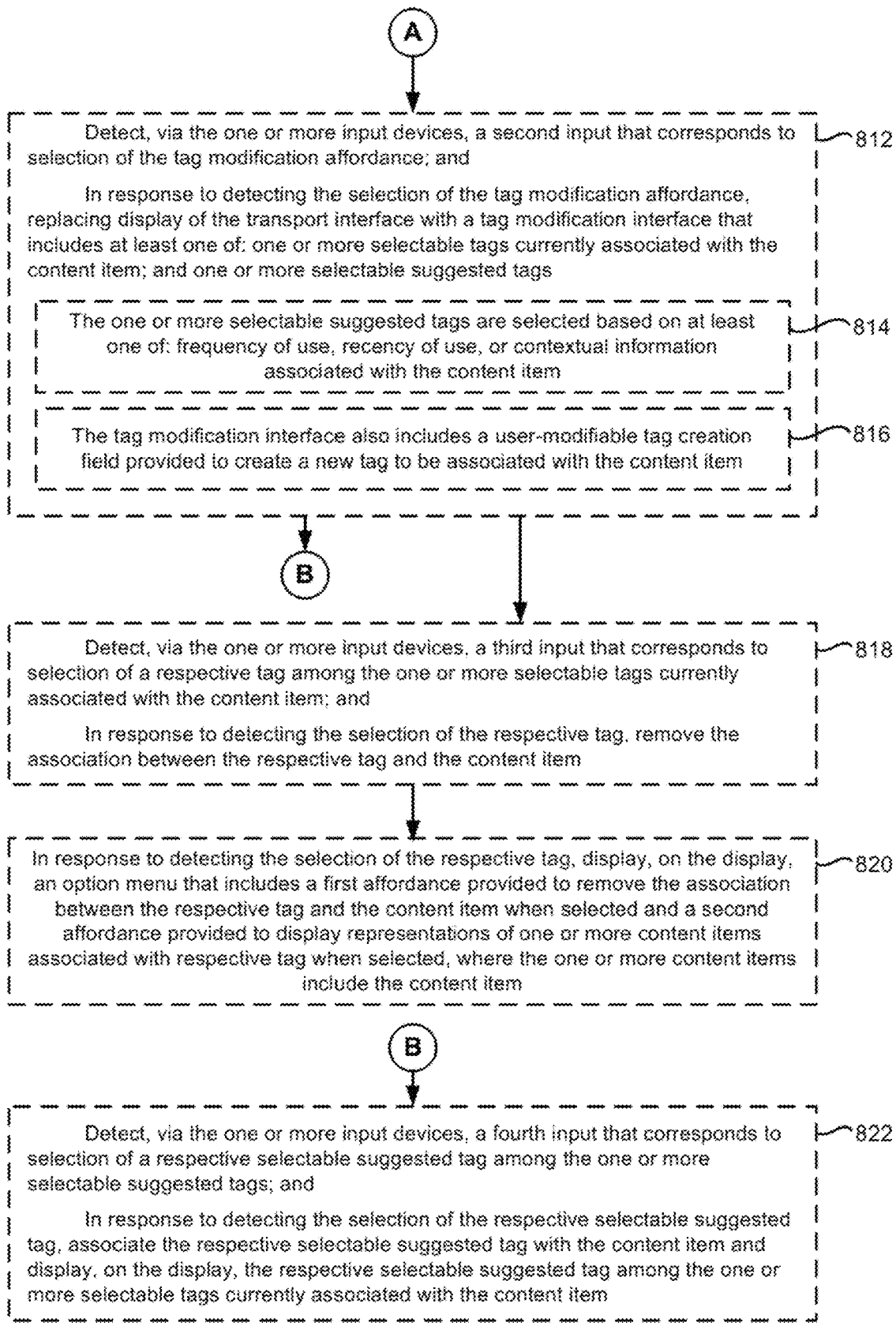
Figure 9A:
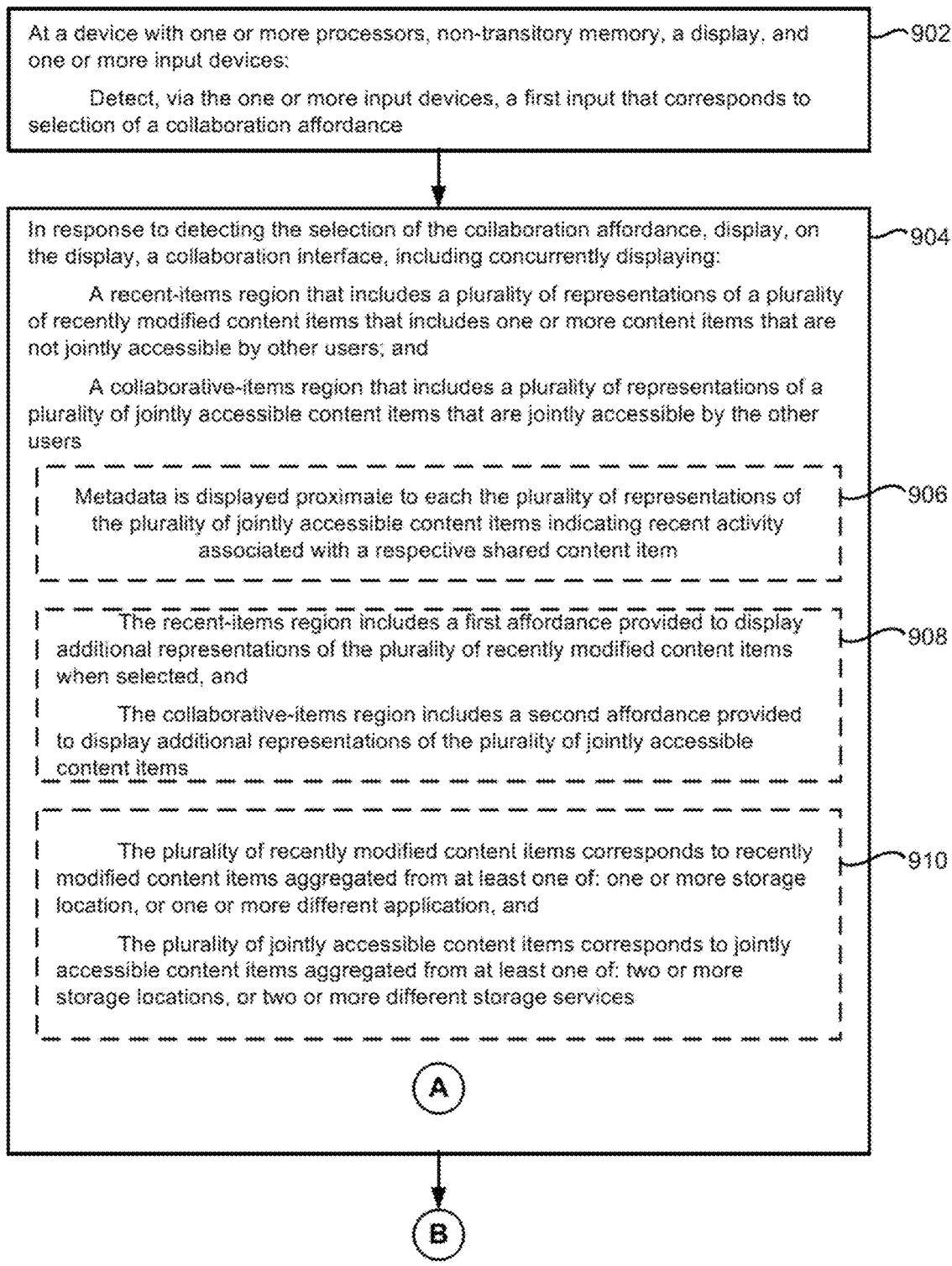
Figure 9B:
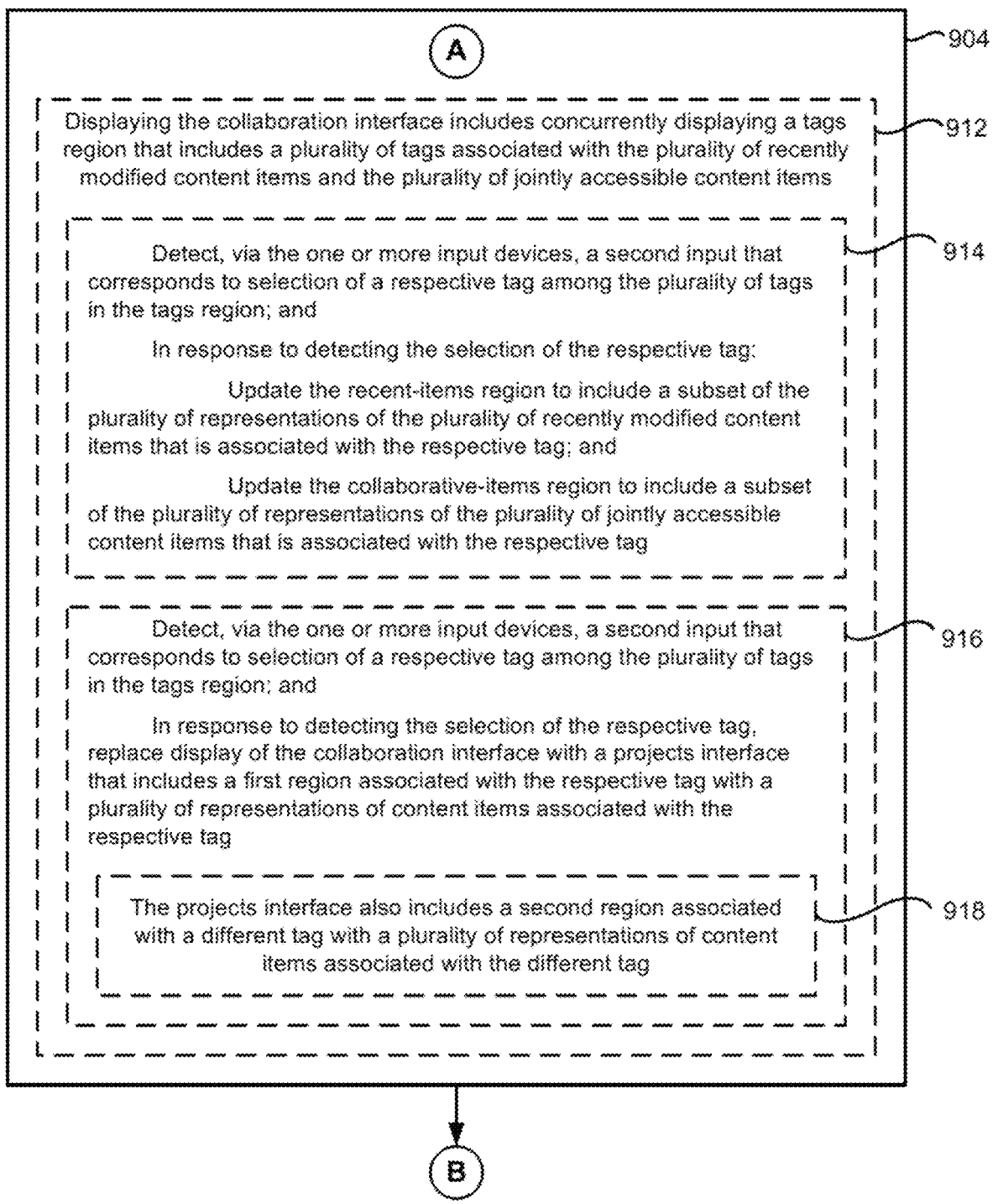
Figure 9C:
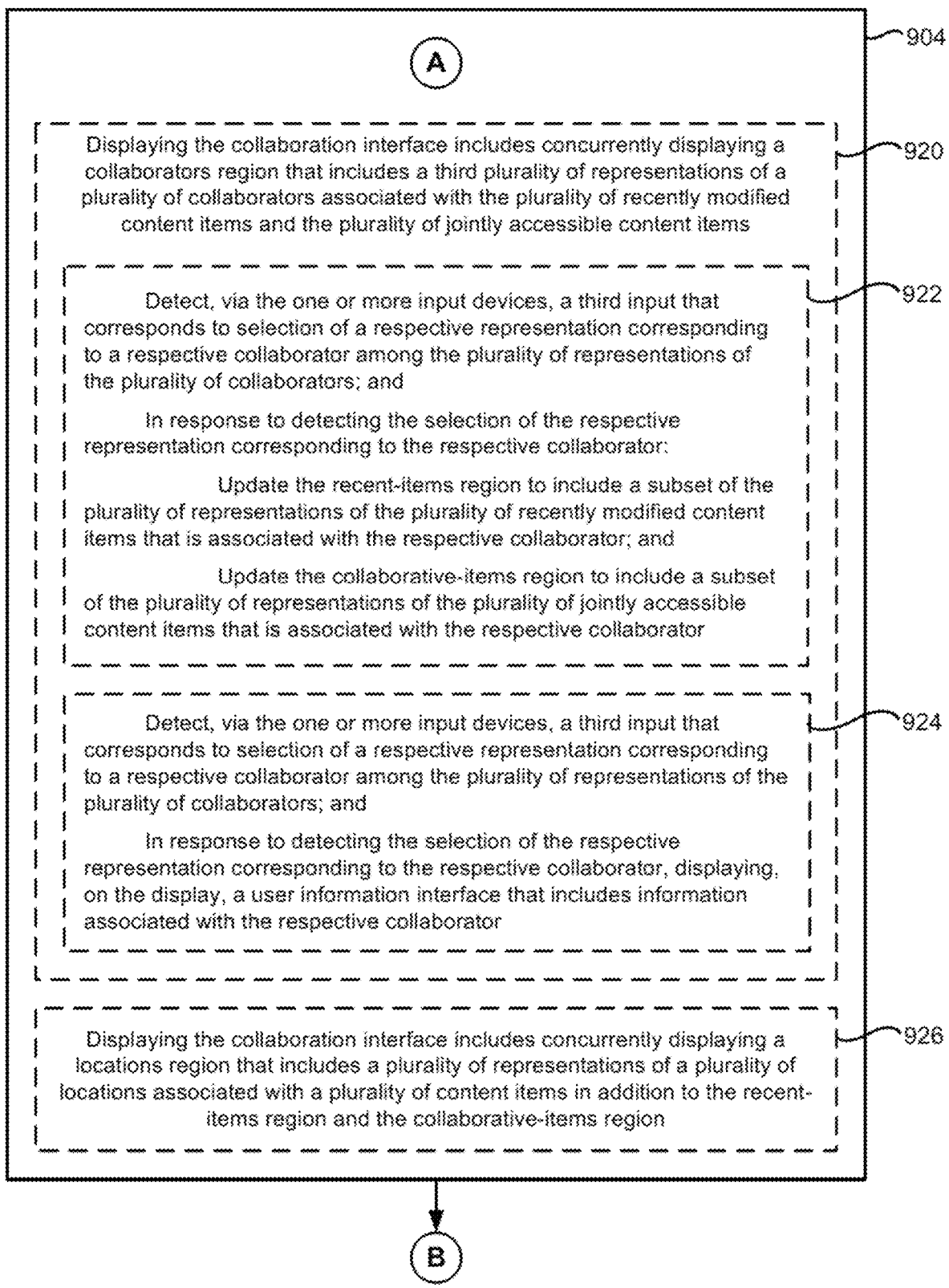
Figure 10A:
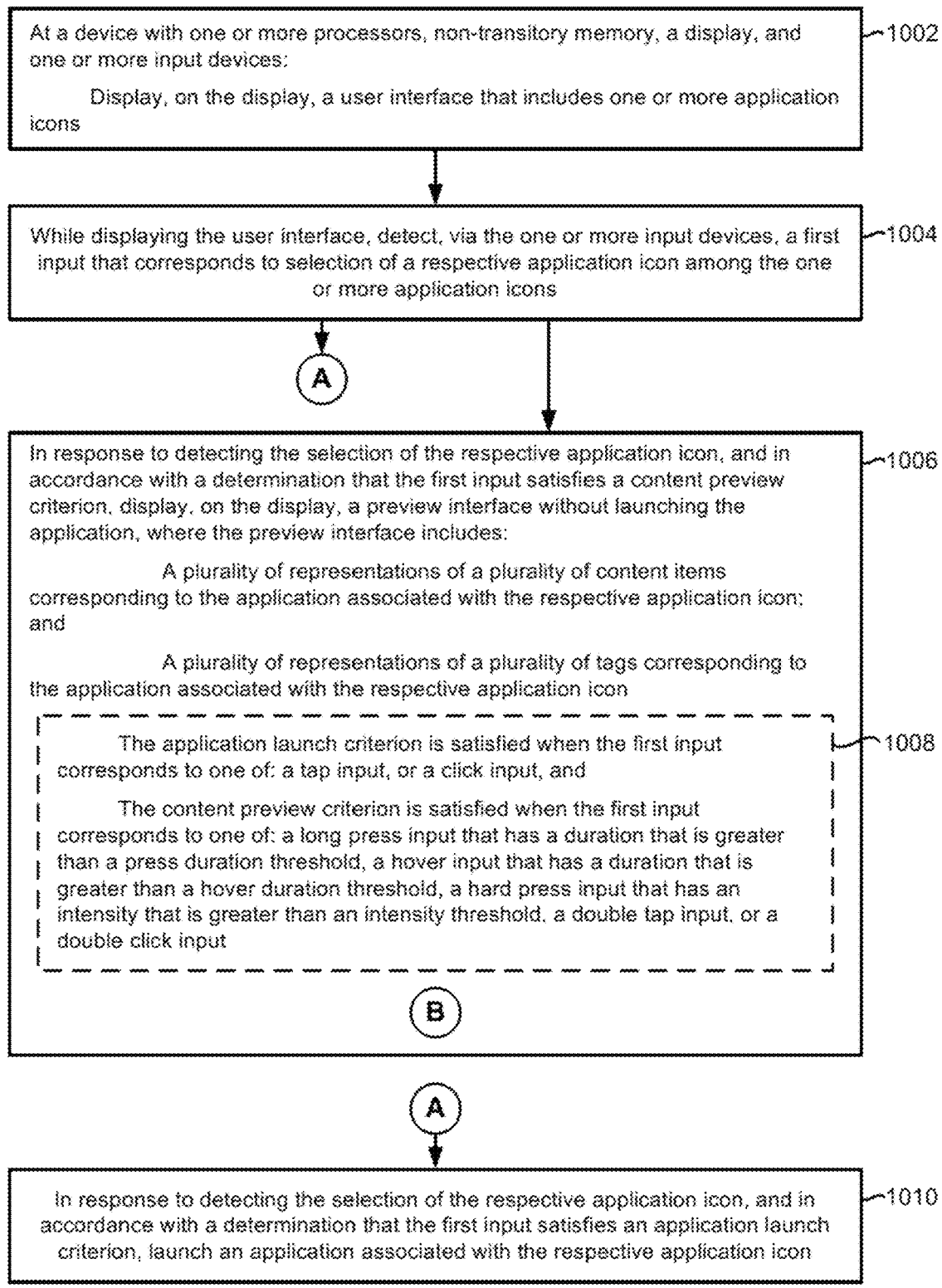
Figure 10B:
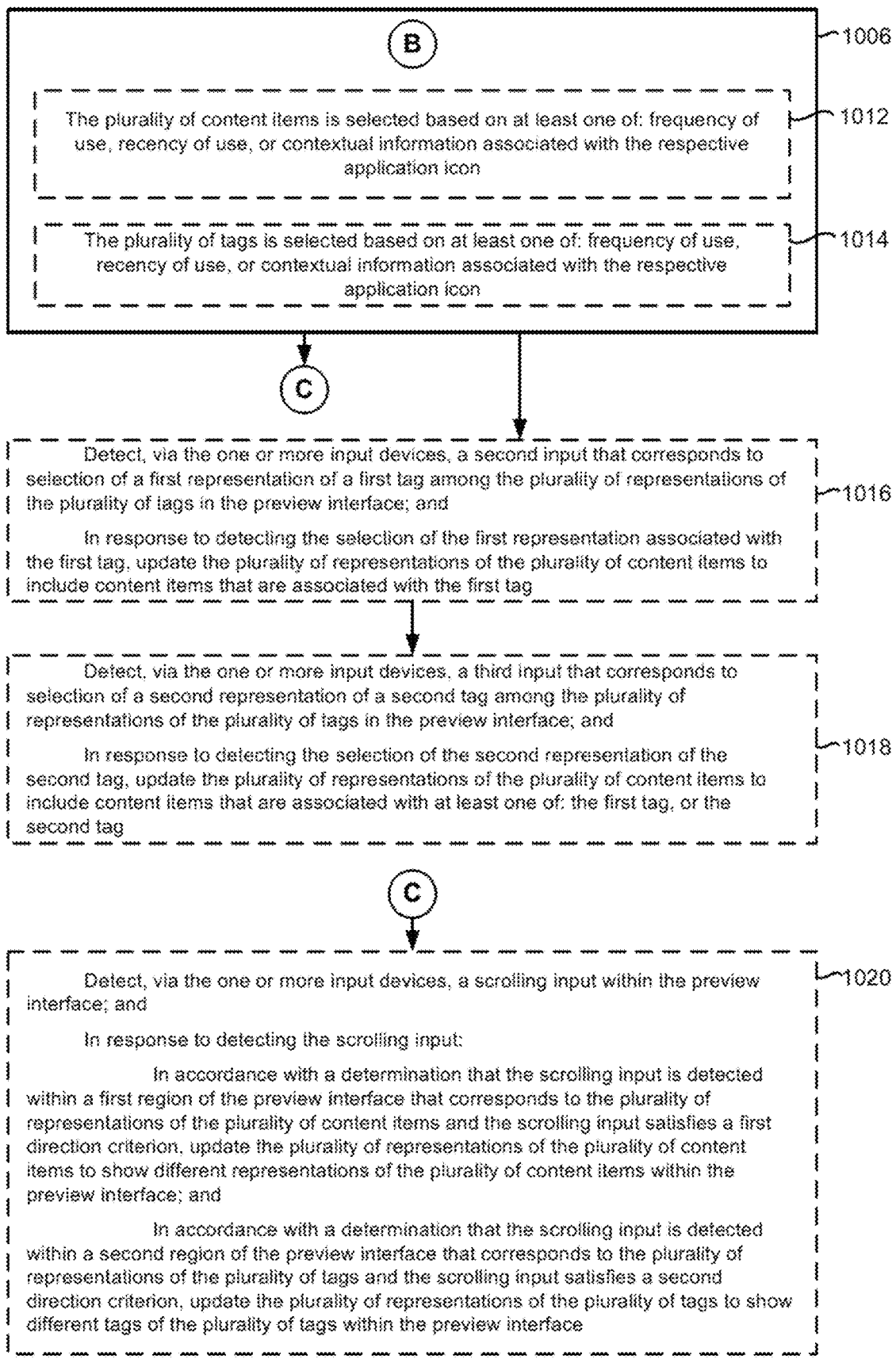

Below, FIGS. 1A-1B, 2-3, and 4A-4B provide a description of example devices. FIGS. 8A-8C illustrate a flow diagram of a method of managing tags from a transport interface. The user interfaces in FIGS. 5A-5H and FIGS. 6A-6G are used to illustrate the process in FIGS. 8A-8C. FIGS. 9A-9D illustrate a flow diagram of a method of jointly accessible content items within a collaboration interface. The user interfaces in FIGS. 6H-6U are used to illustrate the process in 9A-9D. FIGS. 10A-10C illustrate a flow diagram of a method of previewing content items and tags associated with an application. The user interfaces in FIGS. 7A-7P are used to illustrate the process in 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
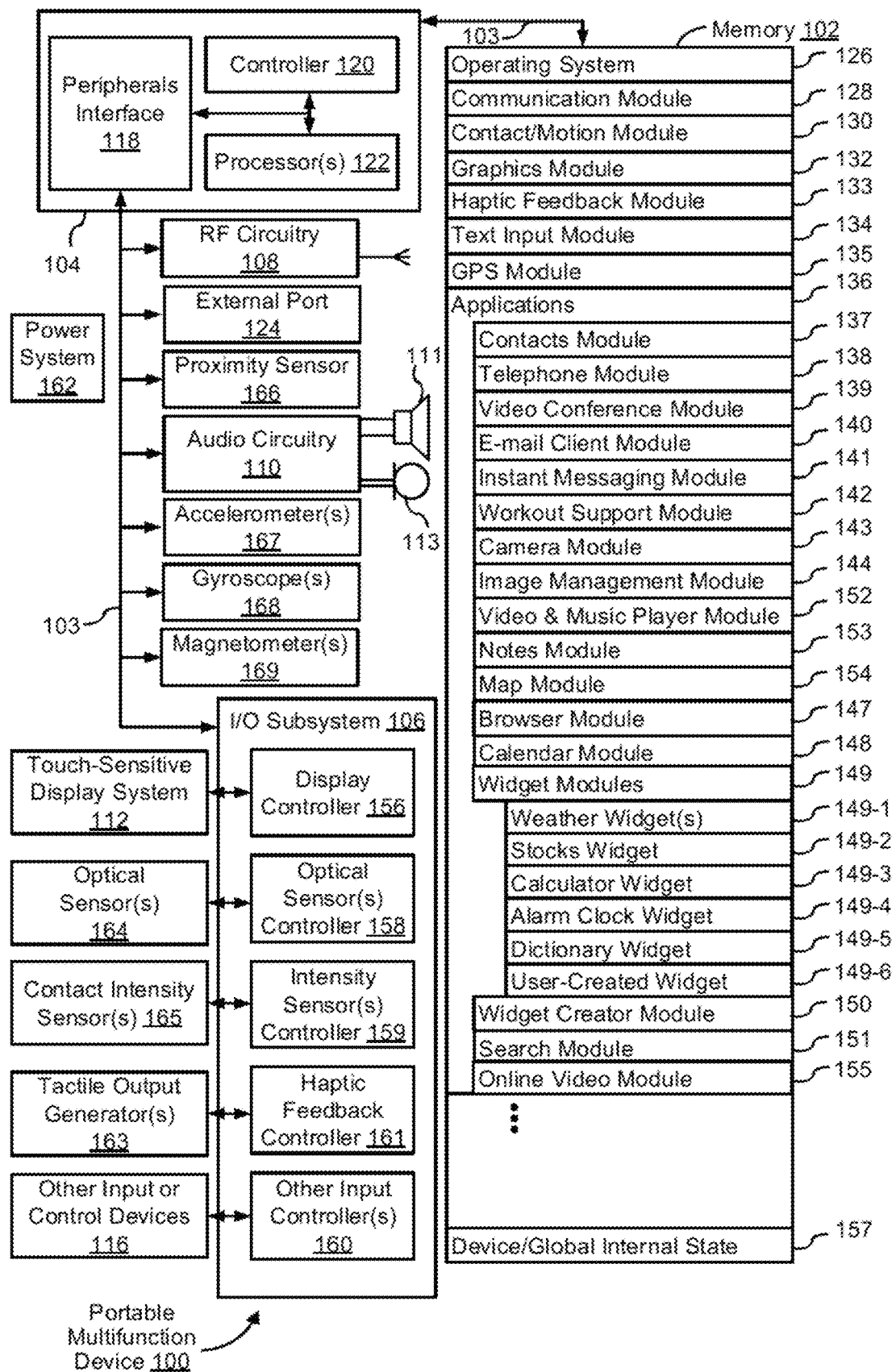
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
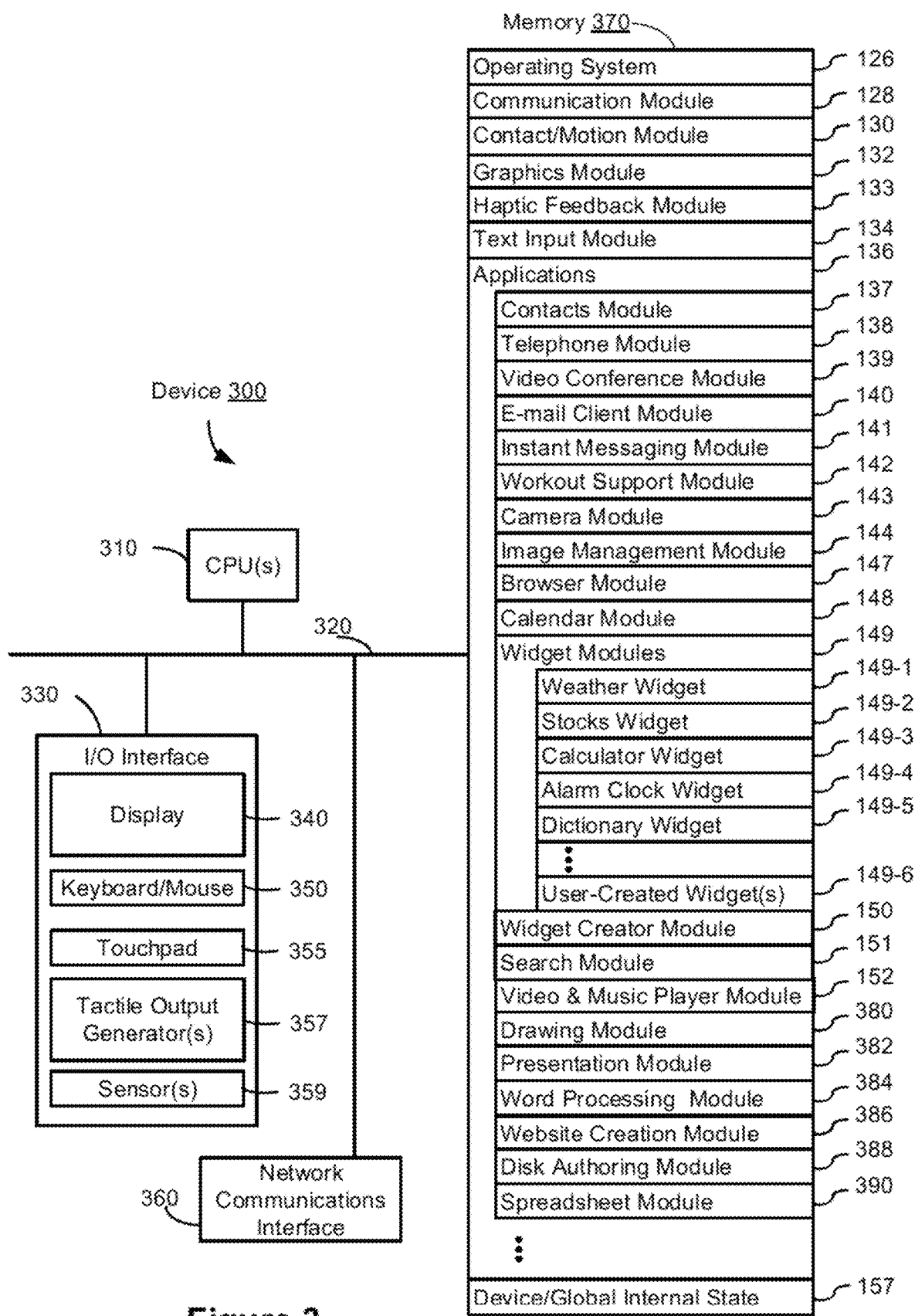
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches);

receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
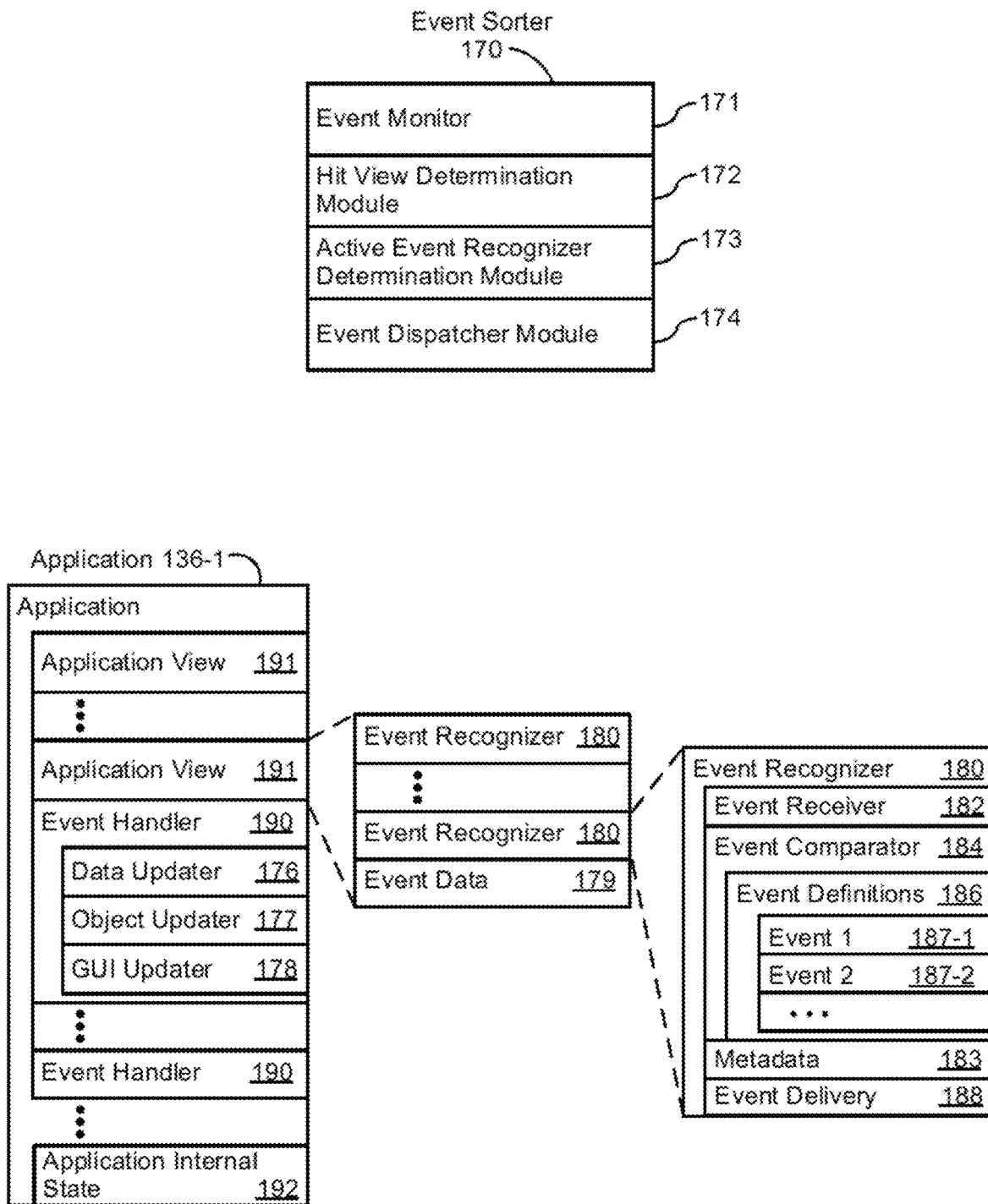
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
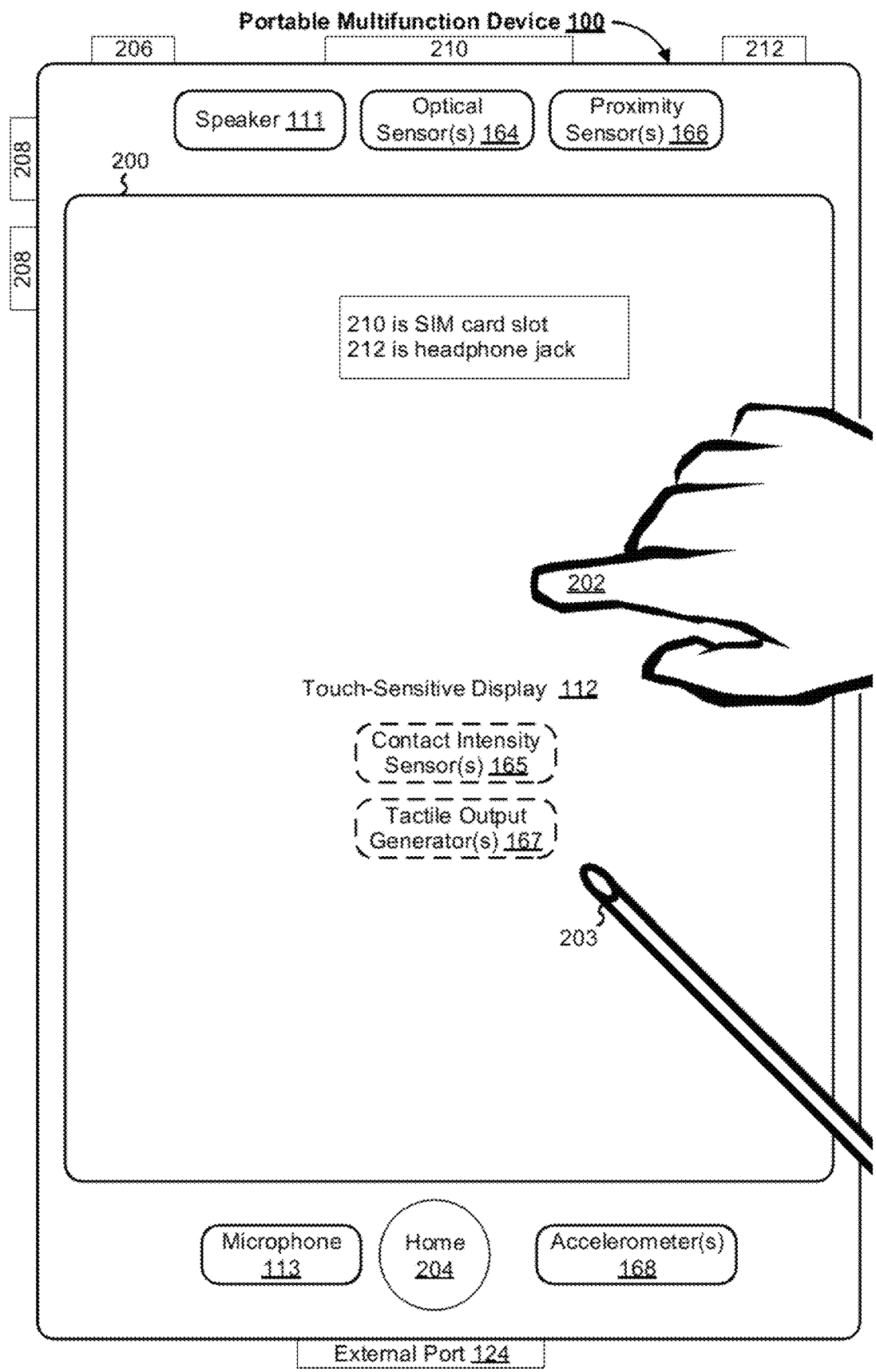
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
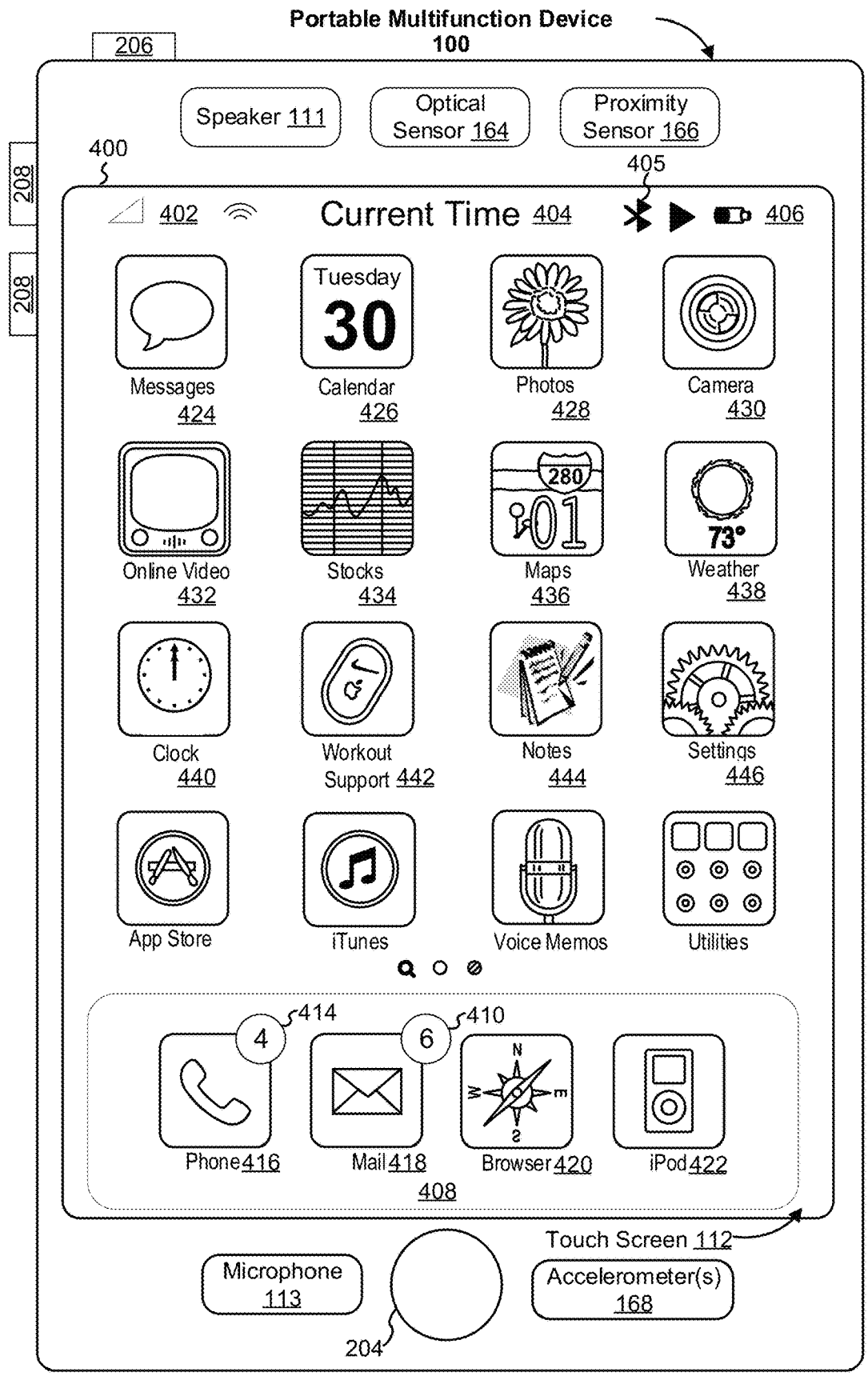
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser"; and

Icon 422 for video and music player module 152, also referred to as iPod (trademark of Apple Inc.) module 152, labeled "iPod"; and Icons for other applications, such as:
- Icon 424 for IM module 141, labeled "Text";
- Icon 426 for calendar module 148, labeled "Calendar";
- Icon 428 for image management module 144, labeled "Photos";
- Icon 430 for camera module 143, labeled "Camera";
- Icon 432 for online video module 155, labeled "Online Video";
- Icon 434 for stocks widget 149-2, labeled "Stocks";
- Icon 436 for map module 154, labeled "Map";
- Icon 438 for weather widget 149-1, labeled "Weather";
- Icon 440 for alarm clock widget 169-6, labeled "Clock";
- Icon 442 for workout support module 142, labeled "Workout Support";
- Icon 444 for notes module 153, labeled "Notes"; and
- Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and one or more input devices.

FIGS. 5A-5H illustrate example user interfaces for managing tags from a transport interface in accordance with some embodiments. The user interfaces in these figures are used to illustrate the process described below, including the processes in FIGS. 8A-8C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 5A:
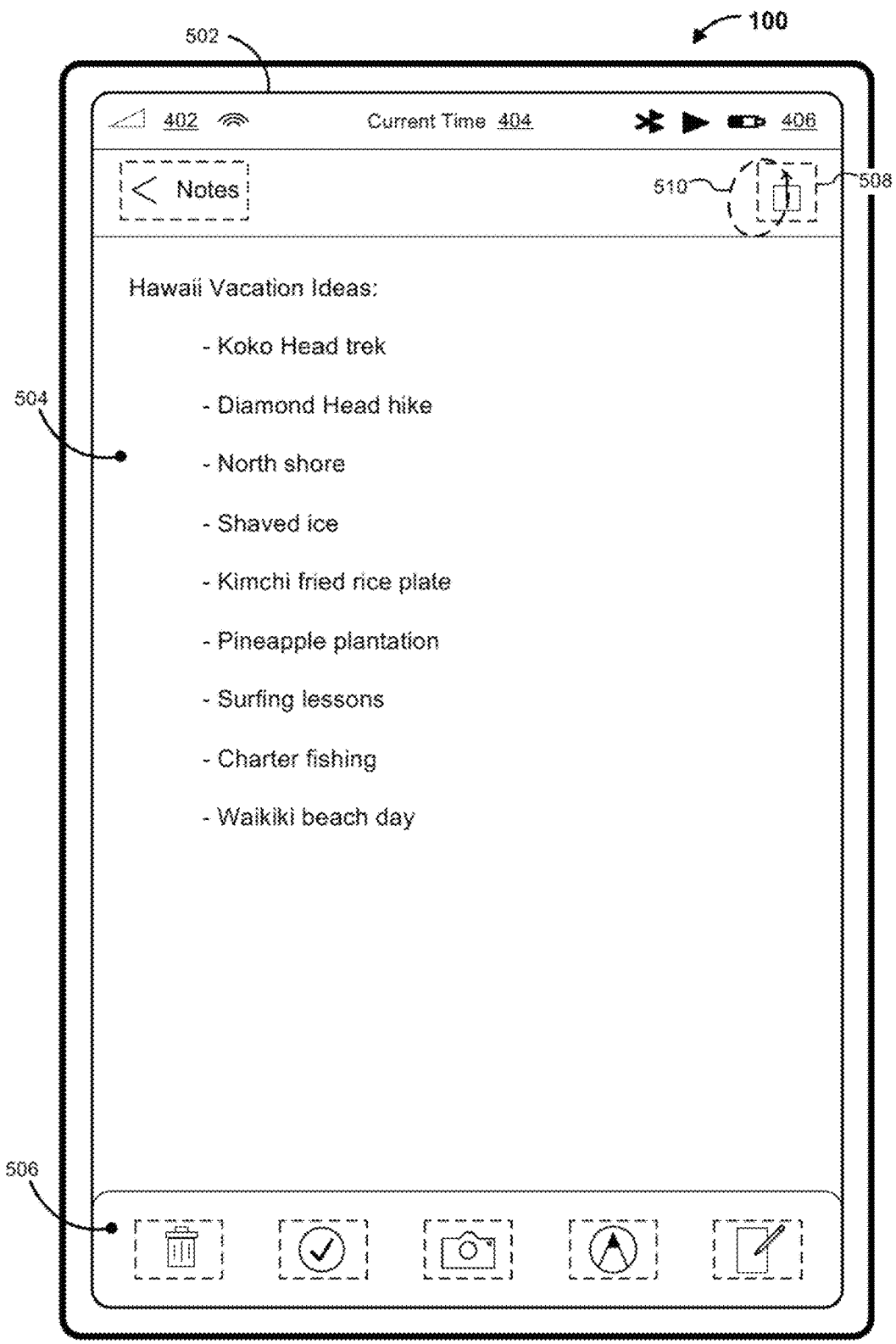
FIGS. 5A-5H illustrate example user interfaces for managing tags from a transport interface in accordance with some embodiments.
Figure 5B:
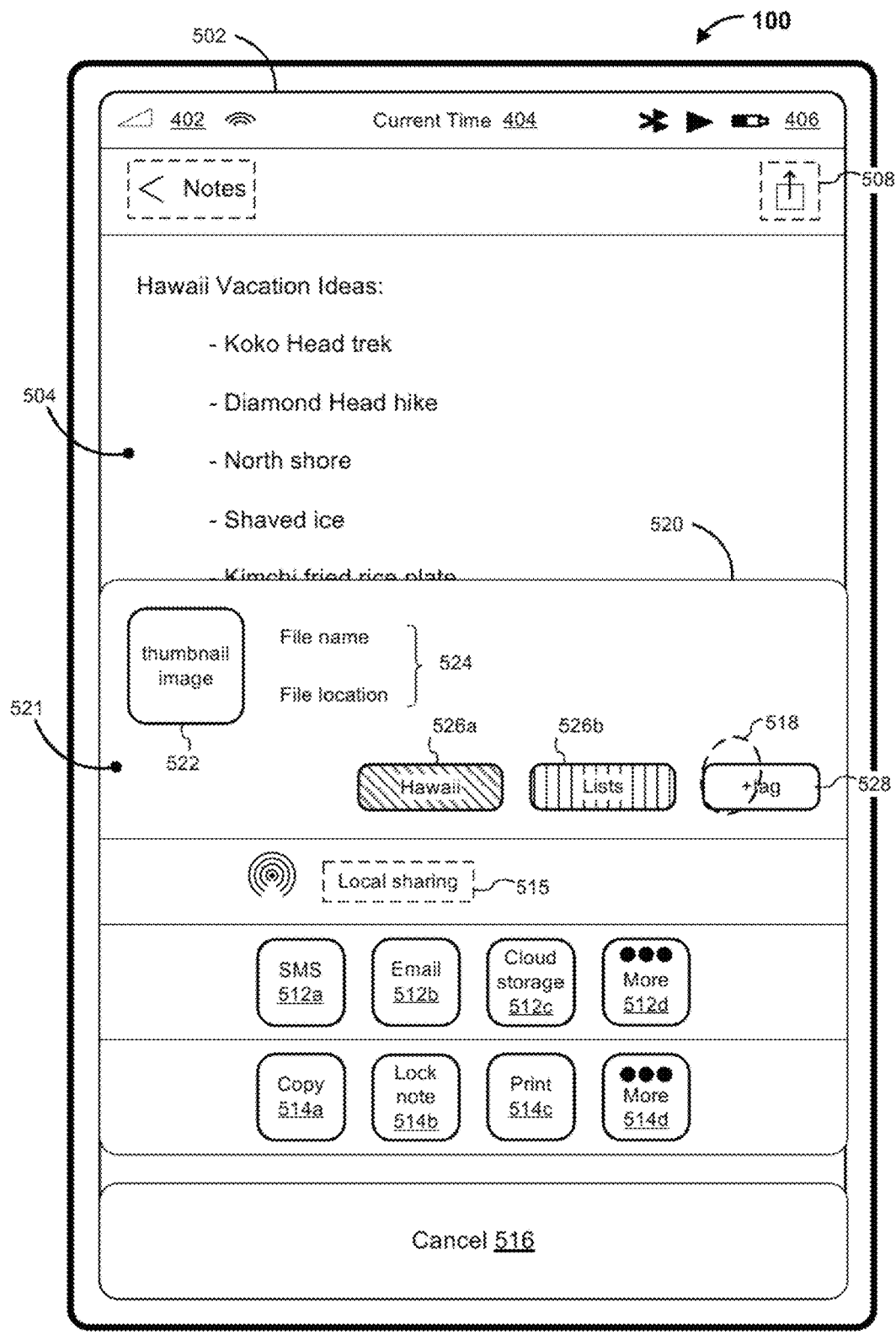

FIG. 5A illustrates displaying a notes interface 502 associated with a notes application executed by the device 100. According to some embodiments, the notes interface 502 is provided to create and/or edit content items such as notes and reminders. As shown in FIG. 5A, the notes interface 502 includes: a notes entry region 504 provided to enter and edit the content item (e.g., the note), a toolbar region 506 with a plurality of tool affordances provided to perform operations on the content item (e.g., the note), and a transport affordance 508. For example, as shown in FIG. 5A, the notes entry region 504 includes a list of items that comprise a note. According to some embodiments, in response to activation (e.g., selection with a contact) of the transport affordance 508, the device 100 displays a transport interface overlaid on the notes interface 502 (e.g., as shown in FIGS. 5A-5B) provided to edit tags associated with the content item (e.g., the note), to share the content item (e.g., the note) via one or more communication means (e.g., via email, SMS, etc.), and/or to perform one of a plurality of operations on the content item (e.g., the note) such as a copy operation, a print operation, etc. FIG. 5A also illustrates detecting a contact 510 (e.g., a tap/selection gesture) at a location that corresponds to the transport affordance 508.

FIG. 5B illustrates displaying a transport interface 520 over the notes interface 502 in response to detecting the selection of the transport affordance 508 in FIG. 5A. According to some embodiments, the transport interface 520 is provided to modify tags associated with a content item (e.g., the note in FIG. 5A), share the content item (e.g., the note in FIG. 5A), and/or perform an operation on the content item (e.g., the note in FIG. 5A). In some embodiments, the transport interface 520 slides up from the bottom edge of the display area of the device 100.

As shown in FIG. 5B, the transport interface 520 includes: a tags region 521, a local sharing affordance 515 provided to share the content item (e.g., the note in FIG. 5A) with one or more users (not shown) via a local interface (e.g., BLUETOOTH, NFC, WiFi, and/or the like) in response to selection thereof (e.g., with a tap/selection gesture), sharing affordances 512a, 512b, 512c, and 512d (sometimes collectively referred to herein as the "sharing affordances 512") provided to share the content item (e.g., the note in FIG. 5A) via corresponding communication means (e.g., SMS, email, cloud storage, and others) in response to selection thereof (e.g., with a tap/selection gesture), operation affordances 514a, 514b, 514c, and 514d (sometimes collectively referred to herein as the "operation affordances 514") provided to perform corresponding operations on the content item (e.g., the note in FIG. 5A) in response to selection thereof (e.g., with a tap/selection gesture), and a cancel affordance 516 provided to dismiss the transport interface 520 in response to selection thereof (e.g., with a tap/selection gesture).

As shown in FIG. 5B, the tags region 521 includes a thumbnail image 522 of the content item (e.g., the note in FIG. 5A) and metadata 524 associated with the content item (e.g., the name, location, modification date, creation date, creator's name, and/or the like of the note in FIG. 5A). As shown in FIG. 5B, the tags region 521 also includes tags 526a and 526b that are currently associated with the content item (e.g., the note in FIG. 5A) and a tag modification affordance 528 provided to modify (e.g., remove, add, and/or edit) tags associated with the content item (e.g., the note in FIG. 5A) in response to selection thereof (e.g., with a tap/selection gesture).

In FIG. 5B, the tag 526a corresponds to a "Hawaii" category, and the tag 526b corresponds to a "Lists" category. According to some embodiments, each tag corresponds to a category or subject in order to organize content items such as notes, documents, files, images, media, and the like. According to some embodiments, each tag is associated with a color, pattern, and/or appearance in order to organize content items such as notes, documents, files, images, media, and the like. In some embodiments, each tag is associated with a unique color, pattern, and/or appearance.

Figure 5C:
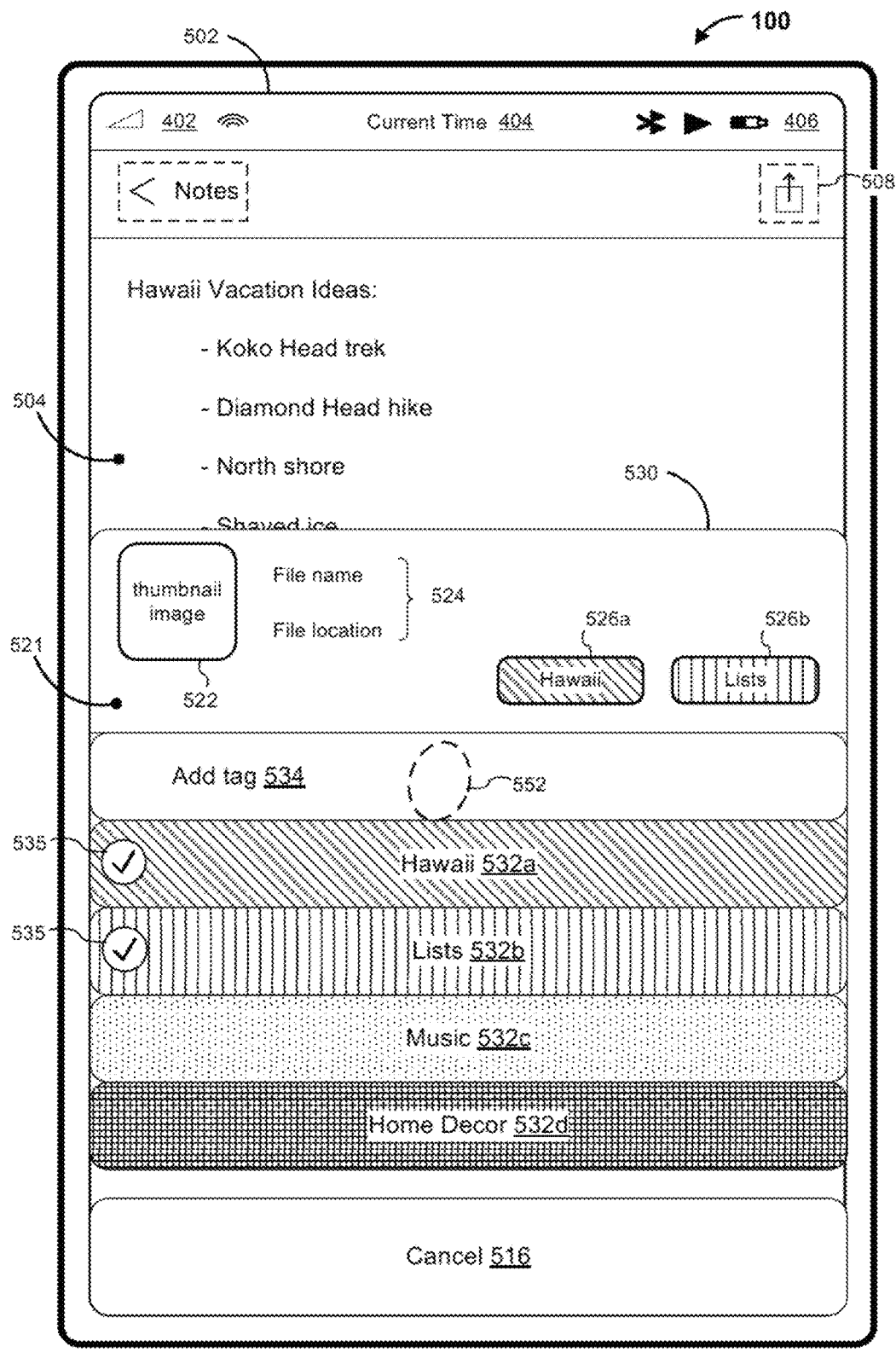

FIGS. 5B-5F show a sequence in which an association between a content item (e.g., the note) and a tag is added (e.g., an operation that associates a tag with the content item). FIG. 5B also illustrates detecting a contact 518 (e.g., a tap/selection gesture) at a location that corresponds to the tag modification affordance 528. FIG. 5C illustrates replacing display of the transport interface 520 with a tag modification interface 530 provided to modify tags associated with the content item (e.g., the note) in response to detecting the selection of the modification affordance 528 in FIG. 5B.

Figure 5D:
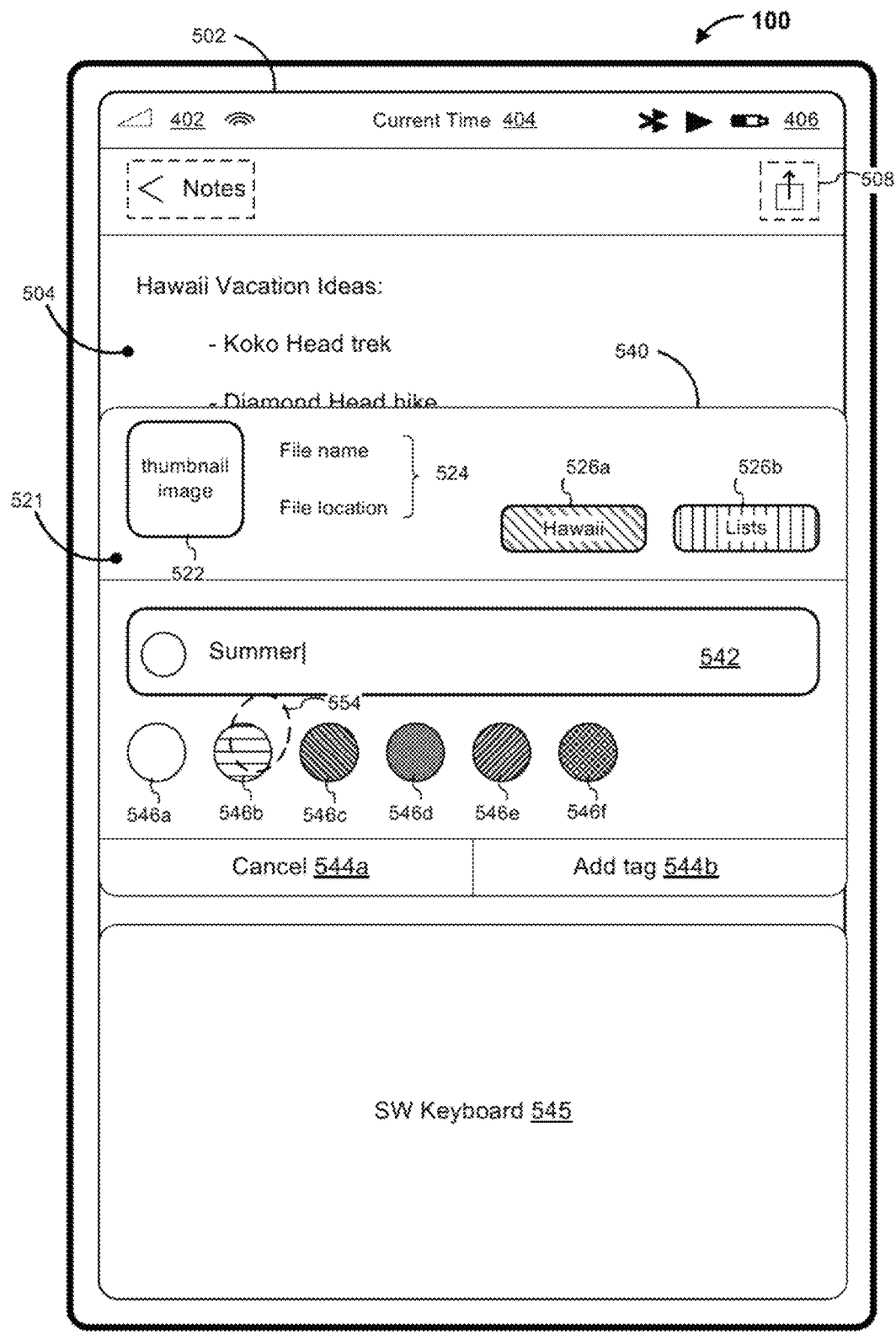

As shown in FIG. 5C, the tag modification interface 530 includes: the tags region 521 (e.g., similar to and adapted from the tags region 521 within the transport interface 520 in FIG. 5B), a tag creation field 534 provided to display a tag creation interface 540 in response to selection thereof (e.g., with a tap/selection gesture as shown in FIGS. 5C-5D), and the cancel affordance 516 provided to dismiss the tag modification interface 530 in response to selection thereof (e.g., with a tap/selection gesture). As shown in FIG. 5C, the tag modification interface 530 also includes a plurality of selectable tags 532a, 532b, 532c, 532d (sometimes collectively referred to herein as the "selectable tags 532"). In FIG. 5C, a first subset of the selectable tags 532 corresponds to tags that are currently associated with the content item (e.g., the selectable tags 532a and 532b) as indicated by the indicators 535 (e.g., the check mark icons), and a second subset of the selectable tags 532 corresponds to suggested tags (e.g., the selectable tags 532c and 532d) based on frequency of use, recency of use, and/or the like.

FIG. 5C also illustrates detecting a contact 552 (e.g., a tap/selection gesture) at a location that corresponds to the tag creation field 534. FIG. 5D illustrates replacing display of the tag modification interface 530 with a tag creation interface 540 provided to create a new tag and associate a content item (e.g., the note in FIG. 5A) with the new tag in response to detecting the selection of the tag creation field 534 in FIG. 5C. As shown in FIG. 5D, the tag creation interface 540 includes: the tags region 521 (e.g., similar to and adapted from the tags region 521 within the transport interface 520 in FIG. 5B), an input field 542 provided to create a name or category for a new tag, and a plurality of selectable tag appearance affordances 546a, 546b, 546c, 546d, 546e, and 546f (sometimes collectively referred to herein as the "tag appearance affordances 546") provided to select a color, pattern, and/or appearance for the new tag. According to some embodiments, the input field 542 is provided to receive one or more characters input via the software (SW) keyboard 545, a hardware keyboard, a speech-to-text application, and/or the like.

Figure 5E:
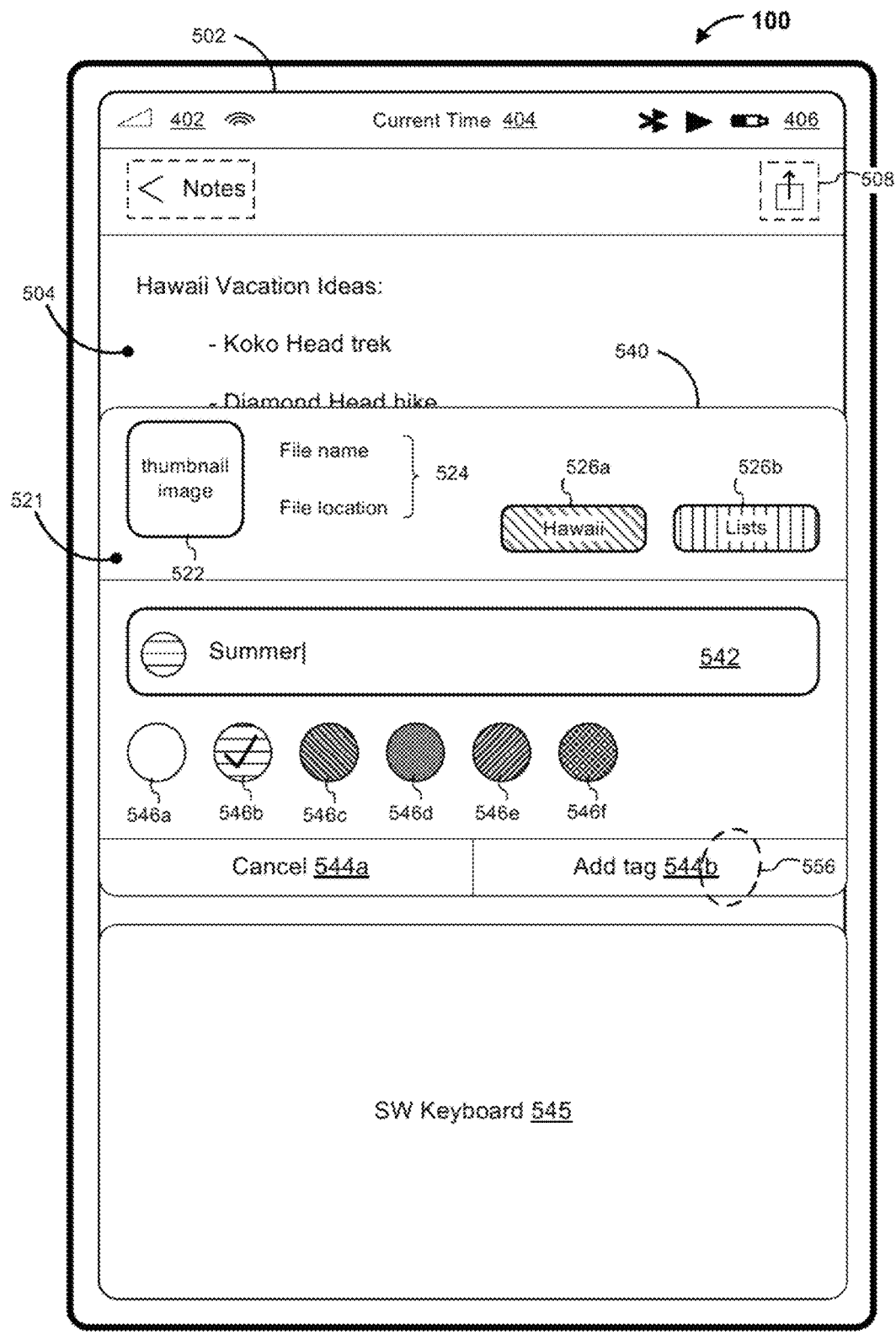
Figure 5F:
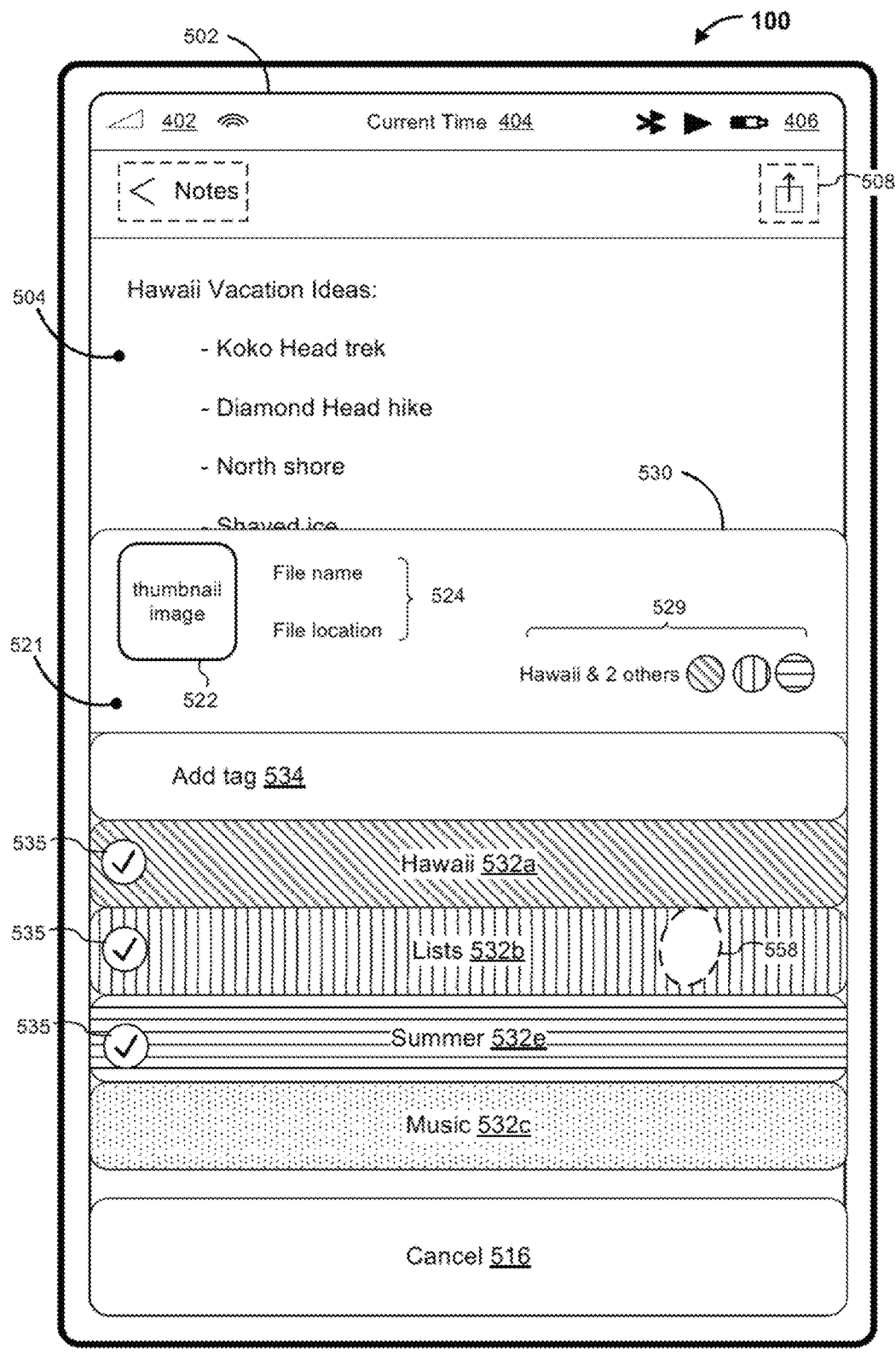

As shown in FIG. 5D, the tag creation interface 540 also includes: a cancel affordance 544a provided to dismiss the tag creation interface 540 in response to detecting the selection thereof (e.g., with a tap/selection gesture), and an "add tag" affordance 544b provided to associate the new tag with a content item (e.g., the note in FIG. 5A) in response to detecting the selection thereof (e.g., with a tap/selection gesture as shown in FIG. 5E-5F). For example, as shown in FIG. 5D, a text string "Summer" is displayed within the input field 542 in response to detecting a sequence of inputs entering the associated characters via the software keyboard 545 (not shown).

FIG. 5D also illustrates detecting a contact 554 (e.g., a tap/selection gesture) at a location that corresponds to the tag appearance affordance 546b. FIG. 5E illustrates displaying a check mark within the tag appearance affordance 546b to indicate that the color, pattern, and/or appearance associated with the tag appearance affordance 546b is associated with the new tag in response to detecting the selection of the tag appearance affordance 546b in FIG. 5D.

FIG. 5E also illustrates detecting a contact 556 (e.g., a tap/selection gesture) at a location that corresponds to the "add tag" affordance 544b. FIG. 5F illustrates replacing display of the tag creation interface 540 with the tag modification interface 530 in response to detecting the selection of the "add tag" affordance 544b in FIG. 5E. FIG. 5F also illustrates displaying the new selectable tag 532e within the tag modification interface 530 in response to detecting the selection of the "add tag" affordance 544b in FIG. 5E. As shown in FIG. 5F, the content item (e.g., the note in FIG. 5A) is currently associated with the new selectable tag 532e (e.g., created in FIGS. 5D-5F) as indicated by the indicator 535 (e.g., a check mark icon). As shown in FIG. 5F, the tags region 521 has been updated to remove the tags 526a and 526b and to display the tags representation 529 indicating that the content item (e.g., the note in FIG. 5A) is now associated with three tags (e.g., the "Hawaii," "Lists," and "Summer" categories). According to some embodiments, the tags 526a and 526b have been replaced with the representation 529 due to a dimensional constraint of the tags region 521 (e.g., a width limit).

Figure 5G:
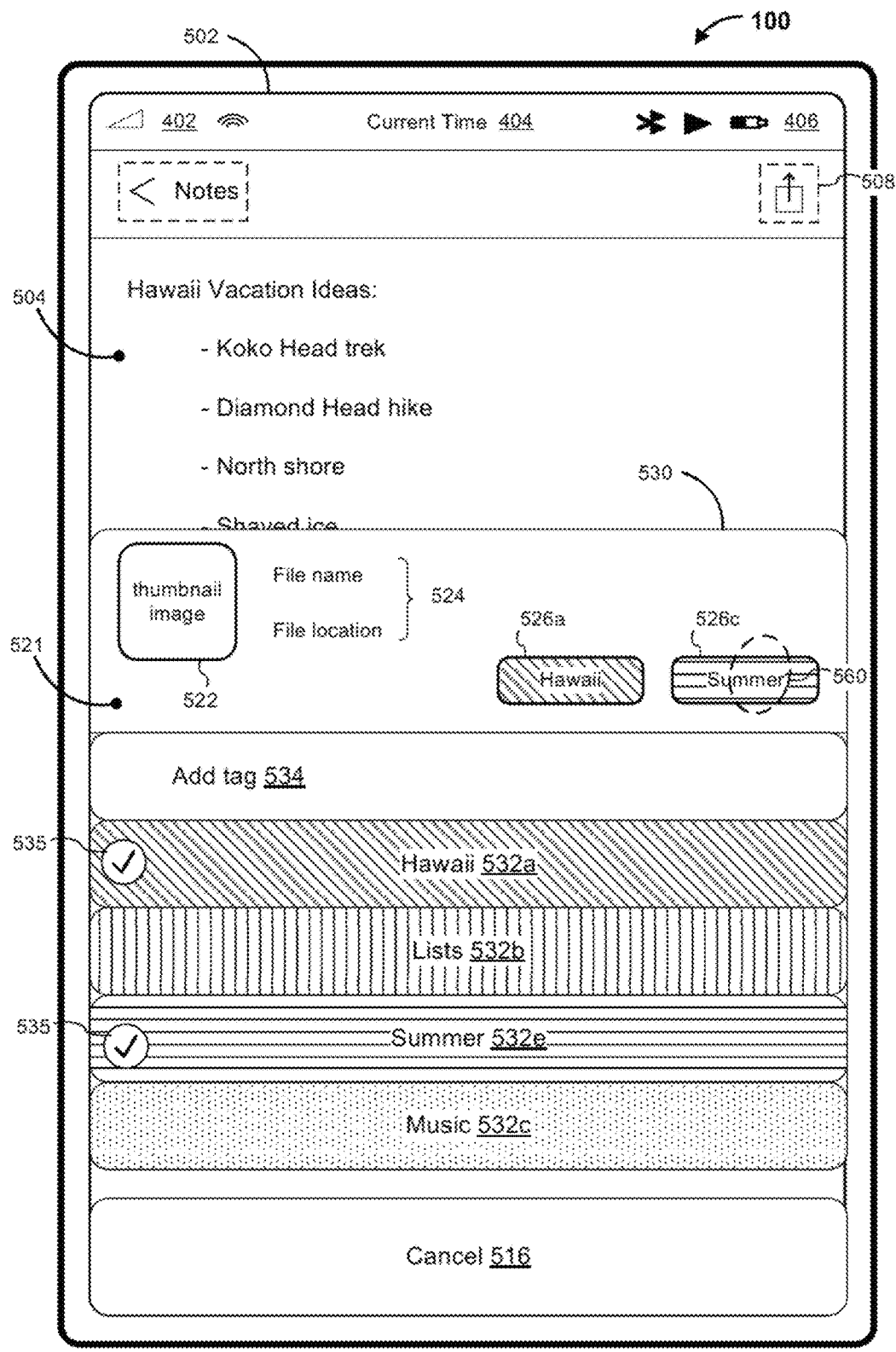

FIGS. 5F-5G show a sequence in which an association between the content item (e.g., the note) and a tag is removed (e.g., an operation that dissociates a tag with the content item). FIG. 5F also illustrates detecting a contact 558 (e.g., a tap/selection gesture) at a location that corresponds to the selectable tag 532b (e.g., associated with the "Lists" category). FIG. 5G illustrates removing the indicator 535 associated with the selectable tag 532b to indicate that the associated tag (e.g., "Lists") is no longer associated with the content item (e.g., the note) in response to detecting the selection of the selectable tag 532b in FIG. 5F. As shown in FIG. 5G, the tags region 521 has been updated to remove the representation 529 and to display the tags 526a and 526c indicating that the content item (e.g., the note in FIG. 5A) is now associated with two tags (e.g., the "Hawaii" and "Summer" categories).

Figure 5H:
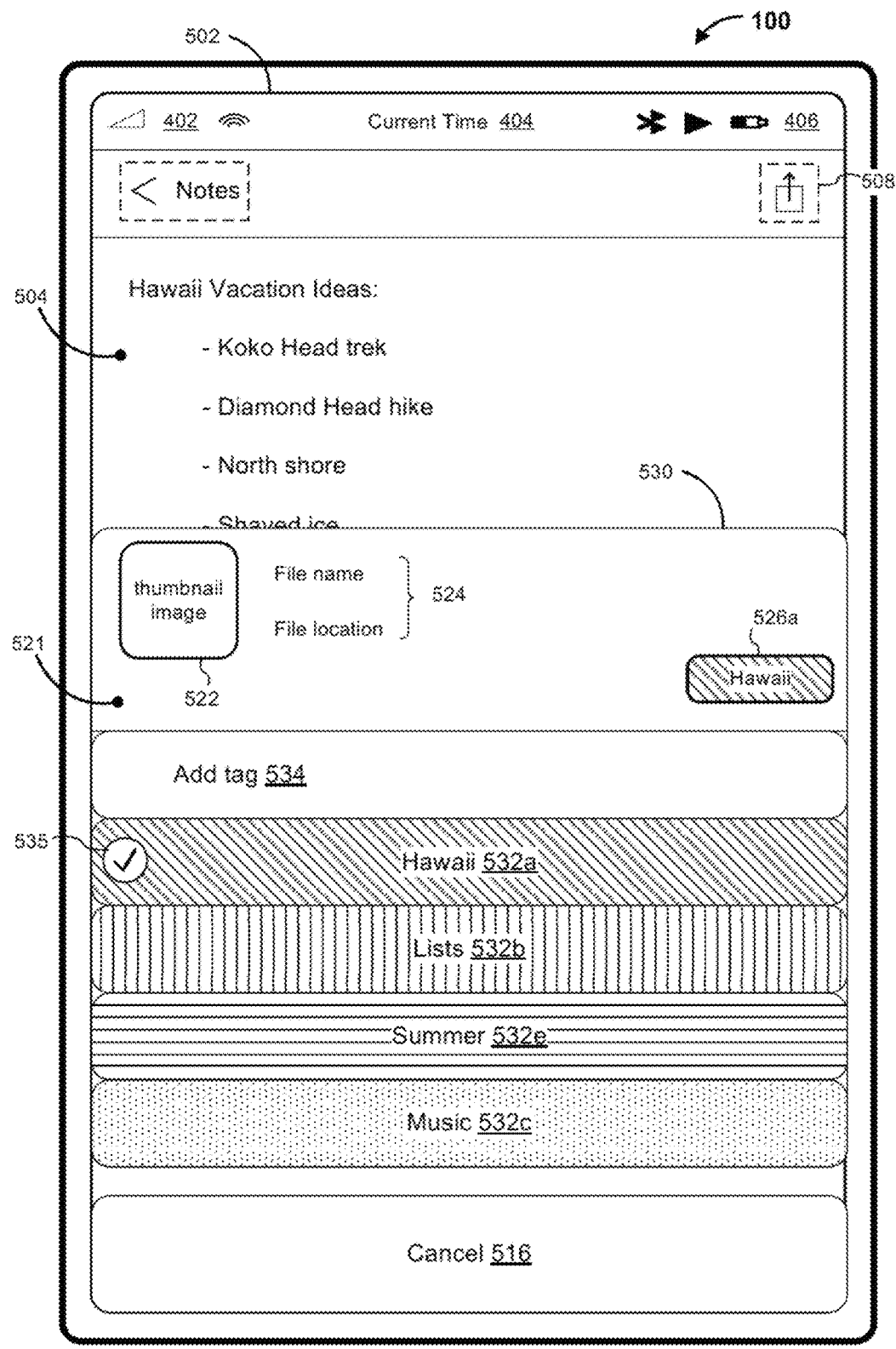

FIGS. 5G-5H show another sequence in which an association between the content item (e.g., the note) and another tag is removed (e.g., an operation that dissociates another tag with the content item). FIG. 5G also illustrates detecting a contact 560 (e.g., a tap/selection gesture) at a location that corresponds to the tag 526c (e.g., associated with the "Summer" category). FIG. 5H illustrates removing the indicator 535 associated with the selectable tag 532e to indicate that the associated tag (e.g., Summer) is no longer associated with the content item (e.g., the note) in response to detecting the selection of the tag 526c in FIG. 5G. As shown in FIG. 5H, the tags region 521 has been updated to remove the tag 526c in order to indicate that the note is now associated with one tag (e.g., the "Hawaii" category).

FIGS. 6A-6G illustrate example user interfaces for managing tags from a transport interface in accordance with some embodiments. The user interfaces in these figures are used to illustrate the process described below, including the processes in FIGS. 8A-8C. FIGS. 6H-6U illustrate example user interfaces for jointly accessible content items within a collaboration interface in accordance with some embodiments. The user interfaces in these figures are used to illustrate the process described below, including the processes in FIGS. 9A-9D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 6A:
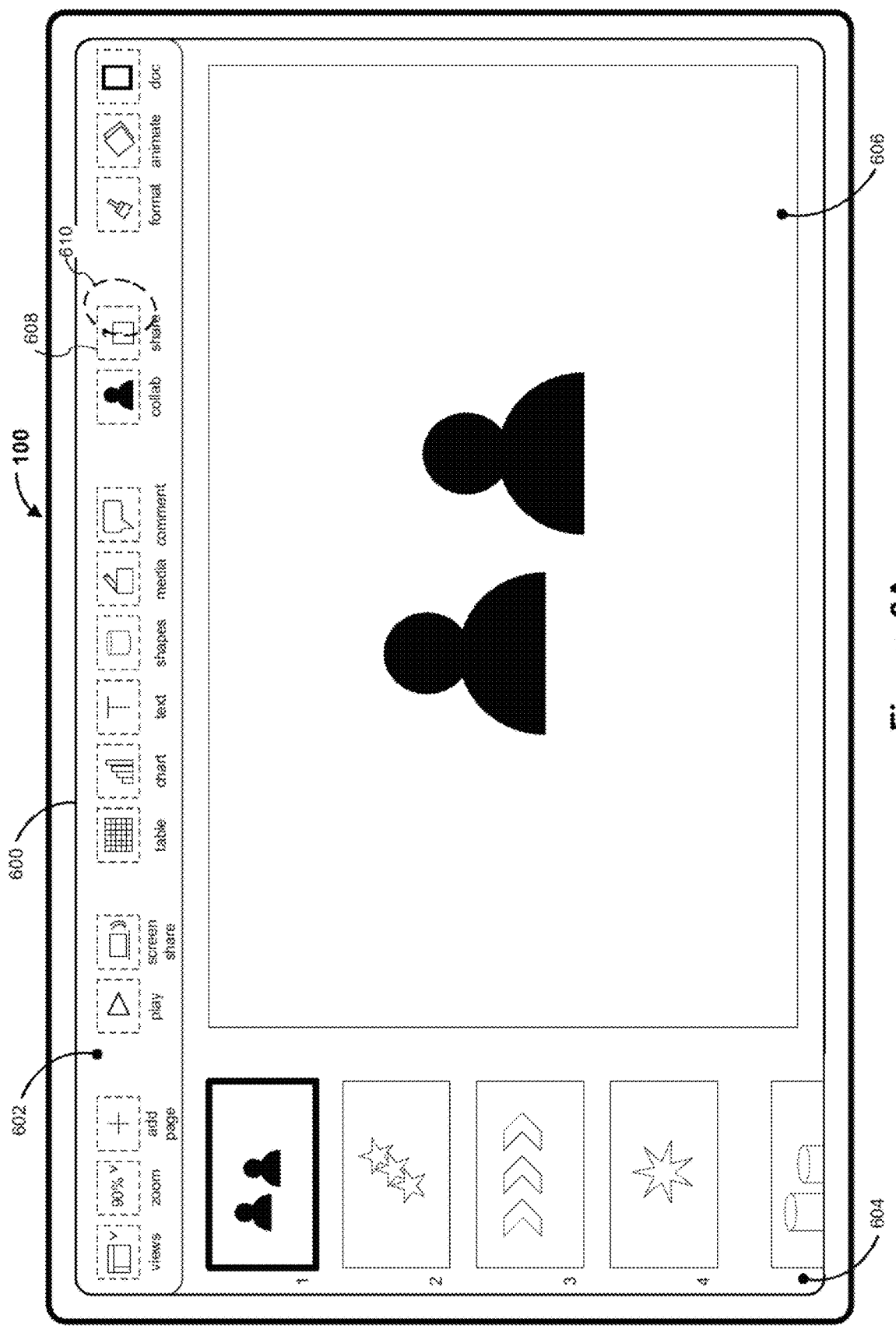
FIGS. 6A-6G illustrate example user interfaces for managing tags from a transport interface in accordance with some embodiments.

FIG. 6A illustrates displaying a presentation creation interface 600 associated with a presentation creation application executed by the device 100. According to some embodiments, the presentation creation interface 600 is provided to create and/or edit content items such as slide-decks, slideshows, presentations, and/or the like. As shown in FIG. 6A, the presentation creation interface 600 includes: a toolbar region 602 with a plurality of tool affordances provided to perform operations on the content item (e.g., the slide-deck, slideshow, or presentation), a content preview region 604 with a plurality of representations of sub-items (e.g., slides) that comprise the content item, and a content entry region 606 associated with a current sub-item (e.g., a respective slide). As shown in FIG. 6A, the toolbar region 602 includes a transport affordance 608.

Figure 6B:
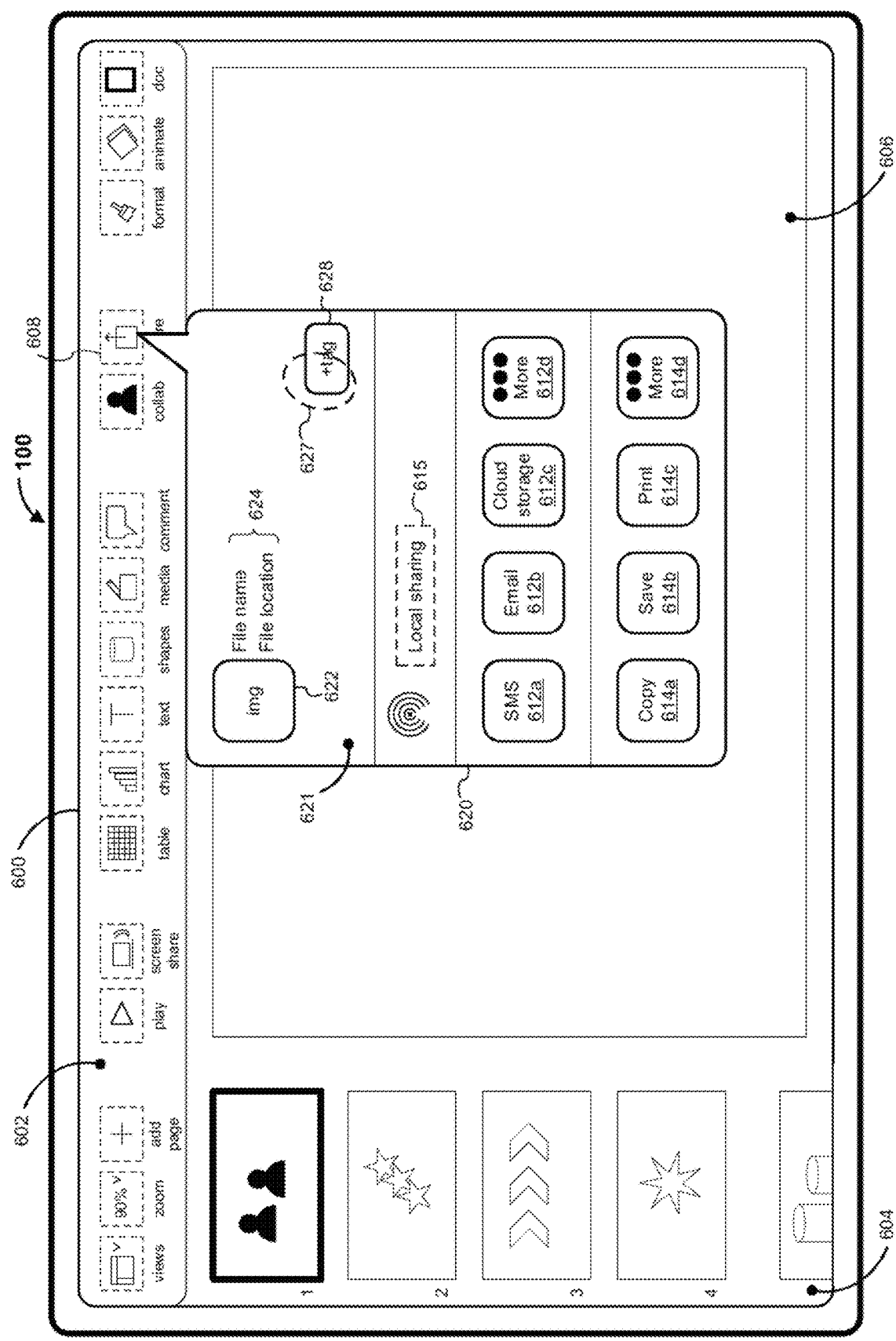

According to some embodiments, in response to activation (e.g., selection with a contact) of the transport affordance 608, the device 100 displays a transport interface overlaid on the presentation creation interface 600 (e.g., as shown in FIGS. 6A-6B) provided to edit tags associated with the content item (e.g., the presentation), to share the content item (e.g., the presentation) via one or more communication means (e.g., via email, SMS, etc.), and/or to perform one of a plurality of operations on the content item (e.g., the presentation) such as a copy operation, a print operation, etc. FIG. 6A also illustrates detecting a contact 610 (e.g., a tap/selection gesture) at a location that corresponds to the transport affordance 608.

FIG. 6B illustrates displaying a transport interface 620 over the presentation creation interface 600 in response to detecting the selection of the transport affordance 608 in FIG. 6A. According to some embodiments, the transport interface 620 is provided to modify tags associated with a content item and/or perform an operation on the content item. As shown in FIG. 6B, the transport interface includes: a tags region 621, a local sharing affordance 615 provided to share the content item (e.g., the presentation in FIG. 6A) with one or more users (not shown) via a local interface (e.g., BLUETOOTH, NFC, WiFi, and/or the like) in response to selection thereof (e.g., with a tap/selection gesture), sharing affordances 612a, 612b, 612c, and 612d (sometimes collectively referred to herein as the "sharing affordances 612") provided to share the content item (e.g., the presentation in FIG. 6A) via corresponding communication means (e.g., SMS, email, cloud storage, and others) in response to selection thereof (e.g., with a tap/selection gesture), and operation affordances 614a, 614b, 614c, and 614d (sometimes collectively referred to herein as the "operation affordances 614") provided to perform corresponding operations on the content item (e.g., the presentation in FIG. 6A) in response to selection thereof (e.g., with a tap/selection gesture).

As shown in FIG. 6B, the tags region 621 includes a thumbnail image 622 of the content item (e.g., the presentation in FIG. 6A) and metadata 624 associated with the content item (e.g., the name, size, location, modification date, creation date, creator's name, and/or the like of the presentation in FIG. 6A). As shown in FIG. 6B, the tags region 621 also includes a tag modification affordance 628 provided to modify (e.g., remove, add, and/or edit) tags associated with the content item (e.g., the presentation in FIG. 6A) in response to selection thereof (e.g., with a tap/selection gesture).

Figure 6C:
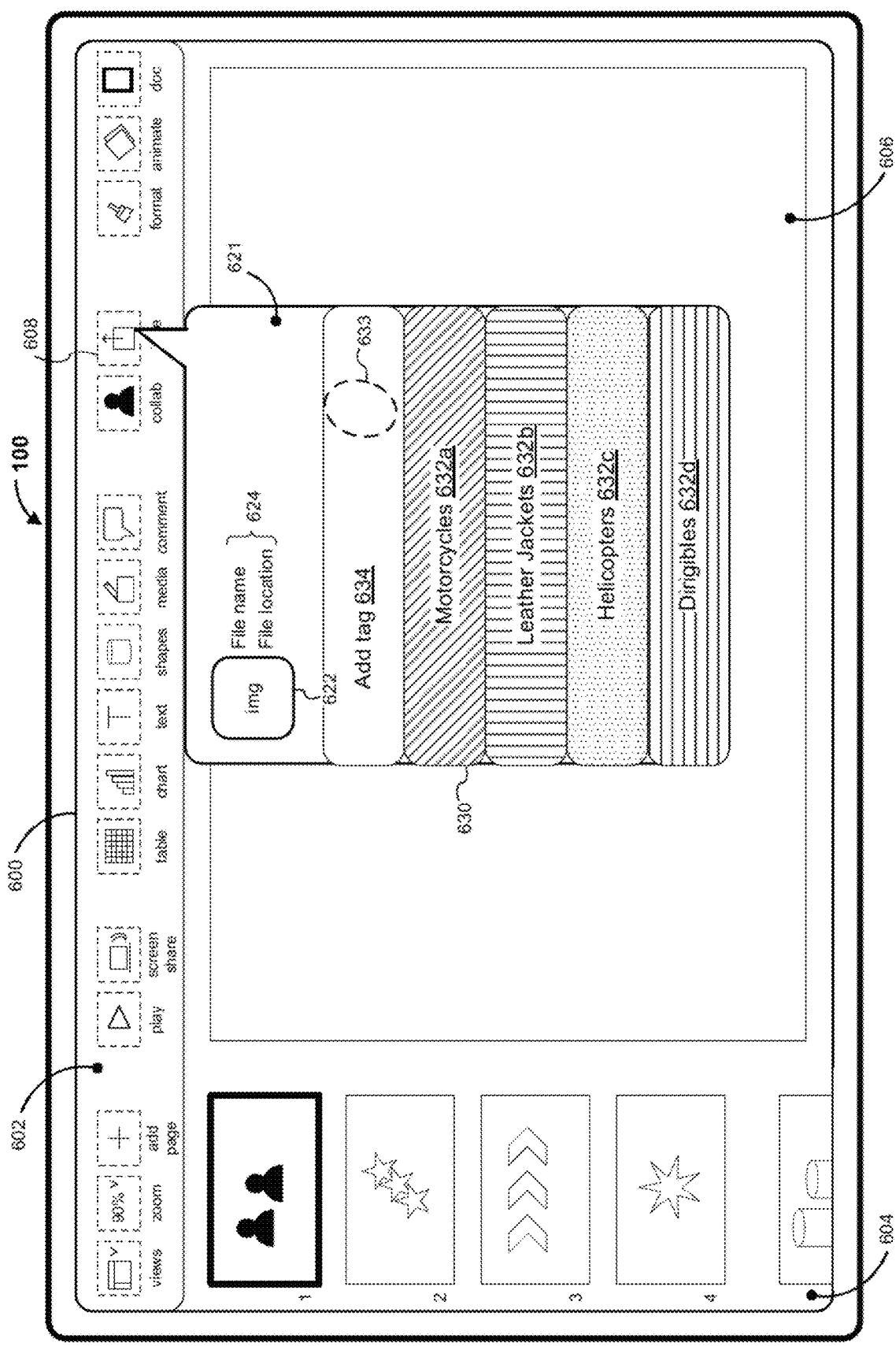

FIGS. 6B-6F show a sequence in which an association between a content item (e.g., the presentation in FIG. 6A) and a tag is added (e.g., an operation that associates a tag with the content item). FIG. 6B also illustrates detecting a contact 627 (e.g., a tap/selection gesture) at a location that corresponds to the tag modification affordance 628. FIG. 6C illustrates replacing display of the transport interface 620 with a tag modification interface 630 provided to modify tags associated with the content item (e.g., the presentation in FIG. 6A) in response to detecting the selection of the modification affordance 628 in FIG. 6B.

Figure 6D:
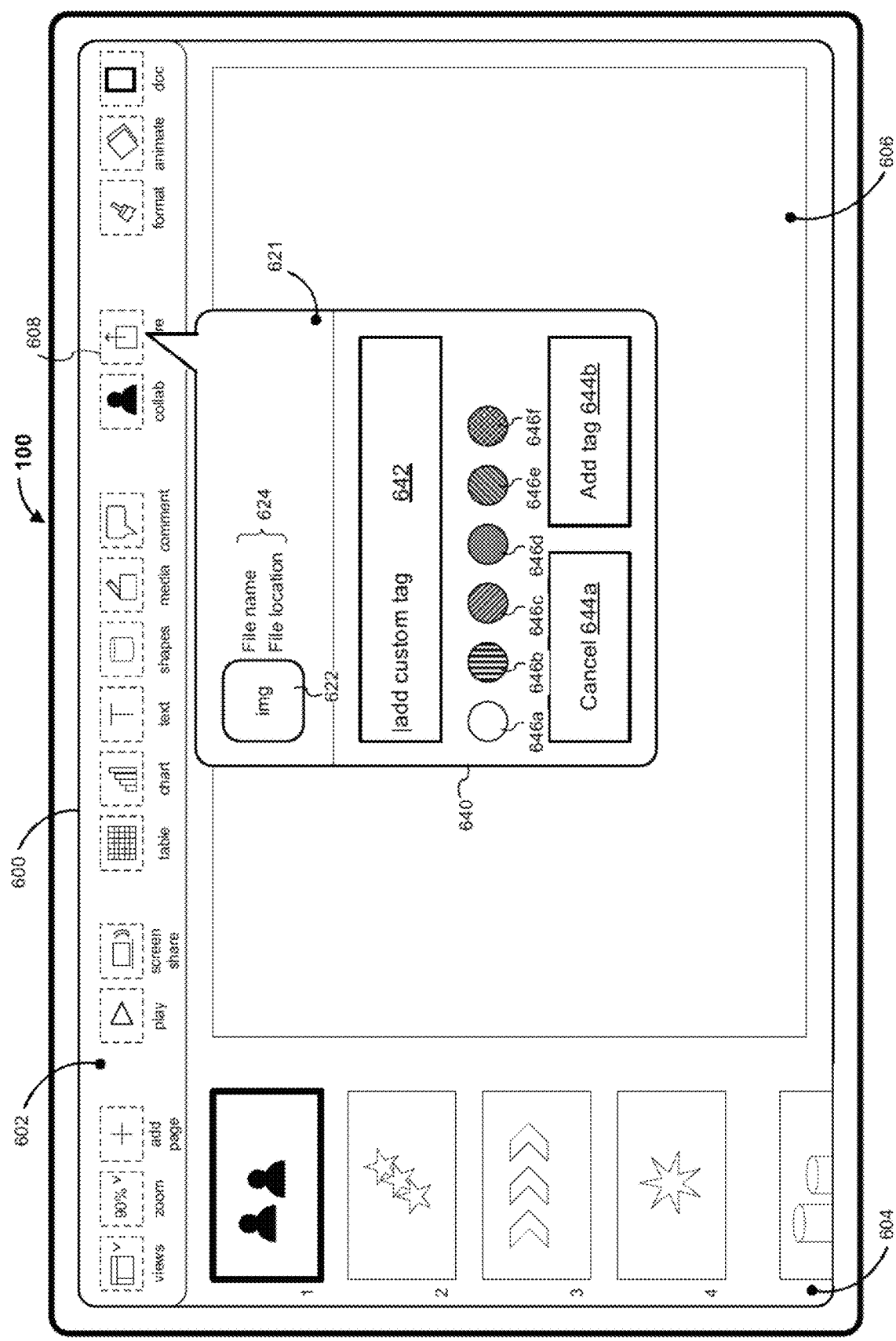

As shown in FIG. 6C, the tag modification interface 630 includes: the tags region 621 (e.g., similar to and adapted from the tags region 621 in the transport interface 620 in FIG. 6B), and a tag creation field 634 provided to display a tag creation interface 640 in response to selection thereof (e.g., with a tap/selection gesture as shown in FIG. 6C-6D). As shown in FIG. 6C, the tag modification interface 630 also includes a plurality of selectable tags 632a, 632b, 632c, 632d (sometimes collectively referred to herein as the "selectable tags 632"). In FIG. 6C, the content item (e.g., the presentation in FIG. 6A) is not currently associated with any tags. As such, in FIG. 6C, the selectable tags 632a, 632b, 632c, 632d correspond to suggested tags based on frequency of use, recency of use, and/or the like.

FIG. 6C also illustrates detecting a contact 633 (e.g., a tap/selection gesture) at a location that corresponds to the tag creation field 634. FIG. 6D illustrates replacing display of the tag modification interface 630 with a tag creation interface 640 provided to create a new tag and associate the content item (e.g., the presentation in FIG. 6A) with the new tag in response to detecting the selection of the tag creation field 634 in FIG. 6C.

As shown in FIG. 6D, the tag creation interface 640 includes: the tags region 621 (e.g., similar to and adapted from the tags region 621 within the transport interface 620 in FIG. 6B), an input field 642 provided to create a name or category for a new tag, a plurality of selectable tag appearance affordances 646a, 646b, 646c, 646d, 646e, and 646f (sometimes collectively referred to herein as the "tag appearance affordances 646") provided to select a color, pattern, and/or appearance for the new tag. According to some embodiments, the input field 642 is provided to receive one or more characters input via a software keyboard, a hardware keyboard, a speech-to-text application, and/or the like. As shown in FIG. 6D, the tag creation interface 640 also includes: a cancel affordance 644a provided to dismiss the tag creation interface 640 in response to detecting the selection thereof (e.g., with a tap/selection gesture), and an "add tag" affordance 644b provided to associate the new tag with a content item (e.g., the presentation in FIG. 6A) in response to detecting the selection thereof (e.g., with a tap/selection gesture as shown in FIG. 6E-6F).

Figure 6E:
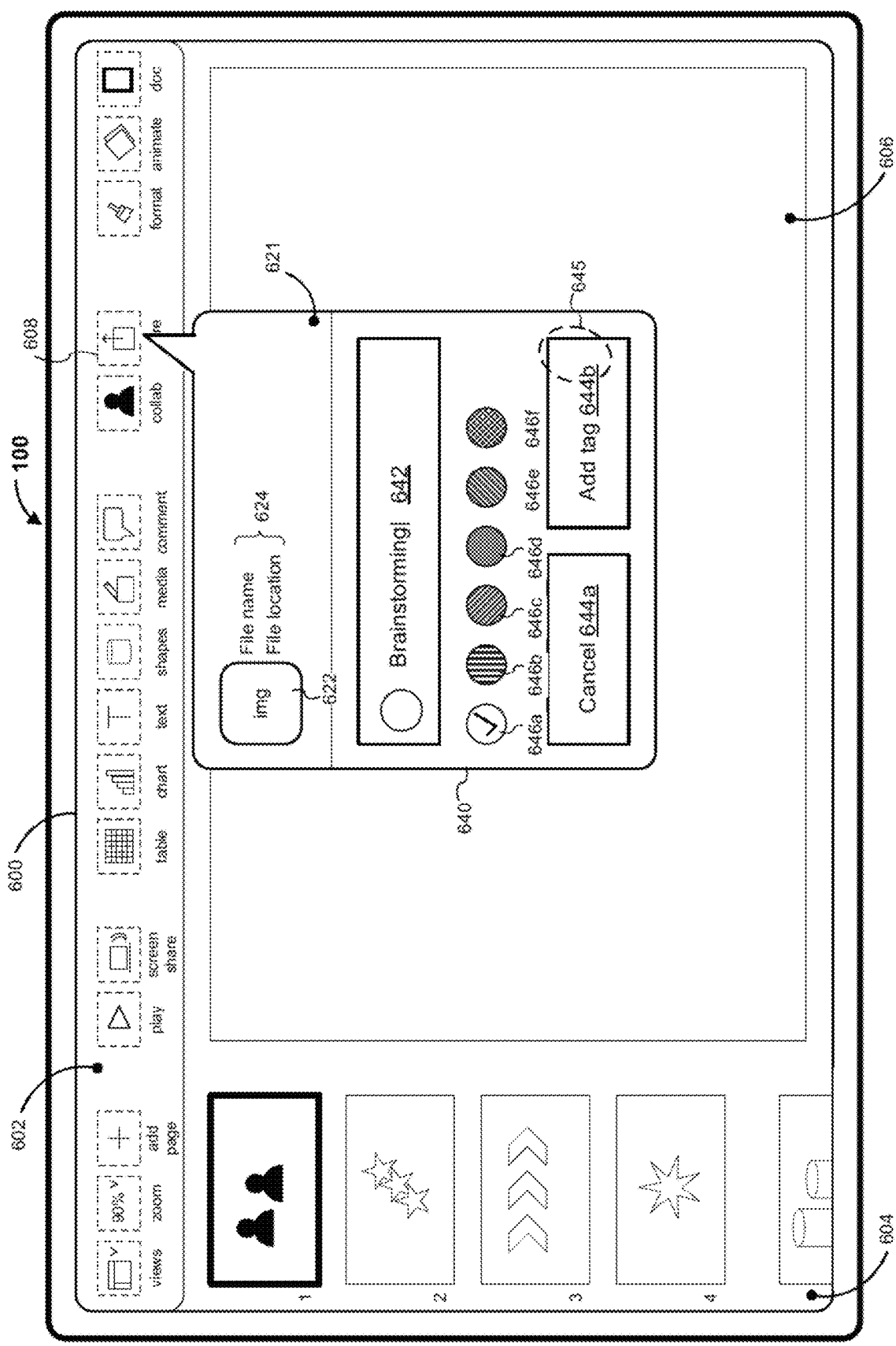

FIG. 6E illustrates displaying a text string "Brainstorming" within the input field 642 in response to detecting a sequence of inputs entering the associated characters via a software keyboard (not shown). FIG. 6E also illustrates displaying a check mark within the tag appearance affordance 646a to indicate that the color, pattern, and/or appearance associated with the tag appearance affordance 646a is associated with the new tag in response to detecting the selection of the tag appearance affordance 646a (not shown).

FIG. 6E further illustrates detecting a contact 645 (e.g., a tap/selection gesture) at a location that corresponds to the "add tag" affordance 644b. FIG. 6F illustrates replacing display of the tag creation interface 640 with the tag modification interface 630 in response to detecting the selection of the "add tag" affordance 644b in FIG. 6E. FIG. 6F also illustrates displaying the new selectable tag 632e within the tag modification interface 630 in response to detecting the selection of the "add tag" affordance 644b in FIG. 6E. As shown in FIG. 6F, the content item (e.g., the presentation in FIG. 6A) is currently associated with the new selectable tag 632e (e.g., created in FIGS. 6D-6E) as indicated by the indicator 635 (e.g., a check mark icon). As shown in FIG. 6F, the tags region 621 has been updated to show the tag 626a indicating that the content item (e.g., the presentation in FIG. 6A) is now associated with a tag (e.g., the "Brainstorming" category).

Figure 6F:
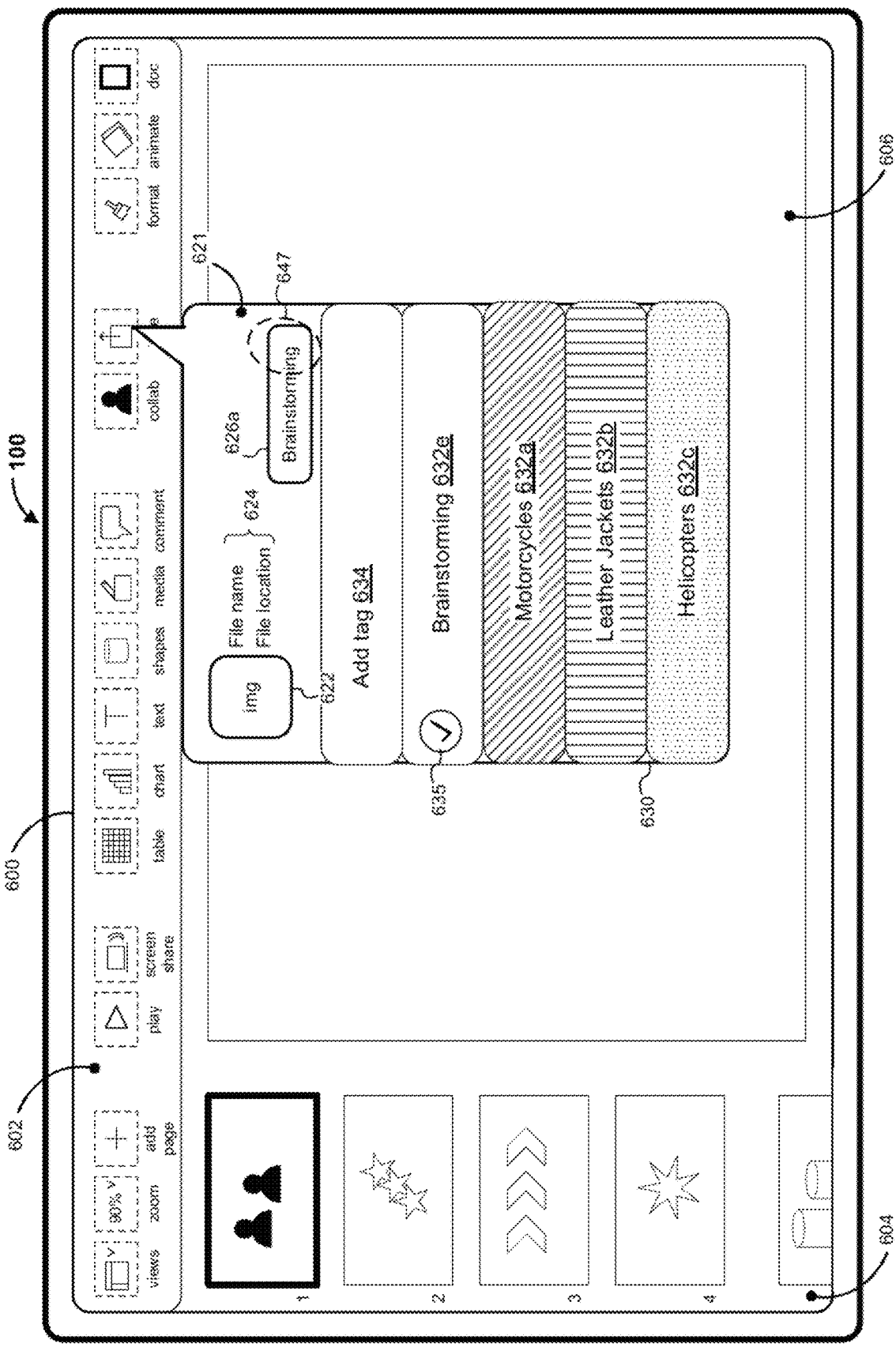
Figure 6G:
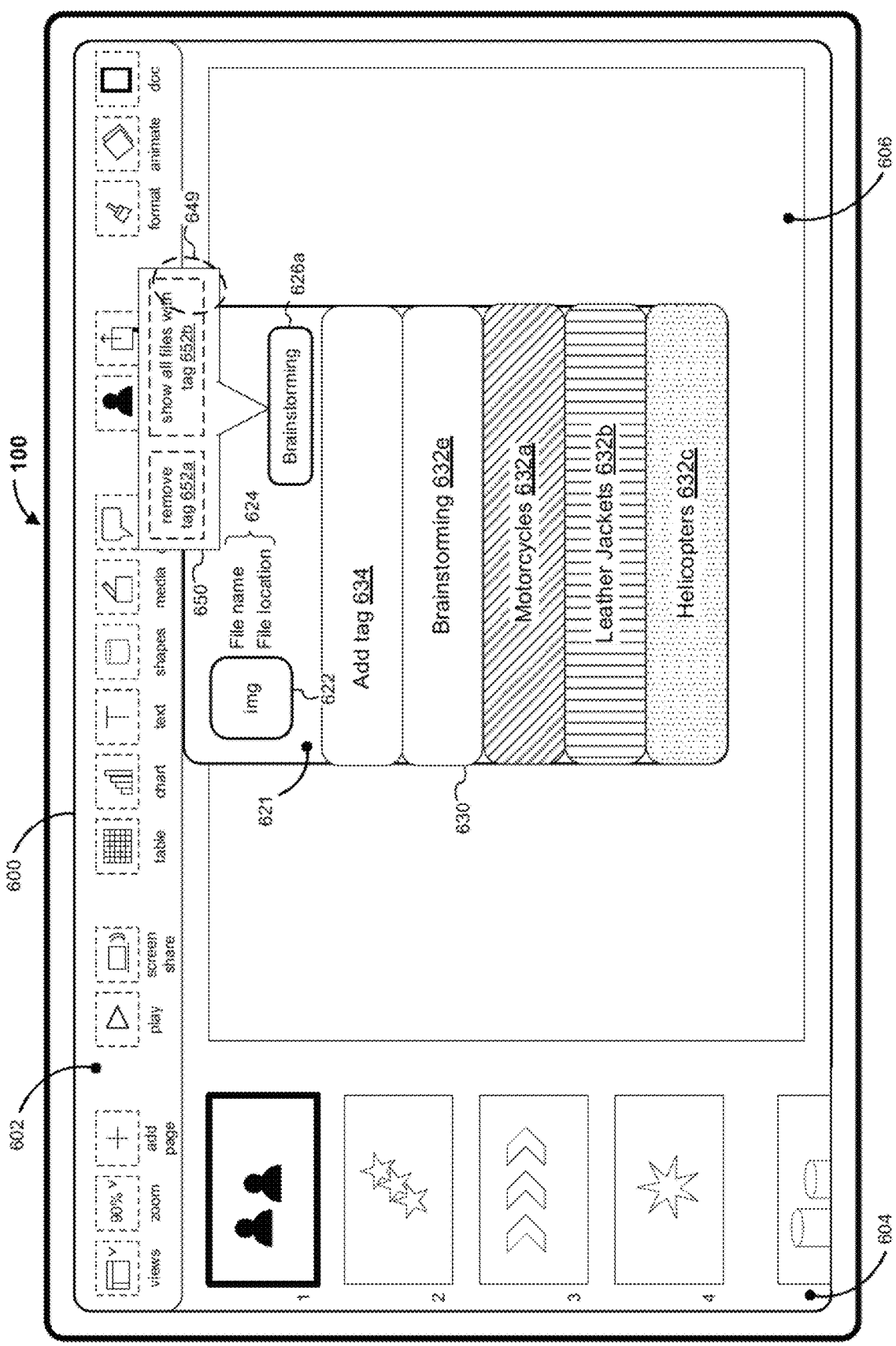
Figure 6H:
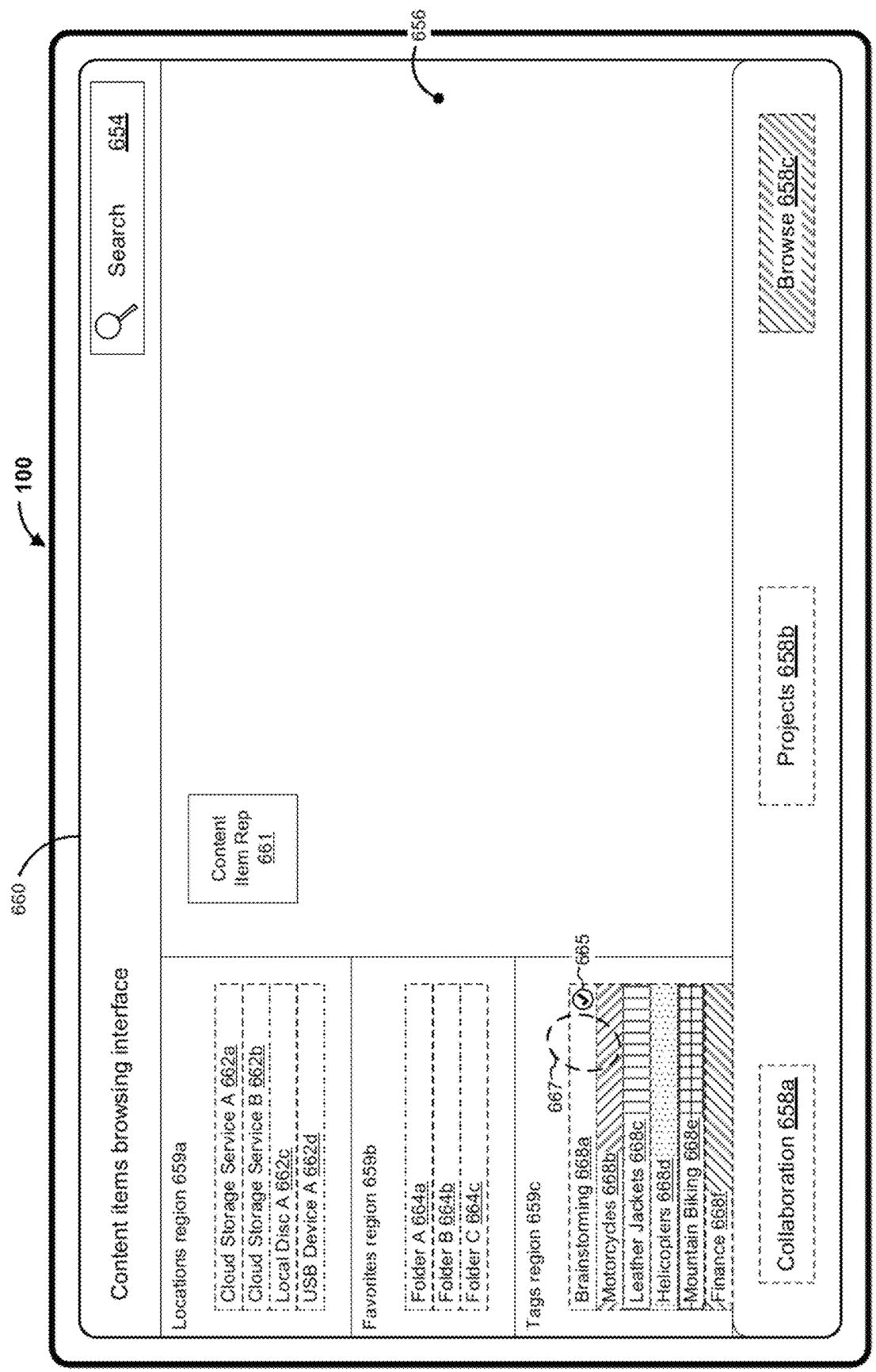
FIGS. 6H-6U illustrate example user interfaces for viewing jointly accessible content items within a collaboration interface in accordance with some embodiments.

FIGS. 6F-6H show a sequence in which the presentation creation interface is replaced with a content item browsing interface. FIG. 6F also illustrates detecting a contact 647 (e.g., a tap/selection gesture) at a location that corresponds to the tag 626a. FIG. 6G illustrates displaying an option menu 650 in response to detecting the selection of the tag 626a in FIG. 6F. As shown in FIG. 6G, the option menu 650 includes: a "remove tag" affordance 652a provided to remove the association between the content item (e.g., the presentation in FIG. 6A) and the tag 626a in response to selection thereof (e.g., with a tap/selection gesture), and a "show all files with tag" affordance 652b provided to display a content items browsing interface 660 that shows content items associated with the tag 626a in response to selection thereof (e.g., with a tap/selection gesture as shown in FIG. 6G-6H).

FIG. 6G also illustrates detecting a contact 649 (e.g., a tap/selection gesture) at a location that corresponds to the "show all files with tag" affordance 652b. FIG. 6H illustrates displaying the content items browsing interface 660 in response to detecting the selection of the "show all files with tag" affordance 652b in FIG. 6G. As shown in FIG. 6H, the content items browsing interface 660 includes: a search bar 654 provided to search for and display resulting content items, a primary region 656, a collaboration view affordance 658a provided to display a collaboration interface 680 in response to selection thereof (e.g., with a tap/selection gesture as shown in FIG. 6K-6L), a projects view affordance 658b provided to display a projects interface 6130 in response to selection thereof (e.g., with a tap/selection gesture as shown in FIGS. 6S-6T), and a browser view affordance 658c provided to display the content item browsing interface 660 in response to selection thereof (e.g., with a tap/selection gesture).

As shown in FIG. 6H, the content items browsing interface 660 also includes a filter sidebar with a plurality of selectable filter options, including: a locations region 659a with a plurality of selectable filter affordances 662a, 662b, 662c, and 662d that correspond to storage locations (e.g., cloud storage services, local storage devices, remote storage devices, and/or attached/peripheral storage devices such as USB devices); a favorites region 659b with a plurality of selectable filter affordances 664a, 664b, and 664c that correspond to favorite folders or directories (e.g., folder A through C); and tags region 659c with a plurality of selectable filter affordances 668a, 668b, 668c, 668d, 668e, and 668f (sometimes collectively referred to herein as the "tag filter affordances 668") that correspond to tags associated with content items aggregated across storage locations.

According to some embodiments, each of the tag filter affordances 668 is associated with a tag that corresponds to a category or subject in order to organize content items such as notes, documents, files, images, media, and the like. According to some embodiments, each of the tag filter affordances 668 is associated with a tag that corresponds to a color, pattern, and/or appearance in order to organize content items such as notes, documents, files, images, media, and the like. In some embodiments, each tag is associated with a unique color, pattern, and/or appearance.

As shown in FIG. 6H, the selectable filter affordance 668a associated with the "Brainstorming" tag is currently selected as indicated by the indicator 665 (e.g., a check mark icon). In FIG. 6H, the primary region 656 includes a content item representation 661 for a content item that is associated with the "Brainstorming" tag. For example, the content item representation 661 corresponds to the presentation in FIG. 6A. In some embodiments, the content item representations in the primary region 656 correspond to icons indicating a file type of the associated content items. In some embodiments, the content item representations in the primary region 656 correspond to thumbnail images/previews of the associated content items. In some embodiments, metadata associated with corresponding content items is displayed proximate to each of the content item representations in the primary region 656. For example, the metadata includes the name, size, location, modification date, creation date, creator's name, and/or the like for the associated content items. In some embodiments, the content item representations in the primary region 656 include a text description.

Figure 6I:
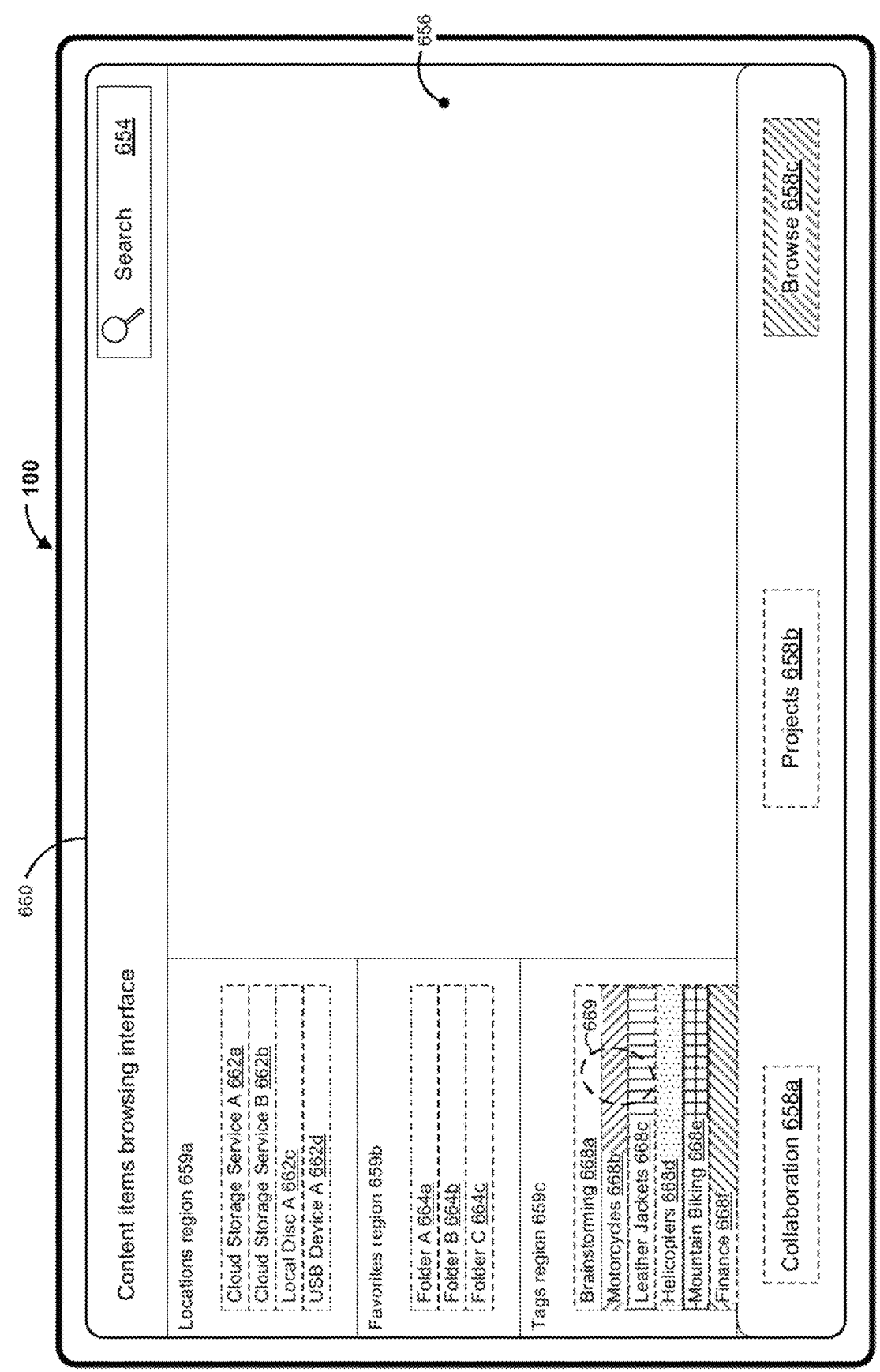

FIGS. 6H-6I show a sequence in which the content item representations displayed within the content item browsing interface are filtered based on selected tag(s). FIG. 6H also illustrates detecting a contact 667 (e.g., a tap/selection gesture) at a location that corresponds to the selectable filter affordance 668a (e.g., the "Brainstorming" tag). FIG. 6I illustrates removing display of the content item representation 661 within the primary region 656 in response to detecting the selection of the selectable filter affordance 668a in FIG. 6H. For example, the content item (e.g., the presentation in FIG. 6A) that corresponds to the content item representation 661 is associated with the now-unselected selectable filter affordance 668a (e.g., the "Brainstorming" tag). In this example, no content item representations are displayed within the primary region 656 because none of the selectable filter affordances are currently selected in FIG. 6I.

Figure 6J:
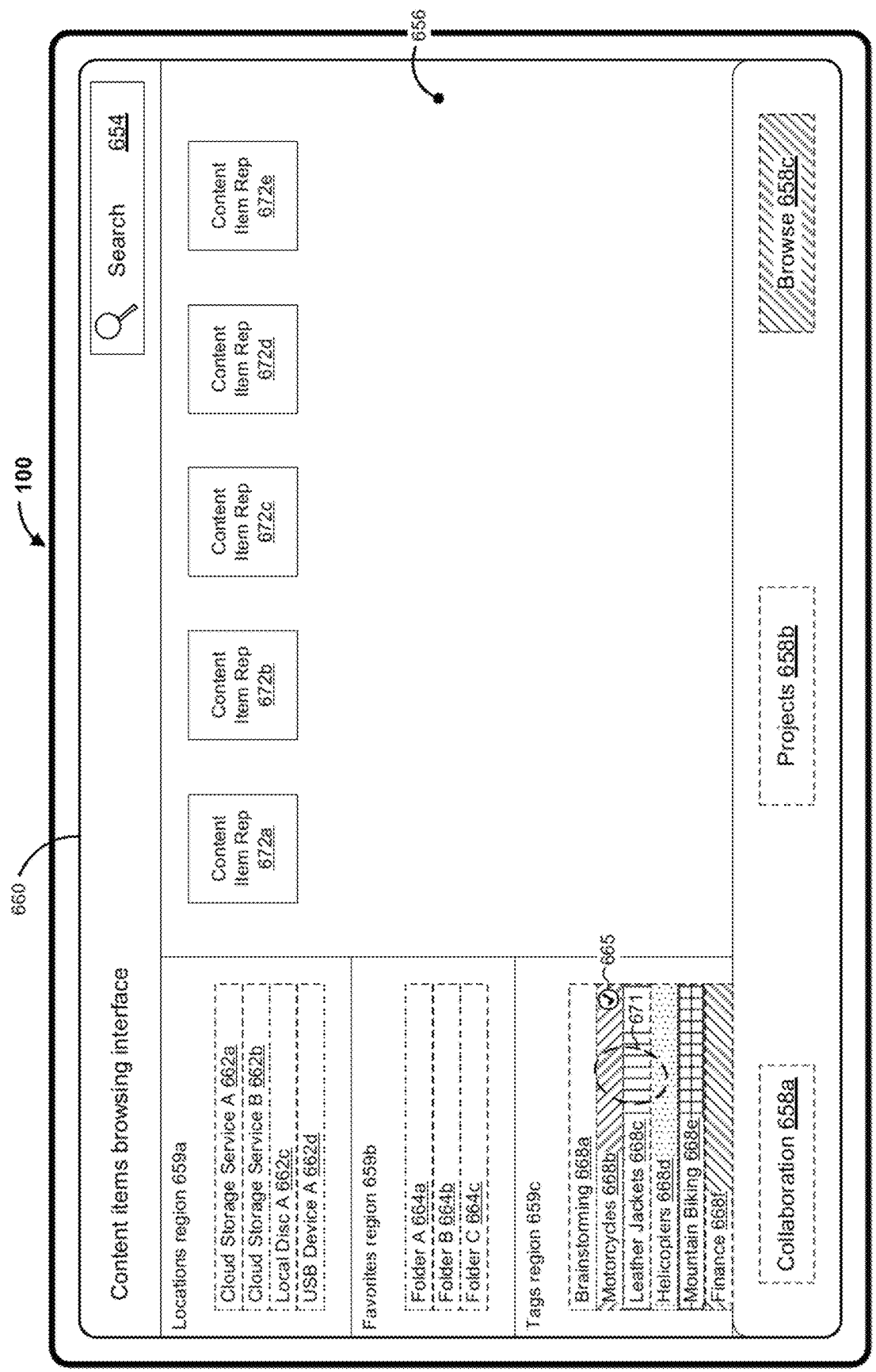
Figure 6K:
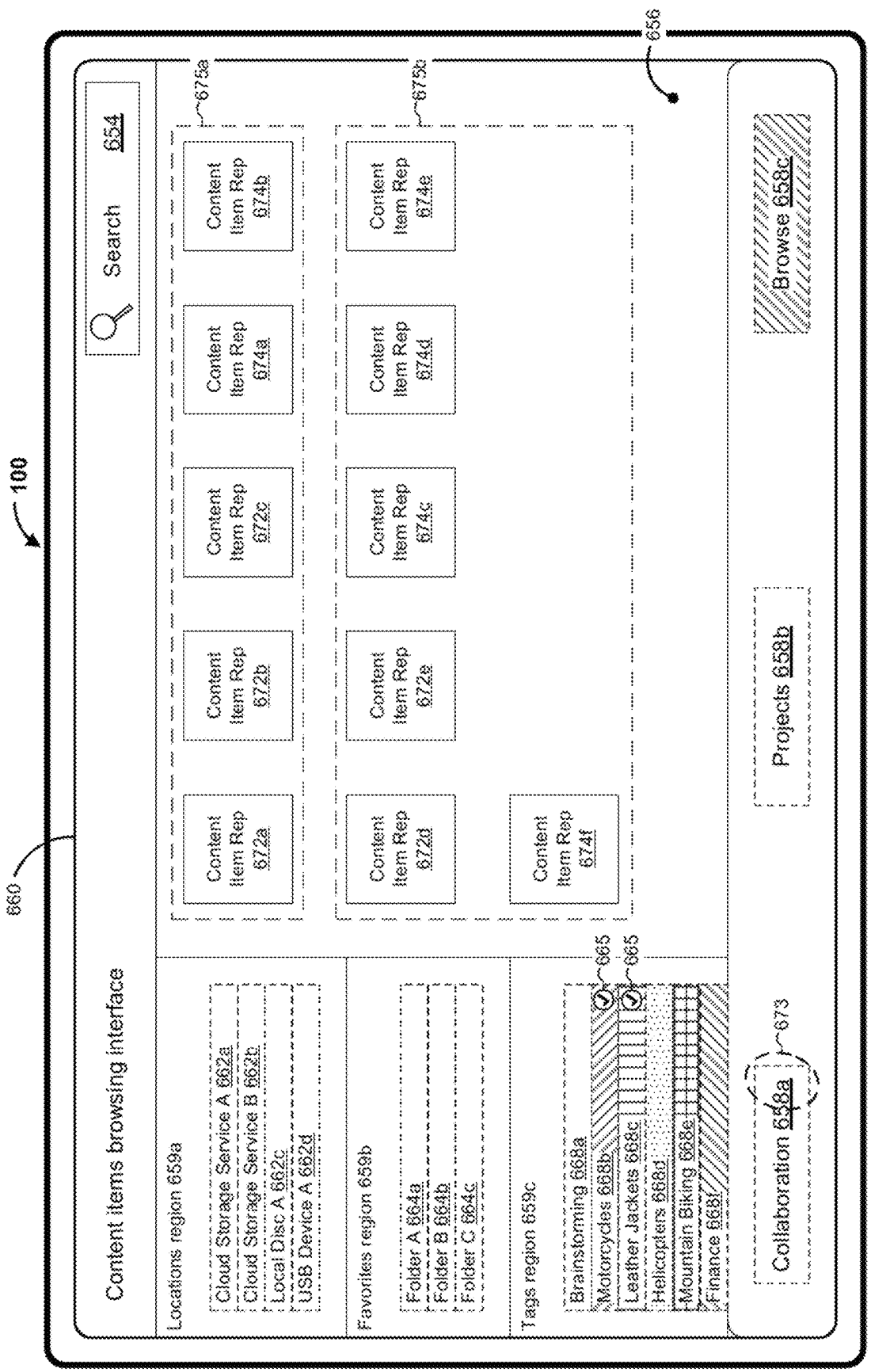
Figure 6L:
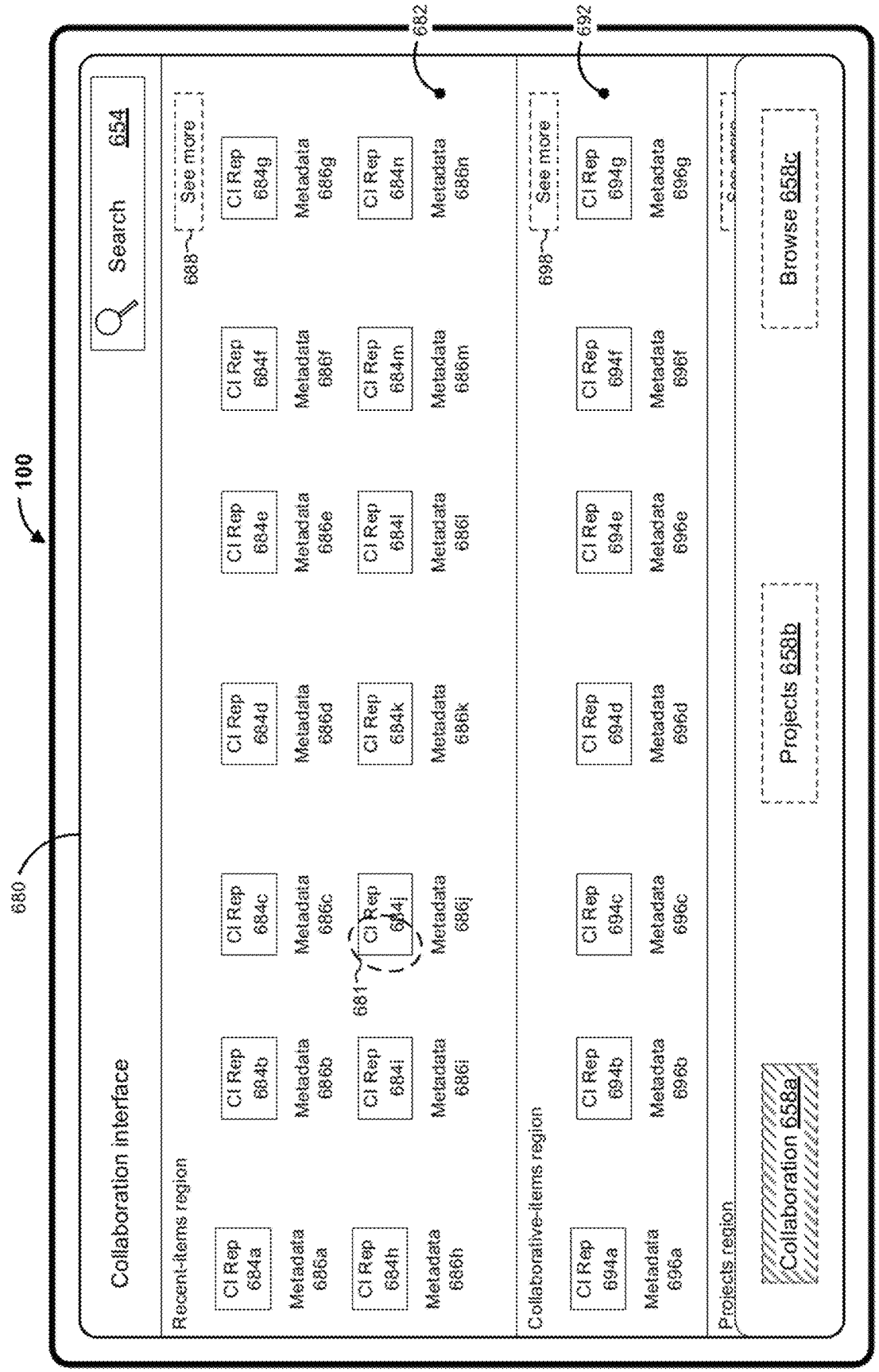

FIGS. 6I-6J show another sequence in which the content item representations displayed within the content item browsing interface are further filtered based on selected tag(s). FIG. 6I also illustrates detecting a contact 669 (e.g., a tap/selection gesture) at a location that corresponds to the selectable filter affordance 668b (e.g., associated with the "Motorcycles" tag). FIG. 6J illustrates displaying content item representations 672a, 672b, 672c, 672d, and 672e (sometimes collectively referred to herein as the "representations 672") within the primary region 656 in response to detecting the selection of the selectable filter affordance 668b in FIG. 6I. For example, the content items that correspond to the representations 672 are associated with the now-selected selectable filter affordance 668b (e.g., the "Motorcycles" tag). As shown in FIG. 6J, the selectable filter affordance 668b associated with the "Motorcycles" tag is currently selected as indicated by the indicator 665 (e.g., a check mark icon).

FIGS. 6J-6K show yet another sequence in which the content item representations displayed within the content item browsing interface are further filtered based on selected tag(s). FIG. 6J also illustrates detecting a contact 671 (e.g., a tap/selection gesture) at a location that corresponds to the selectable filter affordance 668c (e.g., associated with the "Leather Jackets" tag). FIG. 6K illustrates displaying content item representations 674a, 674b, 674c, 674d, 674e, and 674f (sometimes collectively referred to herein as the "representations 674") within the primary region 656 in response to detecting the selection of the selectable filter affordance 668c in FIG. 6J. For example, the content items that correspond to the representations 674 are associated with the now-selected selectable filter affordance 668c (e.g., the "Leather Jackets" tag). As shown in FIG. 6K, the selectable filter affordance 668c associated with the "Leather Jackets" tag is currently selected as indicated by the indicator 665 (e.g., a check mark icon).

As shown in FIG. 6K, the primary region 656 is sorted such that a first subset 675a of the representations 672 and 674 (e.g., the content item representations 672a, 672b, 672c, 674a, and 674b) that correspond to content items associated with both the "Motorcycles" tag and the "Leather Jackets" tag is displayed at the top of the primary region 656. As shown in FIG. 6K, a second subset 675b of the representations 672 and 674 (e.g., the content item representations 672d, 672e, 674c, 674d, 674e, and 674f) that correspond to content items associated with one of the "Motorcycles" tag or the "Leather Jackets" tag (but not both) are displayed below the first subset 675a within the primary region 656.

FIGS. 6K-6L show a sequence in which the content item browsing interface is replaced with a collaboration interface. FIG. 6K also illustrates detecting a contact 673 (e.g., a tap/selection gesture) at a location that corresponds to the collaboration view affordance 658a. FIG. 6L illustrates replacing display of the content items browsing interface 660 with the collaboration interface 680 in response to detecting the selection of the collaboration view affordance 658a in FIG. 6K. As shown in FIG. 6L, the collaboration interface 680 includes: a recent-items region 682 with a plurality of representations of a plurality of recently modified content items, and a collaborative-items region 692 with a plurality of representations of a plurality of jointly accessible content items that are jointly accessible by other users. According to some embodiments, the recent-items region 682 includes representations of one or more content items that are not jointly accessible by the other users.

As shown in FIG. 6L, the recent-items region 682 includes content item representations (CI Reps) 684a, 684b, 684c, 684d, 684e, 684f, 684g, 684h, 684i, 684j, 684k, 684l, 684m, and 684n (sometimes collectively referred to herein as the "representations 684") and associated metadata 686a, 686b, 686c, 686d, 686e, 686f, 686g, 686h, 686i, 686j, 686k, 686l, 686m, and 686n. For example, the metadata includes the name, size, location, modification date, creation date, creator's name, and/or the like for the associated content item. In FIG. 6L, the recent-items region 682 also includes a "See more" affordance 688 provided to see additional representations of the plurality of recently modified content items in response to selection thereof (e.g., with a tap/selection gesture).

As shown in FIG. 6L, the collaborative-items region 692 includes content item representations (CI Reps) 694a, 694b, 694c, 694d, 694e, 694f, and 694g (sometimes collectively referred to herein as the "representations 694") and associated metadata 696a, 696b, 696c, 696d, 696e, 696f, and 696g. For example, the metadata includes the name, size, location, modification date, creation date, creator's name, and/or the like for the associated content item. In FIG. 6L, the collaborative-items region 692 also includes a "See more" affordance 698 provided to see additional representations of the plurality of jointly accessible content items in response to selection thereof (e.g., with a tap/selection gesture).

In some embodiments, the representations 684 and 694 correspond to icons indicating a file type of the associated content items. In some embodiments, the representations 684 and 694 correspond to thumbnail images/previews of the associated content items. In some embodiments, metadata associated with corresponding content items is displayed proximate to each of the representations 684 and 694.

Figure 6M:
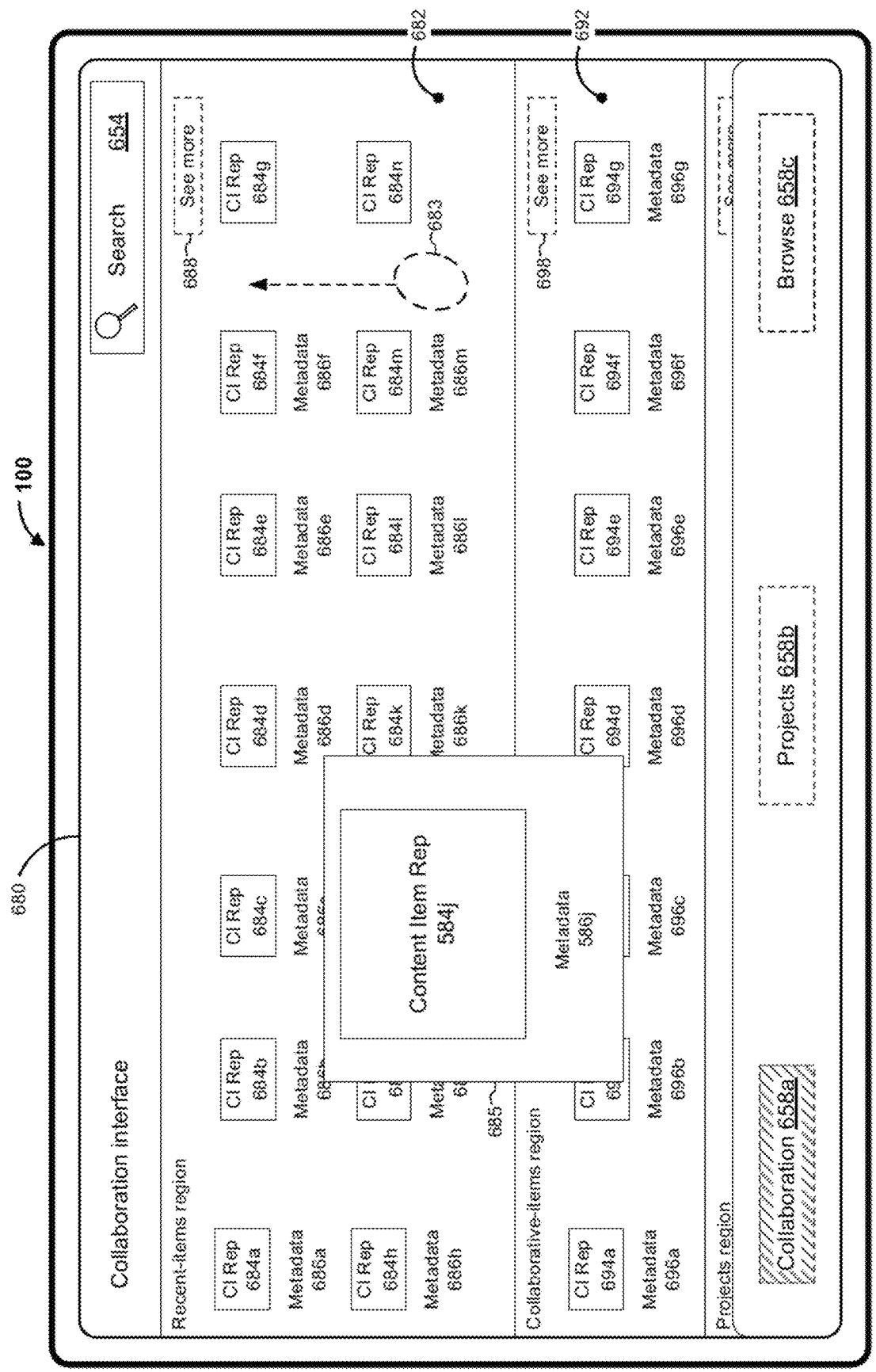

FIGS. 6L-6M show a sequence in which a content preview interface is overlaid on the collaboration interface. FIG. 6L also illustrates detecting a contact 681 (e.g., a tap/selection gesture) at a location that corresponds to the content item representation 684j. FIG. 6M illustrates displaying a content preview interface 685 in response to detecting the selection of the content item representation 684*j* in FIG. 6L. As shown in FIG. 6M, the content preview interface 685 corresponds to the content item associated with the content item representation 684*j*.

Figure 6N:
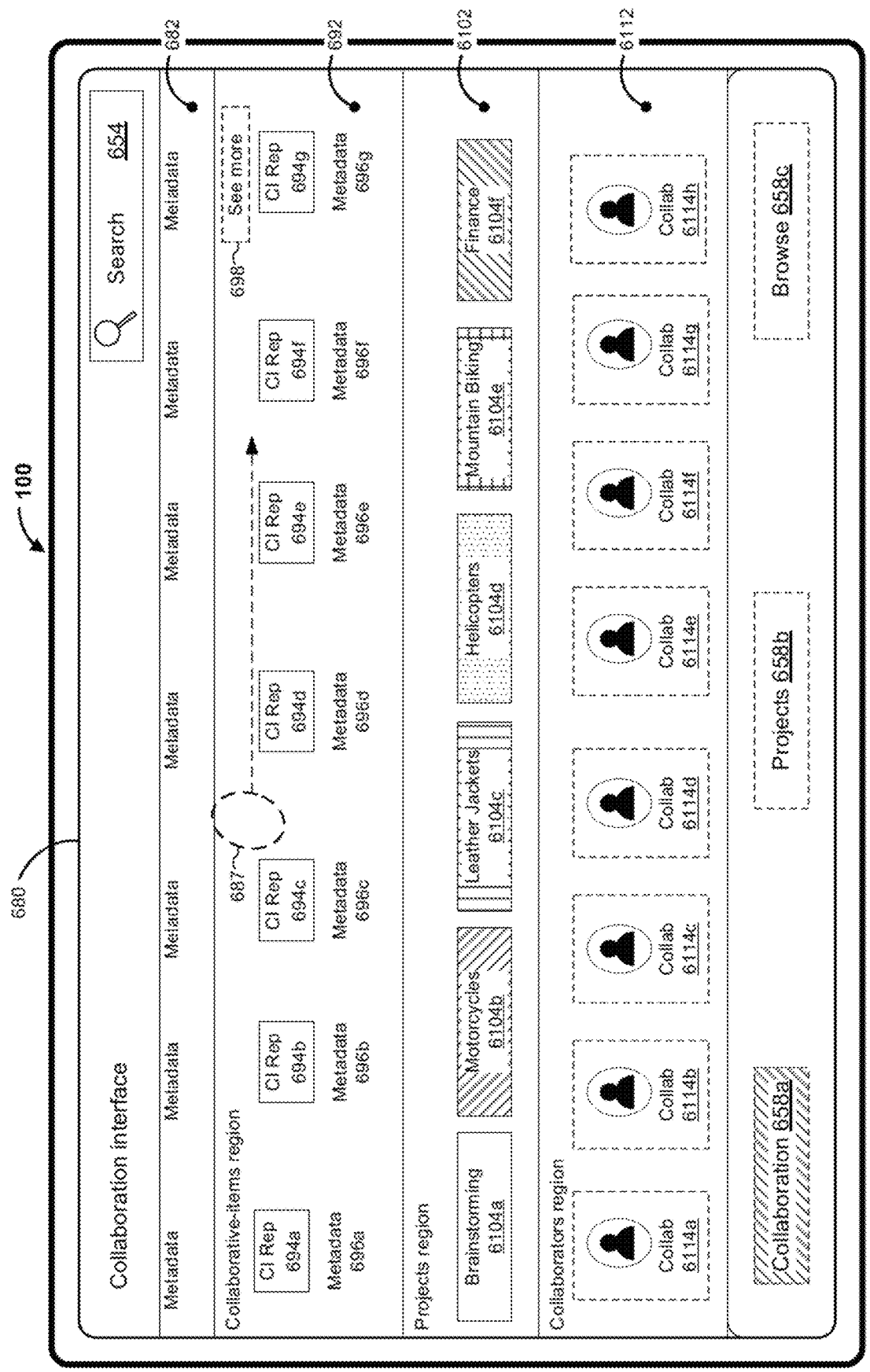
Figure 60:
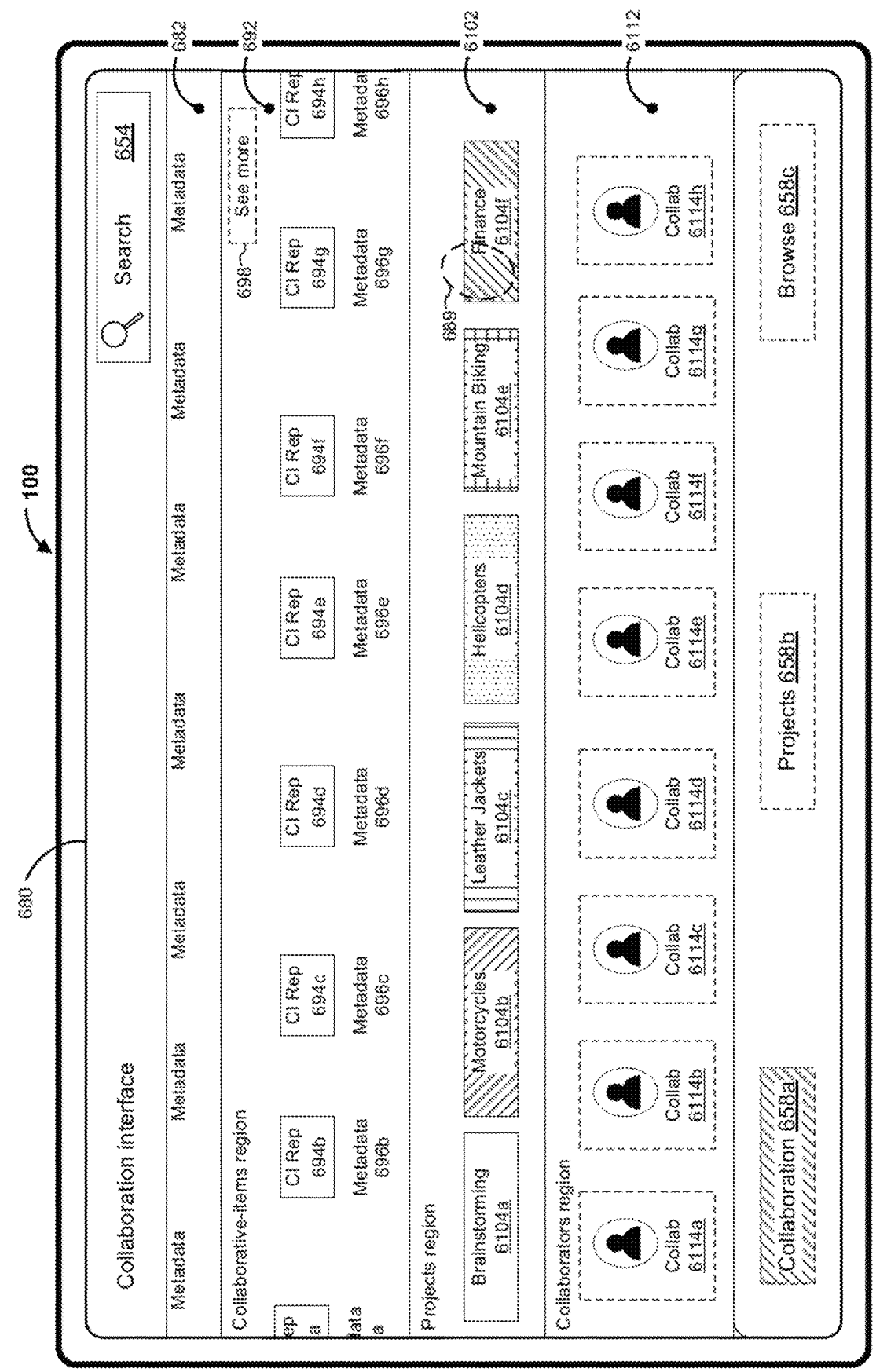

FIGS. 6M-6N show a sequence in which the collaboration interface is scrolled in a vertical direction. FIG. 6M also illustrates detecting a first scrolling gesture (e.g., a swipe or tap-and-drag gesture) with a contact 683 in a first direction (e.g., vertical) within the collaboration interface 680. FIG. 6N illustrates scrolling the collaboration interface 680 in a downward direction in response to detecting the first scrolling gesture in FIG. 6M. As shown in FIG. 6N, the collaboration interface 680 includes a projects region 6102 and a collaborators region 6112.

Figure 6P:
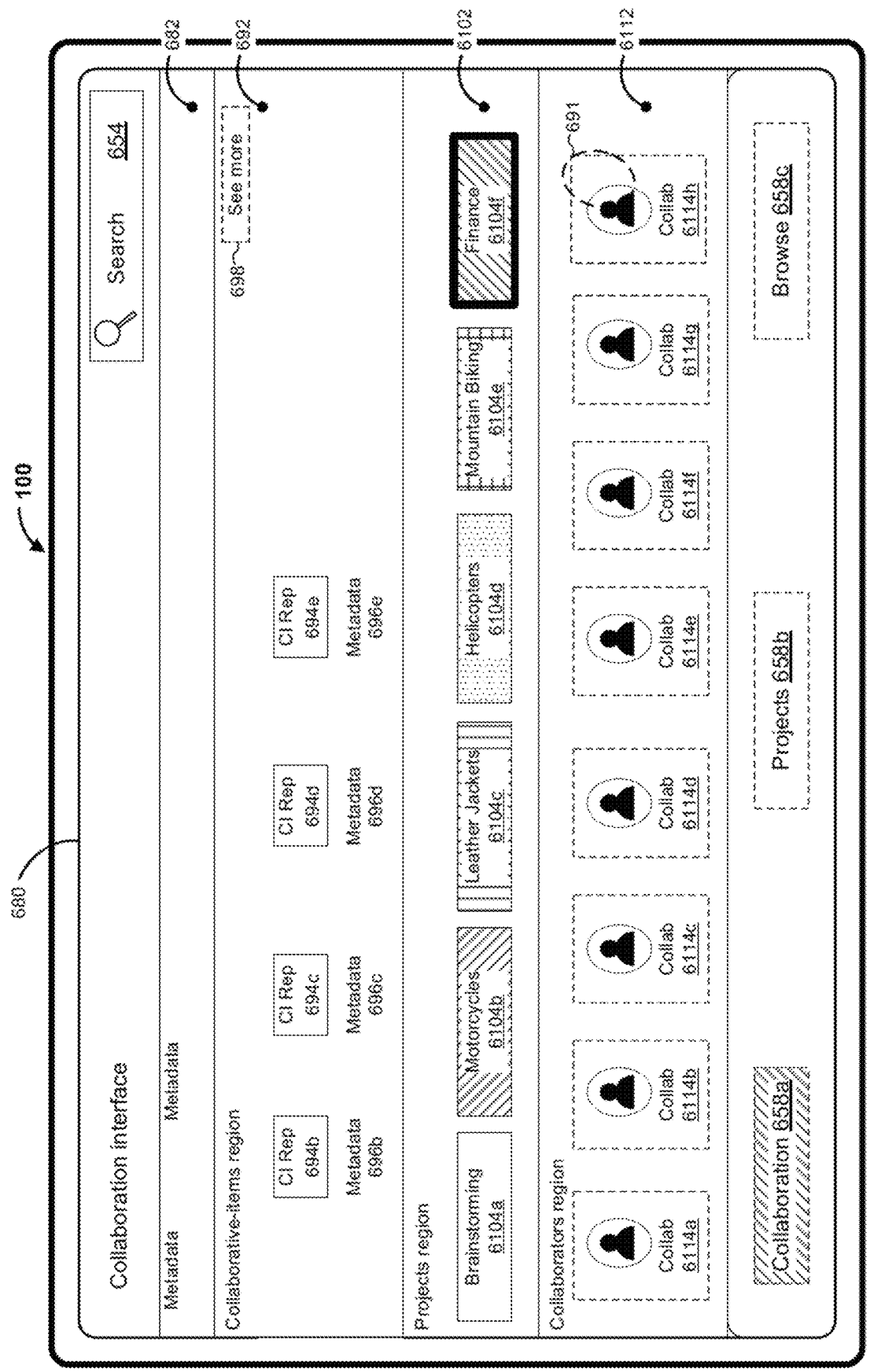

As shown in FIG. 6N, the projects region 6102 includes a plurality of selectable tags 6104*a*, 6104*b* 6104*c*, 6104*d*, 6104*e*, and 6104*f* (sometimes collectively referred to herein as the "tags 6104"). According to some embodiments, in response to selection of one of the tags 6104, and in accordance with a determination that the selection input satisfies first criteria (e.g., tap gesture, etc.), the device 100 filters the representations 684 shown in the recent-items region 682 and the representations 694 shown in the collaborative-items region 692 to include representations for content items associated with the selected tag (e.g., as shown in FIGS. 6O-6P). According to some embodiments, in response to selection of one of the tags 6104, and in accordance with a determination that the selection input satisfies second criteria (e.g., a double-tap gesture, long press gesture, deep press gesture, etc.), the device 100 replaces display of the collaboration interface 680 with the projects interface 6130.

According to some embodiments, the tags 6104 are associated with the content items that correspond to the representations 684 and 694. In another example, the tags 6104 correspond to frequently used tags, recently used tags, and/or the like. According to some embodiments, each of the tags 6104 corresponds to a category or subject. According to some embodiments, each of the tags 6104 is associated with a color, pattern, and/or appearance. In some embodiments, each of the tags 6104 is associated with a unique color, pattern, and/or appearance.

As shown in FIG. 6N, the collaborators region 6112 includes selectable collaborator representations 6114*a*, 6114*b* 6114*c*, 6114*d*, 6114*e*, 6114*f*, 6114*g*, and 6114*h* (sometimes collectively referred to herein as the "collaborator representations 6114"). In some embodiments, each of the collaborator representations 6114 corresponds to person with access to the content items that correspond to the representations 694 within the collaborative-items region 692. For example, a project supervisor authorizes and/or invites users to work and collaborate on a project. In this example, the authorized/invited users are given read and/or write access to the jointly accessible content items that correspond to the representations 694 within the collaborative-items region 692. In some embodiments, each of the collaborator representations 6114 includes an image, avatar, or portrait of a corresponding collaborator. In some embodiments, metadata is displayed proximate to each of the collaborator representations 6114. For example, the metadata includes the associated collaborator's name, title, access privileges, phone number, email address, residential address, office location, availability, and/or the like.

Figure 6Q:
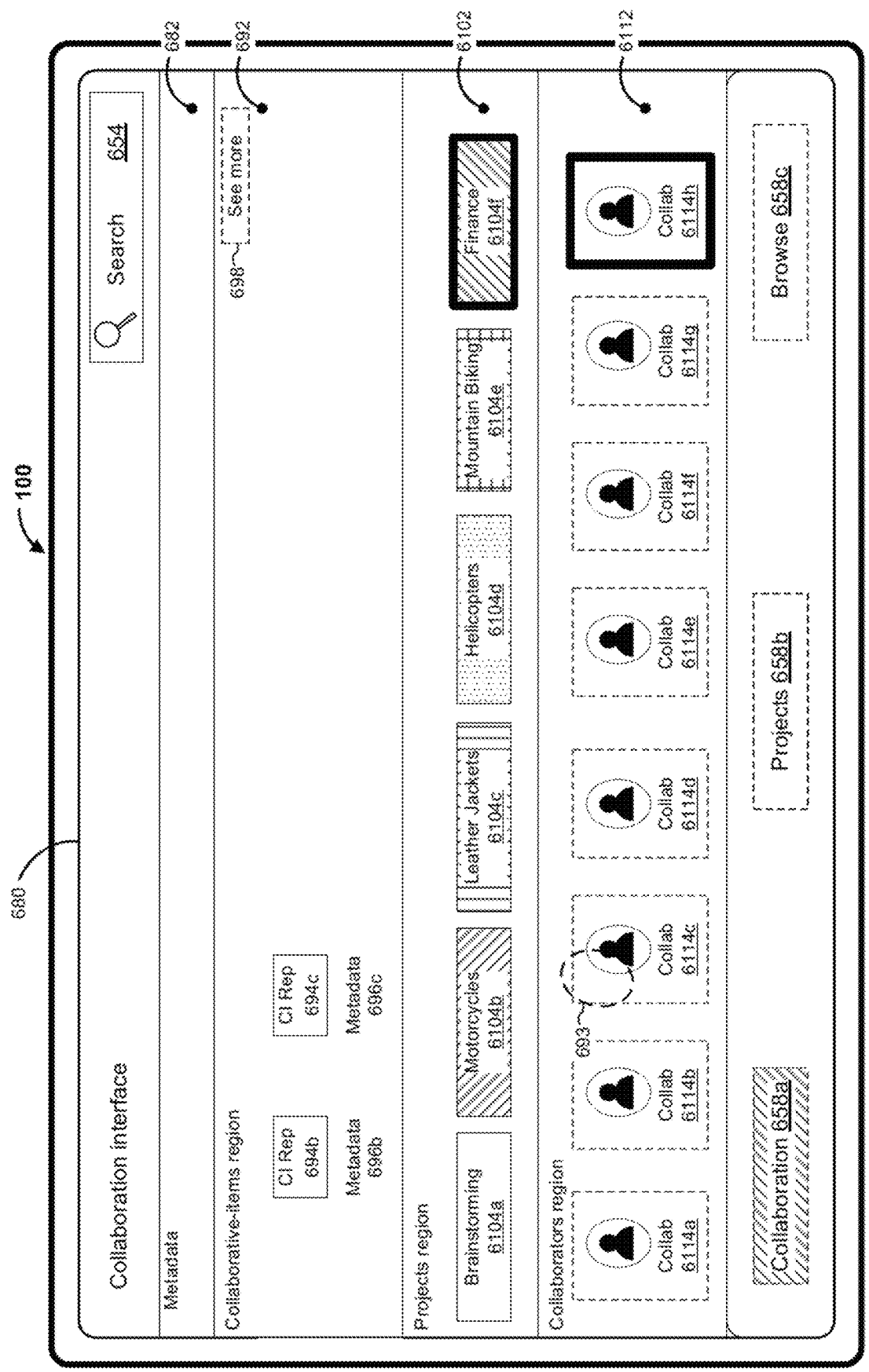
Figure 6R:
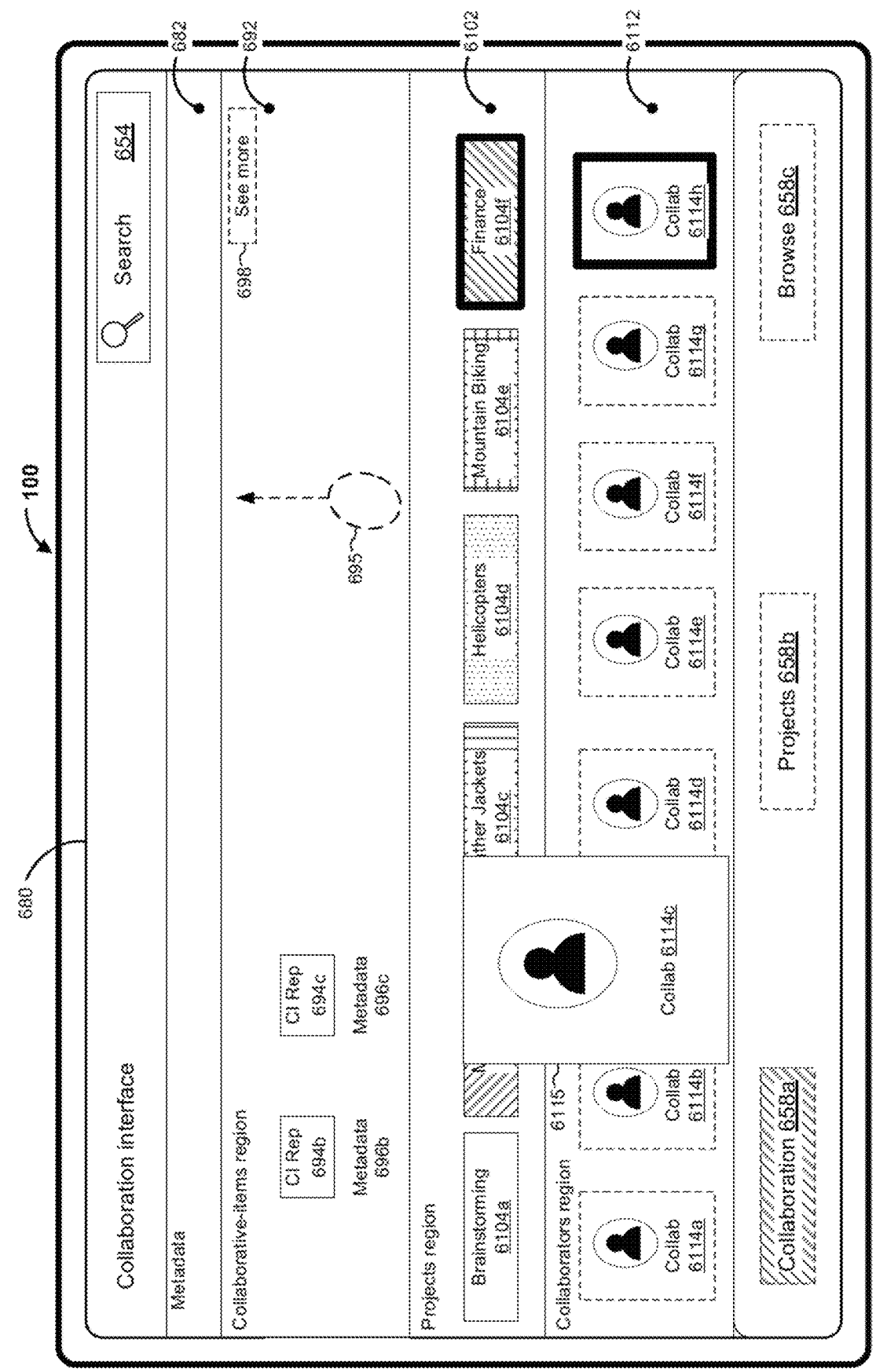
Figure 6S:
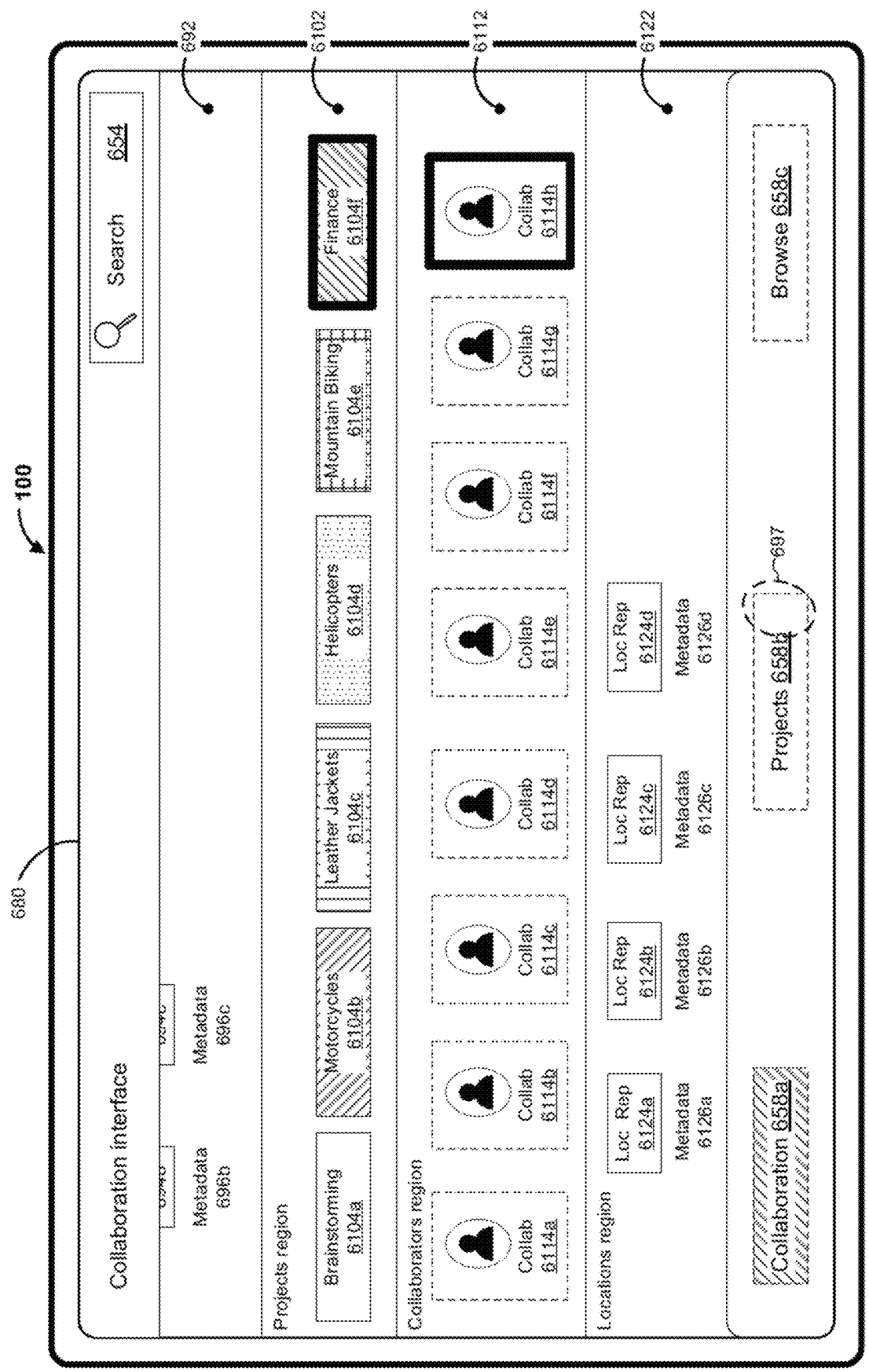
Figure 6T:
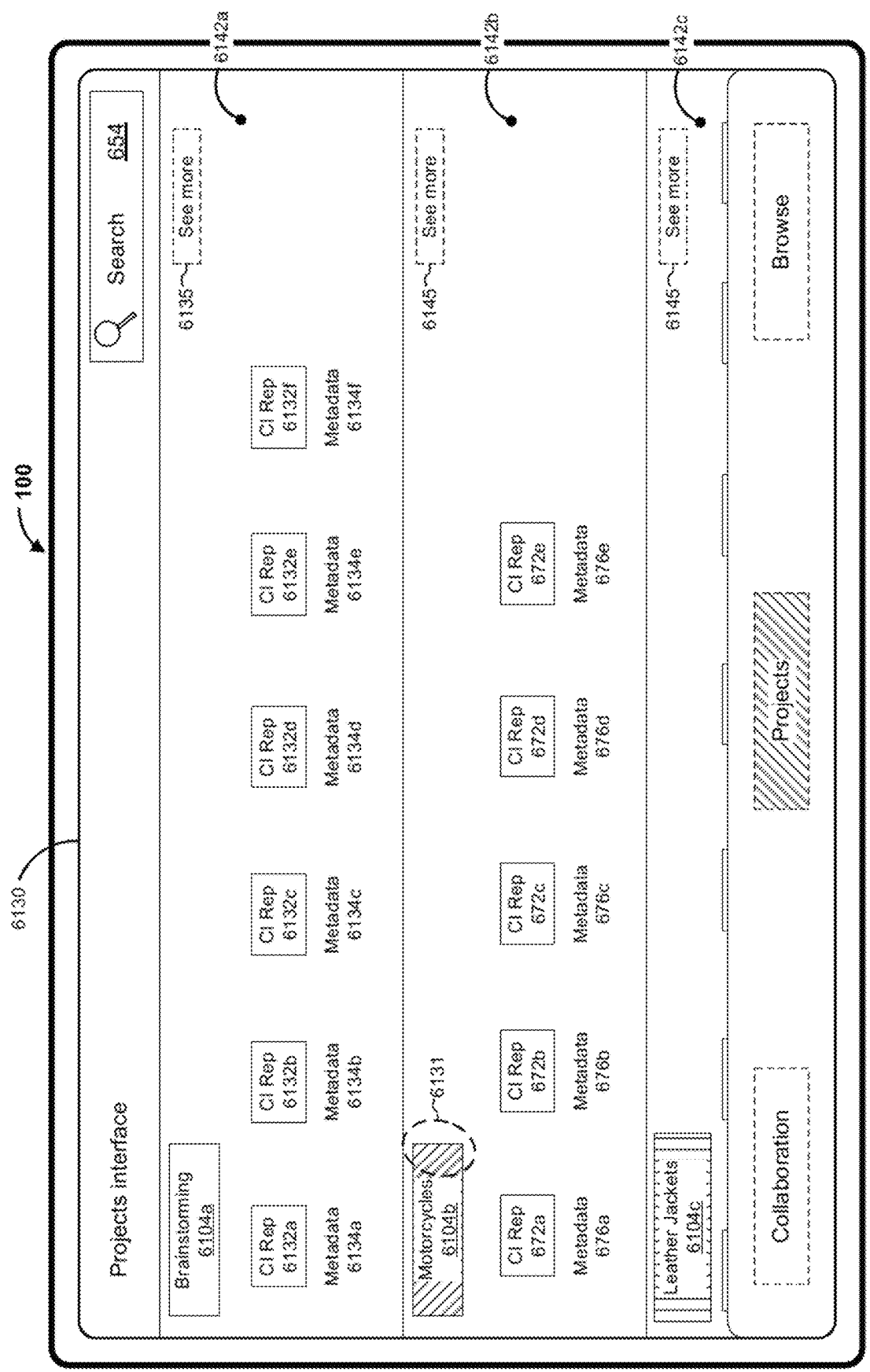
Figure 6U:
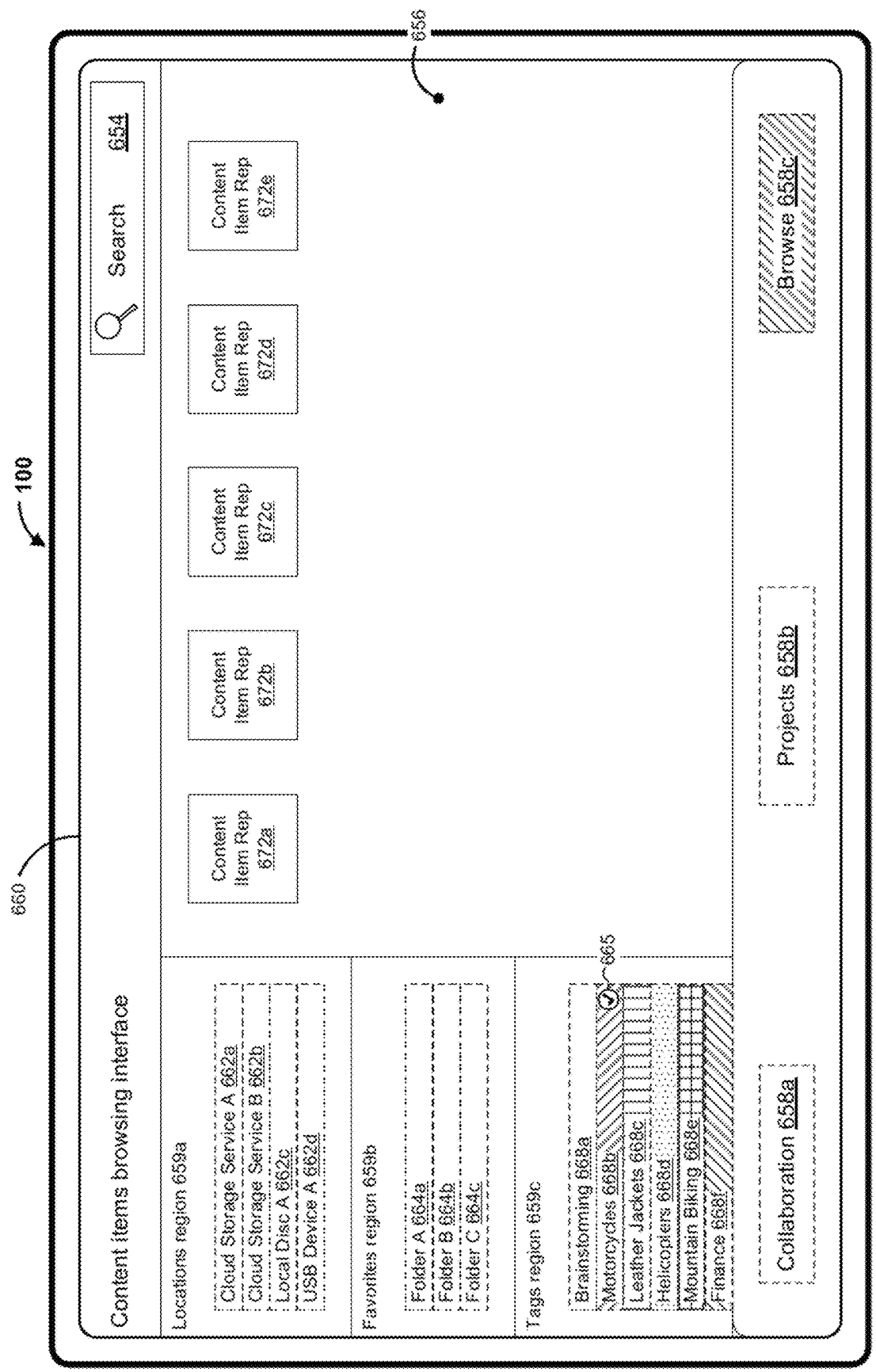

According to some embodiments, in response to selection of one of the collaborator representations 6114, and in accordance with a determination that the selection input satisfies first criteria (e.g., tap gesture, etc.), the device 100 filters the representations 684 shown in the recent-items region 682 and the representations 694 shown in the collaborative-items region 692 to include representations for content items associated with the selected collaborator (e.g., as shown in FIGS. 6P-6Q). According to some embodiments, in response to selection of one of the collaborator representations 6114, and in accordance with a determination that the selection input satisfies second criteria (e.g., a double-tap gesture, long press gesture, deep press gesture, etc.), the device 100 displays a user information interface 6115 that correspond to the selected collaborator overlaid on the collaboration interface 680 (e.g., as shown in FIGS. 6Q-6R).

FIGS. 6N-6O show a sequence in which the collaborative-items region of the collaboration interface is scrolled in a horizontal direction. FIG. 6N also illustrates detecting a second scrolling gesture (e.g., a swipe or tap-and-drag gesture) with a contact 687 in a second direction (e.g., horizontal) within the collaborative-items region 692. FIG. 6O illustrates scrolling the collaborative-items region 692 in a right-to-left direction in response to detecting the second scrolling gesture in FIG. 6N. As shown in FIG. 6O, the collaborative-items region 692 has been updated to show a portion of a content item representation 694*h* and associated metadata 696*h*.

FIGS. 6O-6P show a sequence in which the content item representations displayed within the collaborative-items region of the collaboration interface are filtered based on selected tag(s). FIG. 6O also illustrates detecting a contact 689 (e.g., a tap/selection gesture) at a location that corresponds to the "Finance" tag 6104*f* FIG. 6P illustrates filtering the representations 684 shown in the recent-items region 682 and the representations 694 shown in the collaborative-items region 692 to include representations for content items associated with the "Finance" tag 6104*f* in response to detecting the selection of the "Finance" tag 6104*f* in FIG. 6O that satisfies the first criteria. As shown in FIG. 6P, the collaborative-items region 692 has been updated to include content item representations 694*b*, 694*c*, 694*d*, and 694*e*.

FIGS. 6P-6Q show a sequence in which the content item representations displayed within the collaborative-items region of the collaboration interface are further filtered based on selected collaborator(s). FIG. 6P also illustrates detecting a contact 691 (e.g., a tap/selection gesture) at a location that corresponds to the collaborator representation 6114*h*. FIG. 6Q illustrates filtering the representations 684 shown in the recent-items region 682 and the representations 694 shown in the collaborative-items region 692 to include representations for content items associated with the "Finance" tag 6104*f* and the collaborator representation 6114*h* in response to detecting the selection of the "collaborator representation 6114*h* in FIG. 6P that satisfies the first criteria.

As shown in FIG. 6Q, the collaborative-items region 692 has been updated to include content item representations 694*b* and 694*c*. According to some embodiments, the collaborative-items region 692 is updated to show content item representations for content items that match both the "Finance" tag 6104*f* and the collaborator representation 6114*h*. According to some embodiments, the collaborative-items region 692 is updated to show content item representations for content items that match the "Finance" tag 6104*f* or the collaborator representation 6114*h*. According to some embodiments, the collaborative-items region 692 is updated to show content item representations for content items that match the "Finance" tag 6104f and/or the collaborator representation 6114h.

FIGS. 6Q-6R show a sequence in which a user information interface is overlaid on the collaboration interface. FIG. 6Q also illustrates detecting a contact 693 (e.g., a tap/selection gesture) at a location that corresponds to the collaborator representation 6114c. FIG. 6R illustrates displaying a user information interface 6115 overlaid on the collaboration interface 680 in response to detecting the selection of the collaborator representation 6114c in FIG. 6Q that satisfies the second criteria. As shown in FIG. 6R, the user information interface 6115 includes user information for a respective collaborator that correspond to the collaborator representation 6114c. For example, the user information includes metadata such as the name, title, access details, phone number, email address, residential address, office location, availability, and/or the like for the respective collaborator.

FIGS. 6R-6S show another sequence in which the collaboration interface is scrolled in a vertical direction. FIG. 6R also illustrates detecting a third scrolling gesture (e.g., a swipe or tap-and-drag gesture) with a contact 695 in the first direction (e.g., vertical) within the collaboration interface 680. FIG. 6S illustrates scrolling the collaboration interface 680 in a downward direction in response to detecting the third scrolling gesture in FIG. 6R. As shown in FIG. 6S, the collaboration interface 680 includes a locations region 6122. In FIG. 6S, the locations region 6122 includes storage location representations 6124a, 6124b, 6124c, and 6124d (sometimes collectively referred to herein as the "location representations 6124") and associated metadata 6126a, 6126b, 6126c, and 6126d for different storage locations (e.g., cloud storage services, local storage devices, remote storage devices, and/or attached/peripheral storage devices such as USB devices). For example, the associated metadata includes an indication of access privileges, total capacity, free space, uptime, storage device name, storage device type, and/or the like.

FIGS. 6S-6T show a sequence in which the collaboration interface is replaced with a projects interface. FIG. 6S also illustrates detecting a contact 697 (e.g., a tap/selection gesture) at a location that corresponds to the projects view affordance 658b. FIG. 6T illustrates replacing display of the collaboration interface 680 with the projects interface 6130 in response to detecting the selection of the projects view affordance 658b in FIG. 6S. As shown in FIG. 6T, the projects interface 6130 includes: a first project region 6142a associated with the "Brainstorming" tag 6104a, a second project region 6142b associated with the "Motorcycles" tag 6104b, and a third project region 6142c associated with the "Leather Jackets" tag 6104c.

In FIG. 6T, the first project region 6142a includes content item representations 6132a, 6132b, 6132c, 6132d, 6132e, and 6132f and associated metadata 6134a, 6134a, 6134c, 6134d, 6134e, and 6134f that correspond to content items associated with the "Brainstorming" tag 6104a. In FIG. 6T, the second project region 6142b includes content item representations 672a, 672b, 672c, 672d, and 672e (sometimes collectively referred to herein as the "representations 672") and associated metadata 676a, 676b, 676c, 676d, and 676e that correspond to content items associated with the "Motorcycles" tag 6104b (e.g., similar to representations 672 shown in FIG. 6J). For example, the metadata includes the name, size, location, modification date, creation date, creator's name, and/or the like for the associated content items.

FIGS. 6T-6U show a sequence in which the projects interface is replaced with the content item browsing interface. FIG. 6T also illustrates detecting a contact 6131 (e.g., a tap/selection gesture) at a location that corresponds to the "Motorcycles" tag 6104b within the projects interface 6130. FIG. 6U illustrates replacing display of the projects interface 6130 with the content items browsing interface 660 in response to detecting the selection of the "Motorcycles" tag 6104b in FIG. 6T. The content items browsing interface 660 in FIG. 6U is similar to and adapted from the content items browsing interface 660 in FIG. 6J. As such, FIG. 6J and FIG. 6U include similar user interfaces and elements labeled with the same reference number in both figures have the same function, with only the differences described herein for the sake of brevity. As shown in FIG. 6U, the primary region 656 includes the representations 672 for the content items associated with the "Motorcycles" tag. As shown in FIG. 6U, the selectable filter affordance 668b associated with the "Motorcycles" tag is currently selected as indicated by the indicator 665 (e.g., a check mark icon).

FIGS. 7A-7P illustrate example user interfaces for previewing content items and tags associated with an application in accordance with some embodiments. The user interfaces in these figures are used to illustrate the process described below, including the processes in FIGS. 10A-10C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 7A illustrates displaying a home screen interface 700 associated with the operating system (OS) executed by the device 100. According to some embodiments, the home screen interface 700 is a startup, default, or landing interface. As shown in FIG. 7A, the home screen interface 700 includes a plurality of application icons 702a, 702b, 702c, 702d, 702e, 702f, 702g, and 702h (sometimes collectively referred to herein as the "application icons 702") for a plurality of applications (e.g., productivity application, media consumption applications, media creation application, finance application, games, workout application, communication applications, social media application, and/or the like) and a dock region 704 with a plurality of application icons 706a, 706b, 706c, 706d, 706e, and 706f (sometimes collectively referred to herein as the "application icons 706") for a plurality of applications (e.g., a file browser application, a music application, a word processing application, a spreadsheet application, a presentation application, a PDF viewer application, and/or the like). According to some embodiments, the application icons 702 and 706 are user customizable.

According to some embodiments, in response to detecting an input that corresponds to selecting an application icon, and in accordance with a determination that the input satisfies an application launch criterion (e.g., a click input, tap input, or the like), the device 100 launches the application associated with the selected application icon by, for example, displaying an interface or window associated with the application. According to some embodiments, in response to detecting an input that corresponds to selecting an application icon, and in accordance with a determination that the input satisfies a content preview criterion (e.g., a hover input, double click input, double tap input, long press input, deep press input, or the like), the device 100 display a preview interface for the application that corresponds to the application icon over the current interface.

Figure 7B:
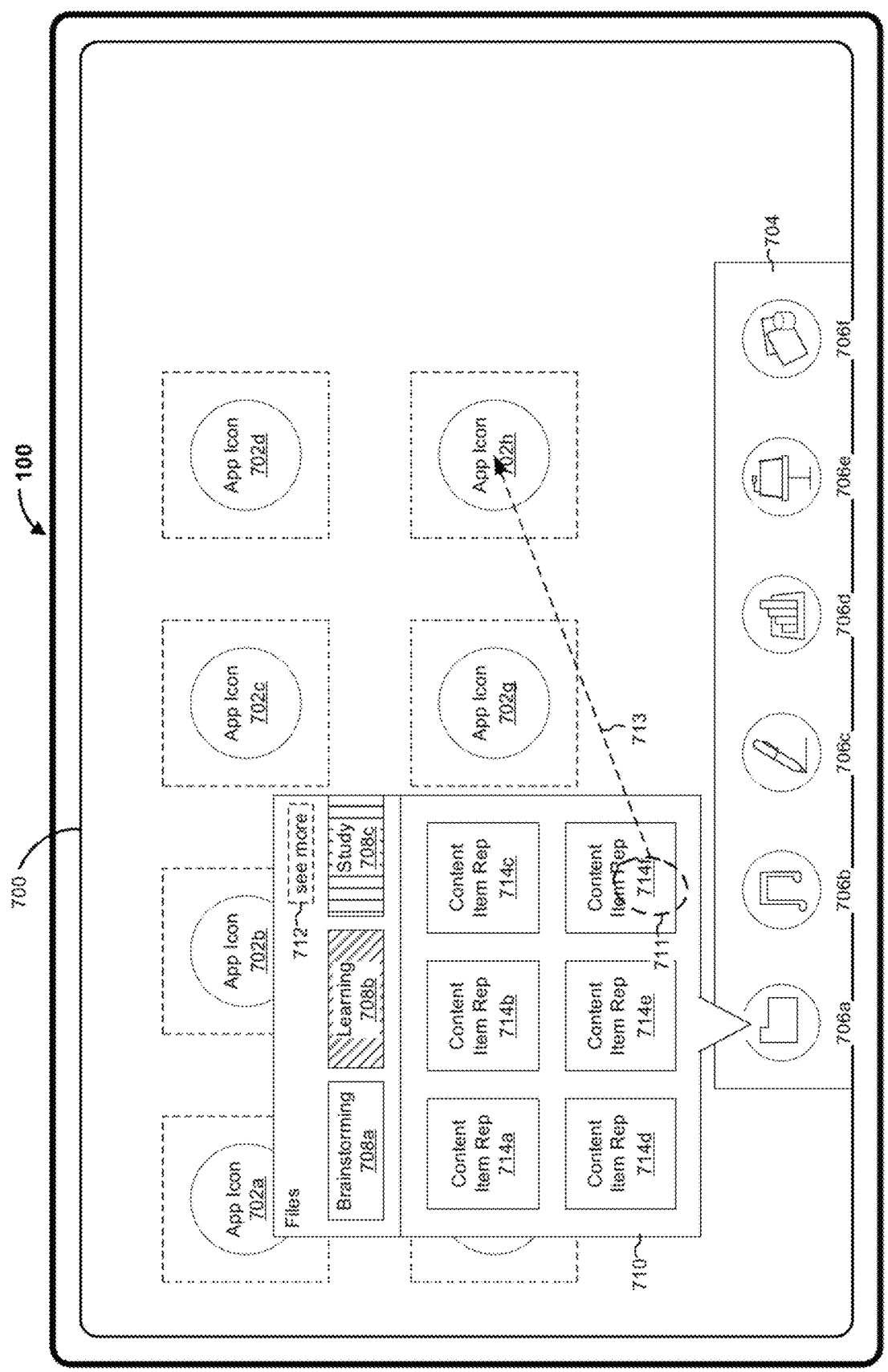

FIGS. 7A-7B show a sequence in which a preview interface is displayed over a home screen in response to detecting selection of an application icon within a dock region. FIG. 7A also illustrates detecting a contact 711 (e.g., a tap/selection gesture) at a location that corresponds to the application icon 706a within the dock region 704. FIG. 7B illustrates displaying a preview interface 710 for the file browser application that corresponds to the application icon 706a in response to detecting the selection of the application icon 706a in FIG. 7A that satisfies the content preview criterion.

As shown in FIG. 7B, the preview interface 710 for the file browser application includes a plurality of content item representations 714a, 714b, 714c, 714d, 714e, and 714f (sometimes collectively referred to herein as the "representations 714") for content items (e.g., presentations/slide-decks, notes, emails, images, messages, word processing documents, spreadsheets, audio files, videos, electronic documents, and/or the like). In another example, the representations 714 correspond to frequently viewed and/or modified content items, recently viewed and/or modified content items, and/or the like. As shown in FIG. 7B, the preview interface 710 for the file browser application also includes a plurality of tag representations 708a, 708b, and 708c (sometimes collectively referred to herein as the "representations 708") for tags.

For example, the representations 708 correspond to tags that are associated with the content items that correspond to the representations 714. In another example, the representations 708 correspond to frequently used tags, recently used tags, and/or the like. According to some embodiments, each of the representations 708 is associated with a tag that corresponds to a category or subject. According to some embodiments, each of the representations 708 is associated with a tag that corresponds to a color, pattern, and/or appearance. For example, each of the associated tags has a unique color, pattern, and/or appearance. As shown in FIG. 7B, the preview interface 710 for the file browser application further includes a "see more" affordance 712 provided to launch the file browser application in response to selection thereof (e.g., with a tap/selection gesture).

Figure 7C:
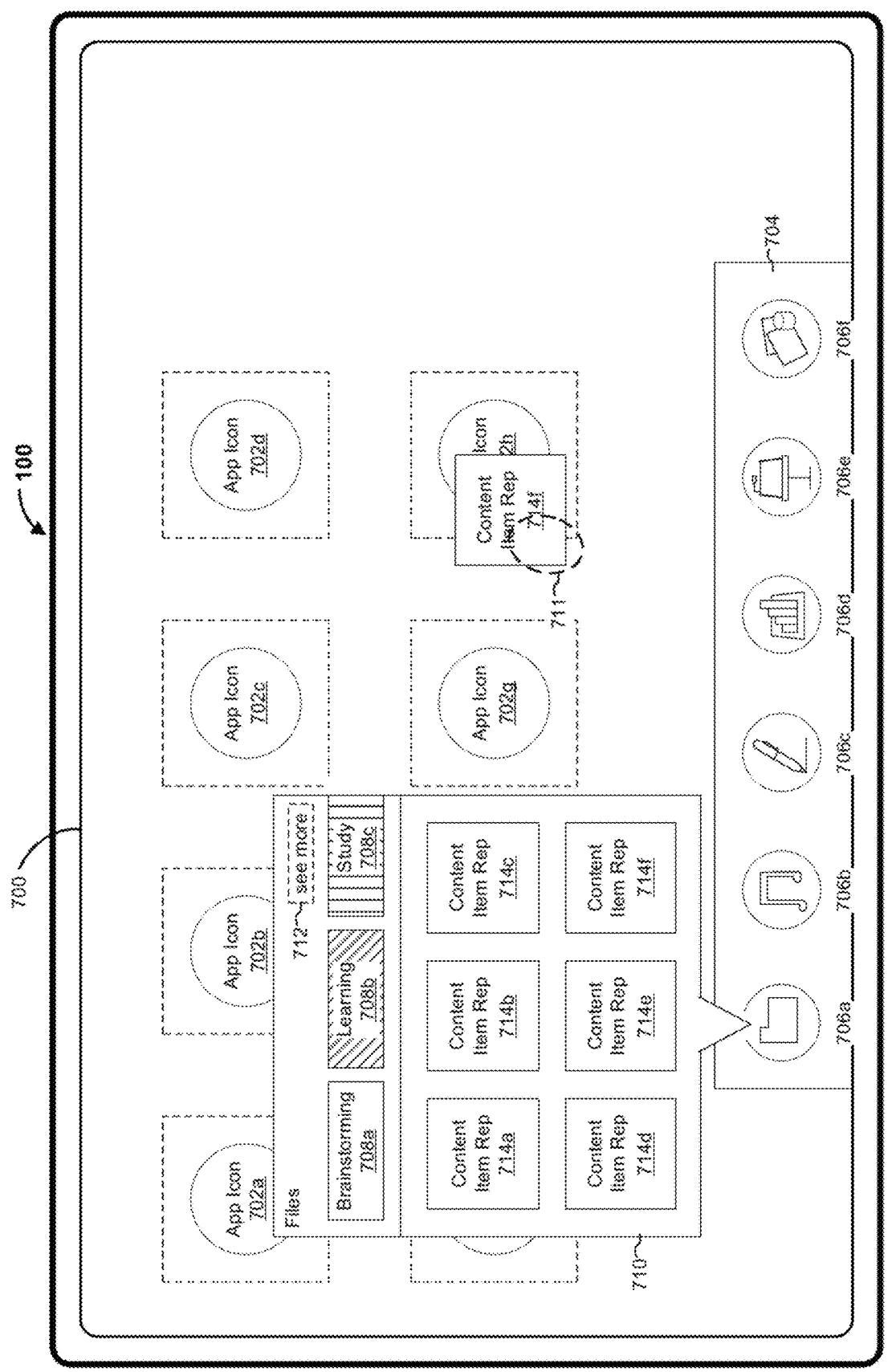
Figure 7D:
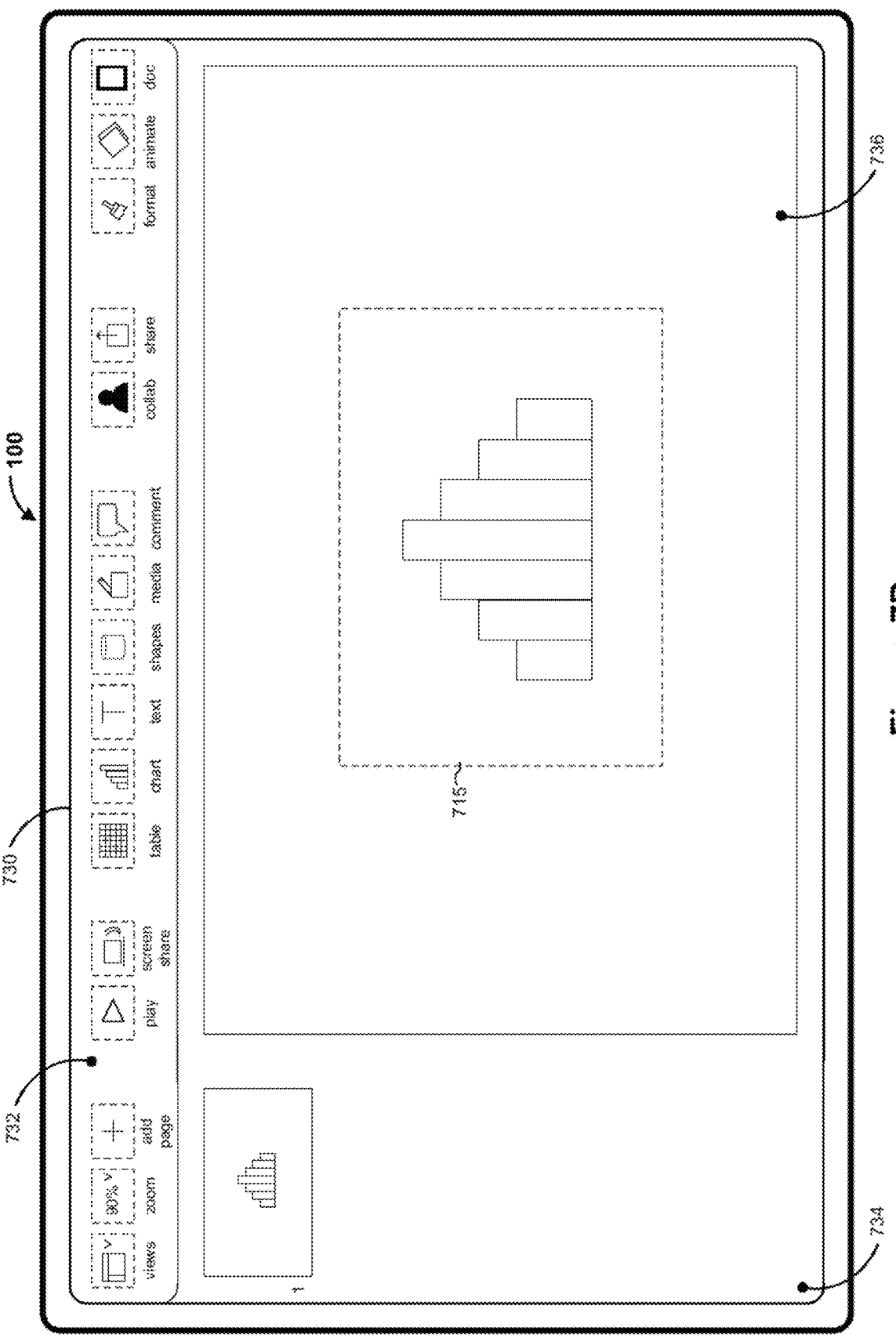

FIGS. 7B-7D show a sequence in which a respective application is launched in response to detecting a drag-and-drop gesture where a content item representation is dragged out of the preview interface and dropped over an application icon associated with the respective application. FIG. 7B also illustrates detecting a drag-and-drop gesture with a contact 711 according to motion vector 713 where the content item representation 714f (e.g., associated with an image) is dragged out of the preview interface 710 for the file browser application and dropped over the application icon 702h. FIG. 7C illustrates displaying the content item representation 714f over the application icon 702h prior to lift-off of the contact 711.

FIG. 7D illustrates displaying a presentation creation interface 730 in response to the drag-and-drop gesture in FIGS. 7B-7C that resulted in dropping the content item representation 714f over the application icon 702h. In some embodiments, the presentation creation interface 730 is associated with a presentation creation application executed by the device 100. According to some embodiments, the presentation creation interface 730 is provided to create and/or edit content items such as slide-decks, slideshows, presentations, and/or the like. As shown in FIG. 7D, the presentation creation interface 730 includes: a toolbar region 732 with a plurality of tool affordances provided to perform operations on the content item (e.g., the slide-deck, slide-show, or presentation), a content preview region 734 with a plurality of representations of sub-items (e.g., slides) that comprise the content item, and a content entry region 736 associated with a current sub-item (e.g., a respective slide). As shown in FIG. 7D, the content entry region 736 includes a content item 715 (e.g., an image) that corresponds to the content item representation 714f in FIGS. 7B-7C.

Figure 7E:
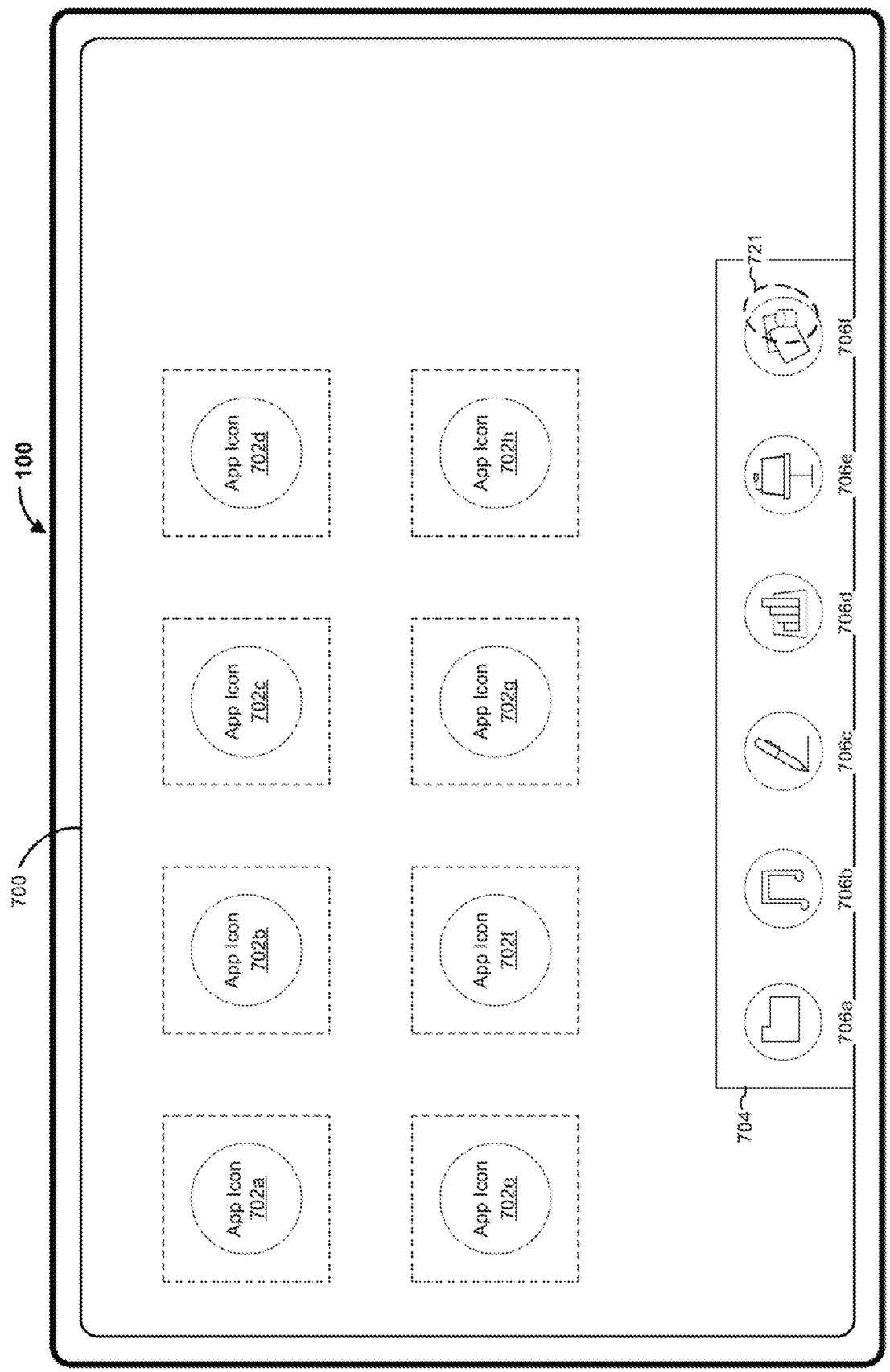
Figure 7F:
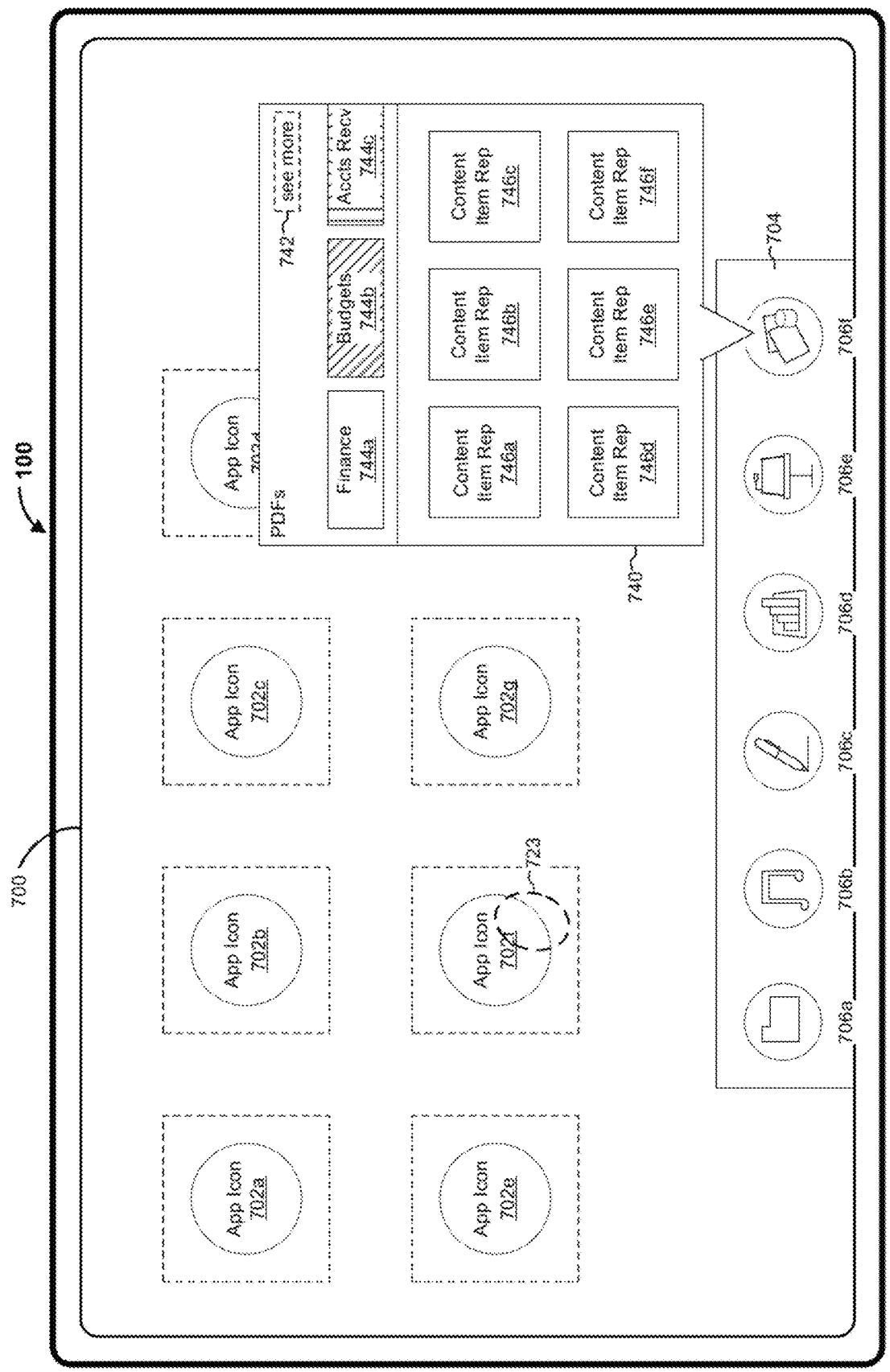

FIGS. 7E-7F show another sequence in which a preview interface is displayed over a home screen in response to detecting selection of another application icon within the dock region. The home screen interface 700 in FIG. 7E is similar to and adapted from the home screen interface 700 in FIG. 7A. As such, FIG. 7A and FIG. 7E include similar user interfaces and elements labeled with the same reference number in both figures have the same function, with only the differences described herein for the sake of brevity. FIG. 7E illustrates detecting a contact 721 (e.g., a tap/selection gesture) at a location that corresponds to the application icon 706f within the dock region 704. FIG. 7F illustrates displaying a preview interface 740 for the PDF viewer application that corresponds to the application icon 706f in response to detecting the selection of the application icon 706f in FIG. 7E that satisfies the content preview criterion.

As shown in FIG. 7F, the preview interface 740 for the PDF viewer application includes a plurality of content item representations 746a, 746b, 746c, 746d, 746e, and 746f (sometimes collectively referred to herein as the "representations 746") for content items (e.g., electronic documents) associated with the PDF view application. For example, the representations 746 are sorted based on how frequently and/or recently the associated content items have been viewed and/or modified. As shown in FIG. 7F, the preview interface 740 for the PDF viewer application also includes a plurality of tag representations 744a, 744b, and 744c (sometimes collectively referred to herein as the "representations 744") for tags.

For example, the representations 744 correspond to tags that are associated with the content items that corresponds to the representations 746. In another example, the representations 746 correspond to frequently used tags, recently used tags, and/or the like. According to some embodiments, each of the representations 744 is associated with a tag that corresponds to a category or subject. According to some embodiments, each of the representations 744 is associated with a tag that corresponds to a color, pattern, and/or appearance. For example, each of the associated tags has a unique color, pattern, and/or appearance. As shown in FIG. 7F, the preview interface 740 for the PDF viewer application further includes a "see more" affordance 742 provided to launch the PDF viewer application in response to selection thereof (e.g., with a tap/selection gesture).

Figure 7G:
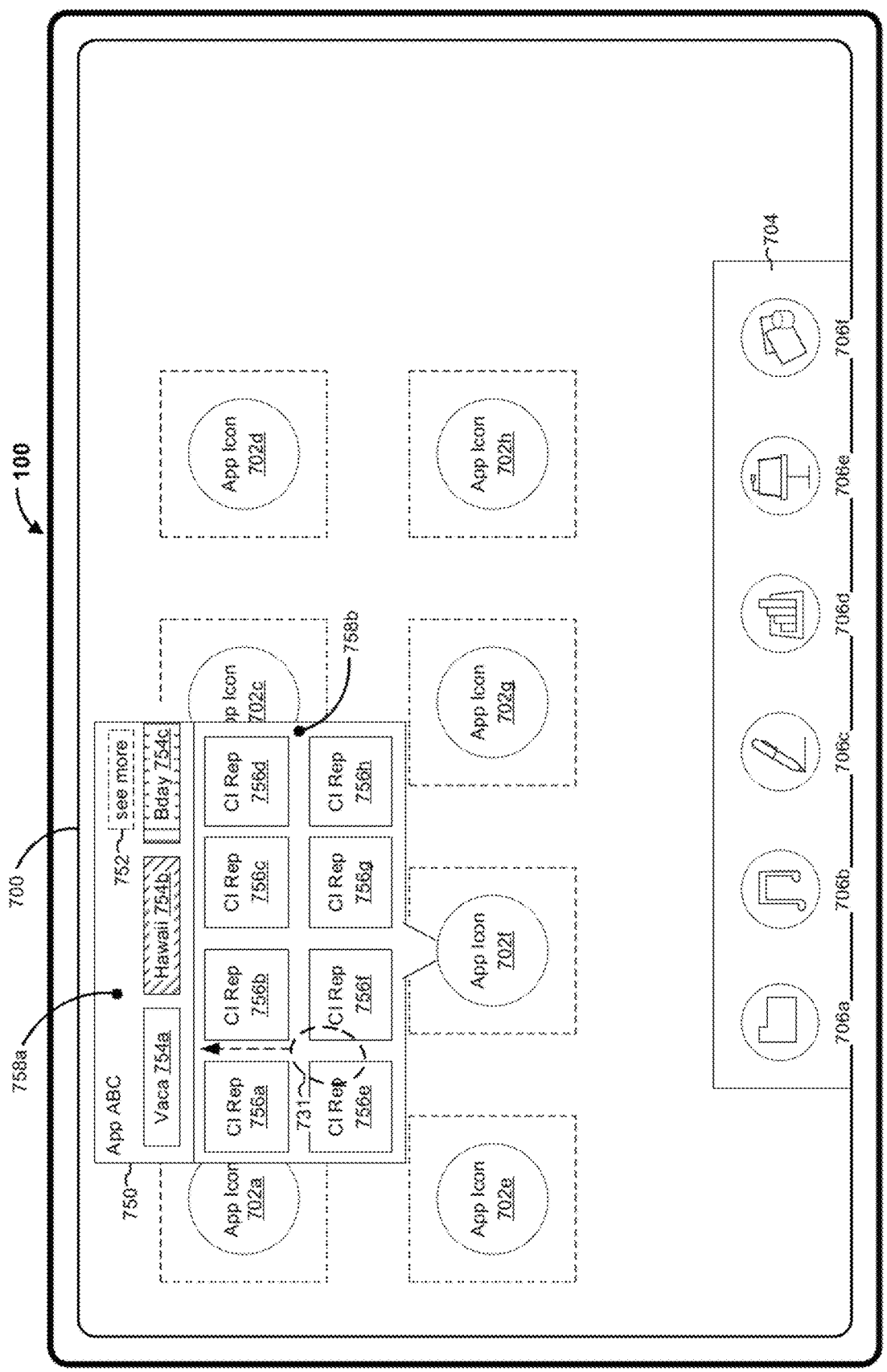

FIGS. 7F-7G show a sequence in which a preview interface is displayed over the home screen in response to detecting selection of an application icon outside the dock region. FIG. 7F also illustrates detecting a contact 723 (e.g., a tap/selection gesture) at a location that corresponds to the application icon 702f outside of the dock region 704. FIG. 7G illustrates displaying a preview interface 750 for the application (e.g., application ABC) that corresponds to the application icon 702f in response to detecting the selection of the application icon 702f in FIG. 7F that satisfies the content preview criterion.

As shown in FIG. 7G, the preview interface 750 includes a plurality of content item representations 756a, 756b, 756c, 756d, 756e, 756f, 756g, and 756h (sometimes collectively referred to herein as the "representations 756") for content items associated with the application (e.g., application ABC). For example, the representations 756 are sorted based on how frequently and/or recently the associated content items have been viewed and/or modified. As shown in FIG. 7G, the preview interface 750 also includes a plurality of tag representations 754a, 754b, and 754c (sometimes collectively referred to herein as the "representations 754") for tags.

For example, the representations 754 correspond to tags that are associated with the content items that correspond to the representations 756. In another example, the representations 754 correspond to frequently used tags, recently used tags, and/or the like. According to some embodiments, each of the representations 754 is associated with a tag that corresponds to a category or subject. According to some embodiments, each of the representations 754 is associated with a tag that corresponds to a color, pattern, and/or appearance. For example, each of the associated tags has a unique color, pattern, and/or appearance. As shown in FIG. 7G, the preview interface 750 further includes a "see more" affordance 752 provided to launch the application (e.g., application ABC) in response to selection thereof (e.g., with a tap/selection gesture).

Figure 7H:
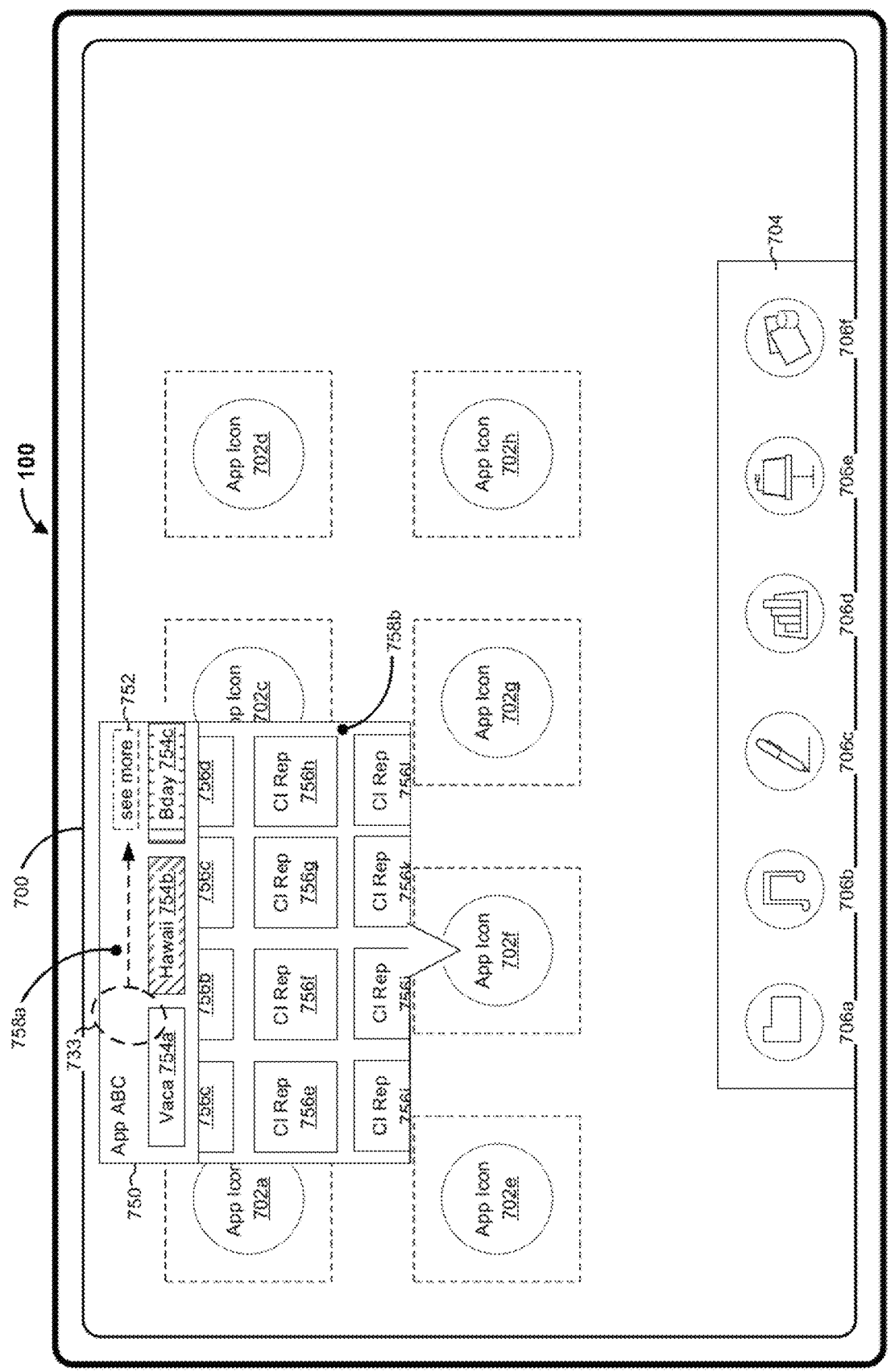

FIGS. 7G-7H show a sequence in which a portion of the preview interface is scrolled in a vertical direction. FIG. 7G also illustrates detecting a first scrolling gesture (e.g., a swipe or tap-and-drag gesture) with a contact 731 in a first direction (e.g., vertical) within a second region 758b of the preview interface 750 that includes the representations 756. FIG. 7H illustrates scrolling the second region 758b of the preview interface 750 that includes the representations 756 in a downward direction in response to detecting the first scrolling gesture in FIG. 7G.

Figure 7I:
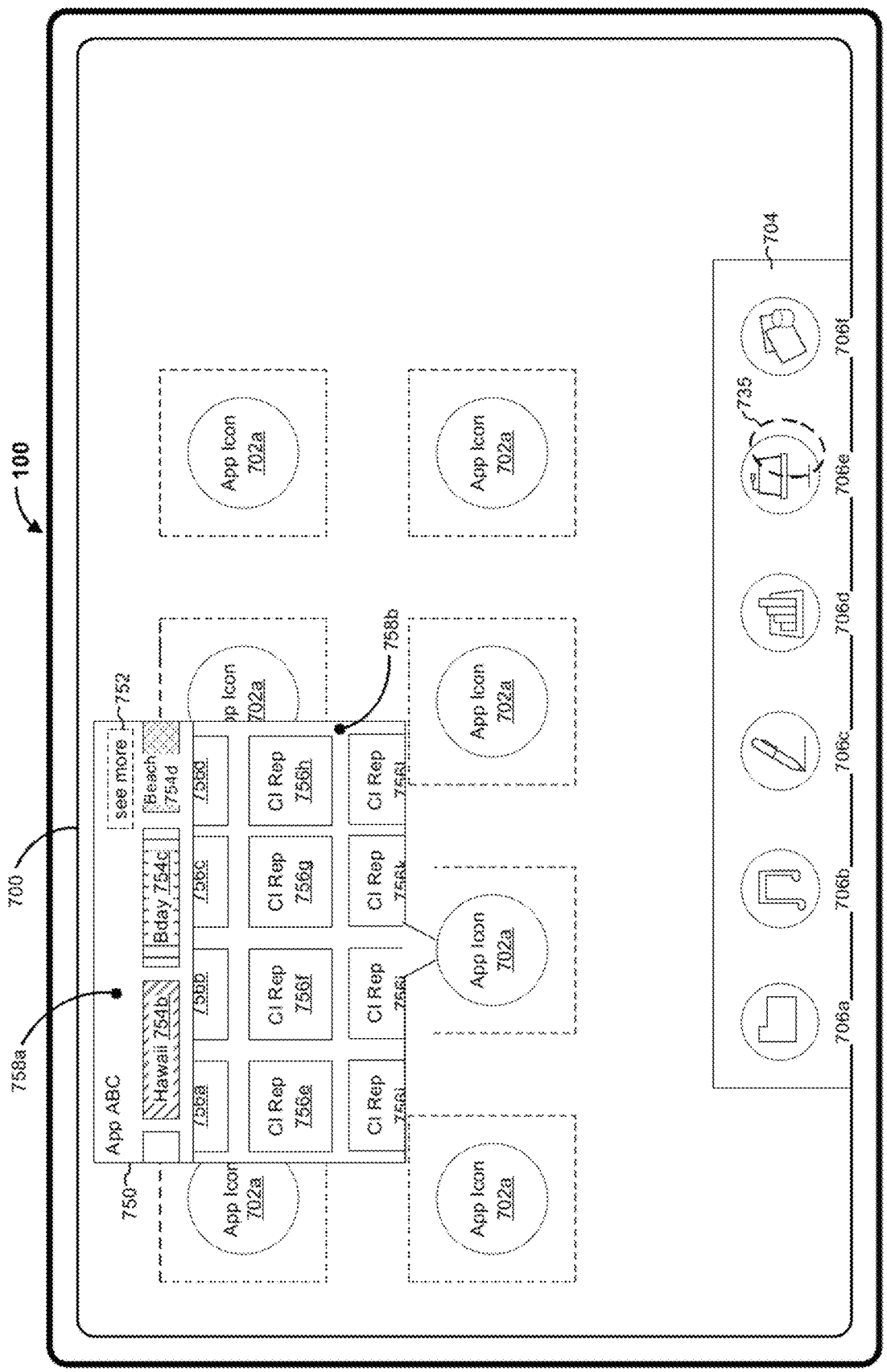

FIGS. 7H-7I show a sequence in which a portion of the preview interface is scrolled in a horizontal direction. FIG. 7H also illustrates detecting a second scrolling gesture (e.g., a swipe or tap-and-drag gesture) with a contact 733 in a second direction (e.g., horizontal) within a first region 758a of the preview interface 750 that includes the representations 754. FIG. 7I illustrates scrolling the first region 758a of the preview interface 750 that includes the representations 754 in a right-to-left direction in response to detecting the second scrolling gesture in FIG. 7H.

Figure 7J:
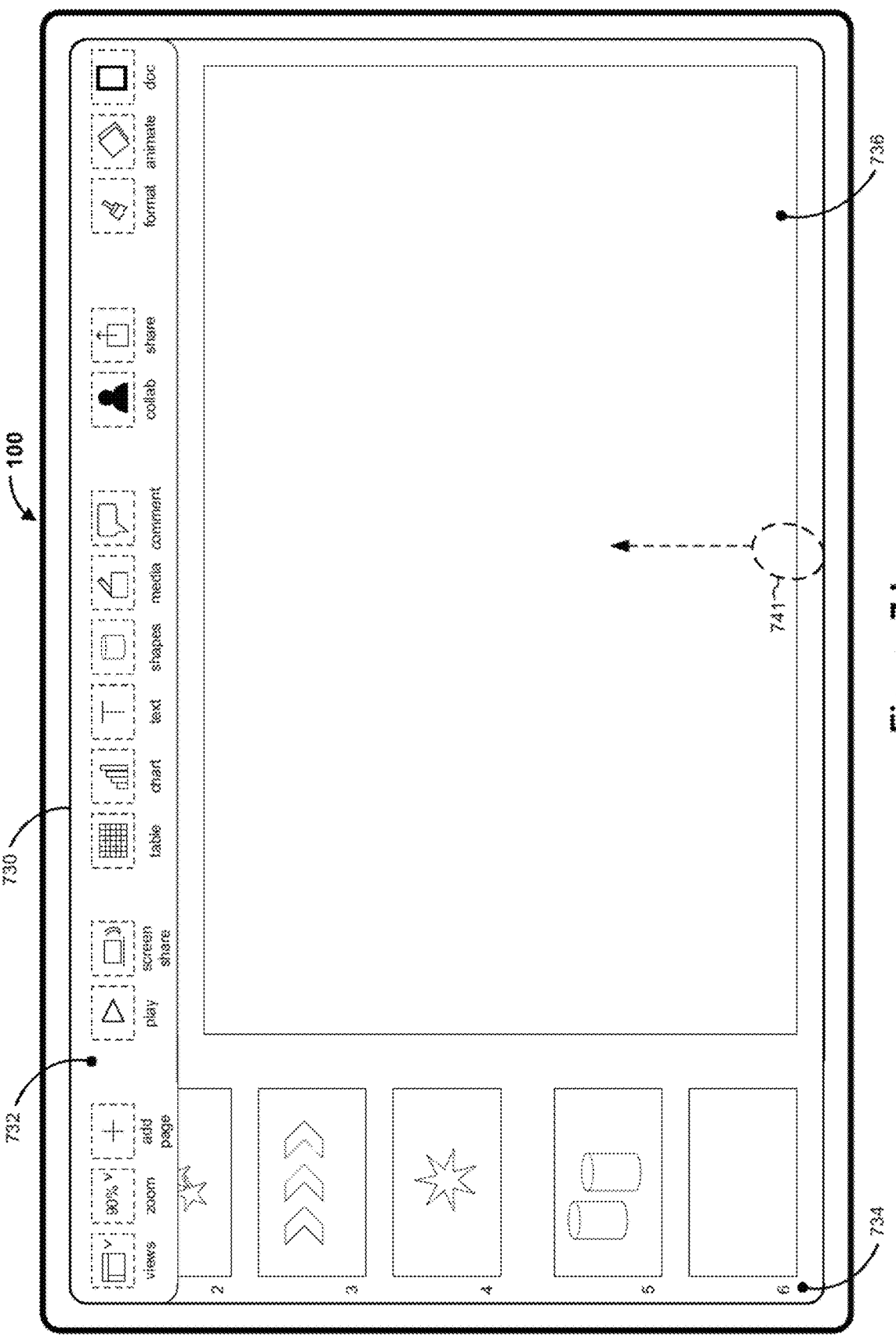

FIGS. 7I-7J show a sequence in which an application is launched in response to detecting selection of a corresponding application icon within the dock region. FIG. 7I also illustrates detecting a contact 735 (e.g., a double tap, long press, or deep press gesture) at a location that corresponds to the application icon 706e within the dock region 704. FIG. 7J illustrates displaying the presentation creation interface 730 for the presentation creation application that corresponds to the application icon 706e in response to detecting the selection of the application icon 706e in FIG. 7I that satisfies the application launch criterion. The presentation creation interface 730 in FIG. 7J is similar to and adapted from the presentation creation interface 730 in FIG. 7D. As such, FIG. 7D and FIG. 7J include similar user interfaces and elements labeled with the same reference number in both figures have the same function, with only the differences described herein for the sake of brevity.

According to some embodiments, in response to detecting an input that corresponds to selecting an application icon, and in accordance with a determination that the input satisfies an application launch criterion (e.g., a click input, tap input, or the like), the device 100 launches the application associated with the selected application icon by, for example, displaying an interface or window associated with the application. According to some embodiments, in response to detecting an input that corresponds to selecting an application icon, and in accordance with a determination that the input satisfies a content preview criterion (e.g., a hover input, double click input, double tap input, long press input, deep press input, or the like), the device 100 display a preview interface for the application that corresponds to the application icon over the current interface.

Figure 7K:
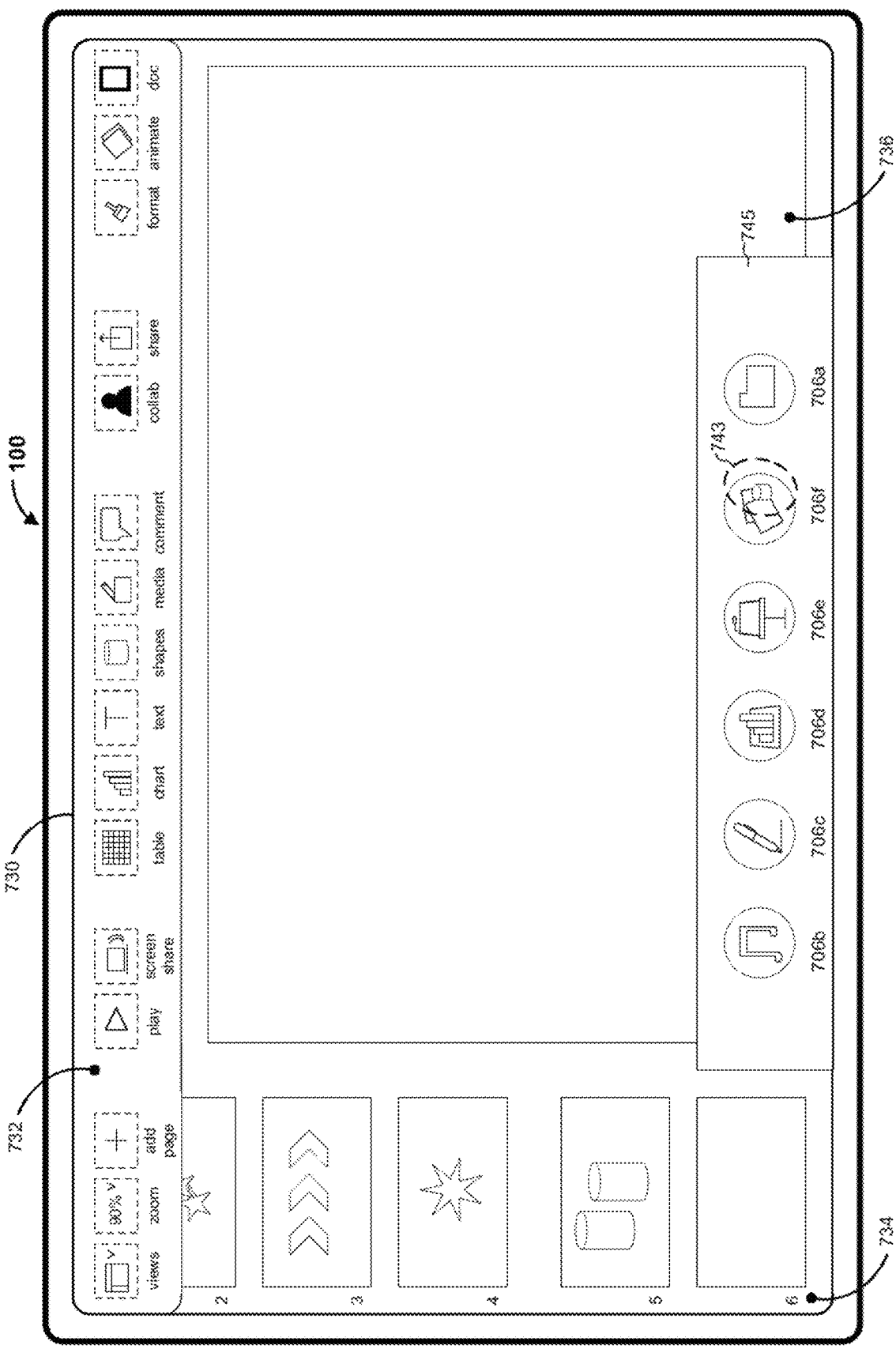

FIGS. 7J-7K show a sequence in which a quick access dock region is overlaid on an application interface. FIG. 7J also illustrates detecting a predefined gesture (e.g., a swipe or tap-and-drag gesture) with a contact 741 from a bottom edge of the display area in an upward direction. For example, the predefined gesture from the bottom edge of the display area in the upward direction corresponds to displaying a dock region over the current interface. FIG. 7K illustrates displaying a dock region 745 (sometimes also referred to herein as the "quick access dock region 745") in response to detecting the predefined gesture from the bottom edge of the display area in the upward direction in FIG. 7J. For example, the dock region 745 slides up from the bottom edge of the display area.

As shown in FIG. 7K, the dock region 745 includes a plurality of application icons 706a, 706b, 706c, 706d, 706e, and 706f (sometimes collectively referred to herein as the "application icons 706") for a plurality of applications (e.g., a file browser application, a music application, a word processing application, a spreadsheet application, a presentation application, a PDF viewer application, and/or the like). According to some embodiments, the application icons 706 within the dock region 745 are user customizable.

Figure 7L:
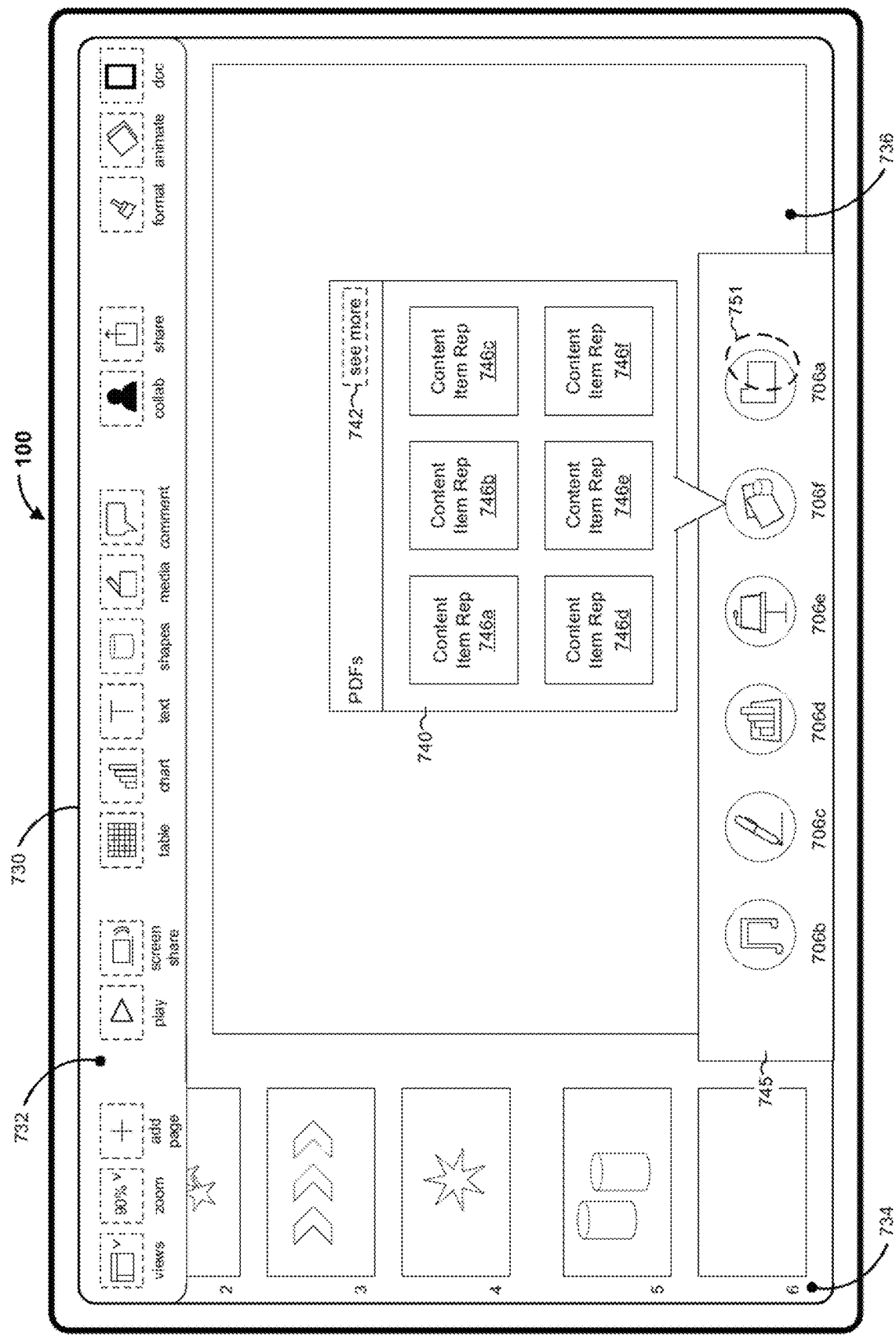

FIGS. 7K-7L show a sequence in which a preview interface is displayed over the application interface in response to detecting selection of an application icon within the dock region. FIG. 7K also illustrates detecting a contact 743 (e.g., a tap/selection gesture) at a location that corresponds to the application icon 706f within the dock region 745. FIG. 7L illustrates displaying the preview interface 740 for the PDF viewer application that corresponds to the application icon 706f over the presentation creation interface 730 in response to detecting the selection of the application icon 706f in FIG. 7K that satisfies the content preview criterion. The preview interface 740 in FIG. 7L is similar to and adapted from the preview interface 740 in FIG. 7F. As such, FIG. 7F and FIG. 7L include similar user interfaces and elements labeled with the same reference number in both figures have the same function, with only the differences described herein for the sake of brevity.

Figure 7M:
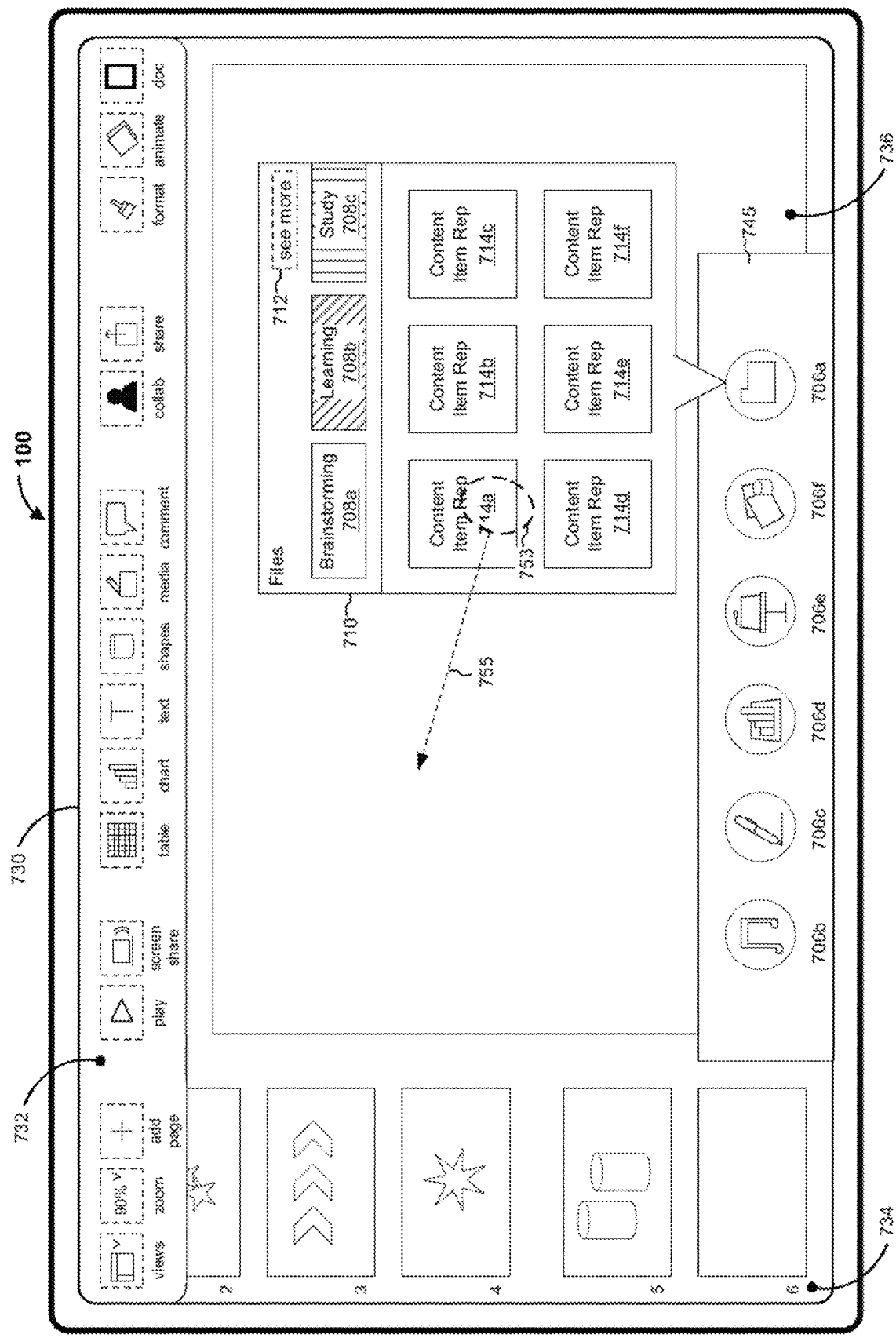

FIGS. 7L-7M show another sequence in which a preview interface is displayed over the application interface in response to detecting selection of another application icon within the dock region. FIG. 7L also illustrates detecting a contact 751 (e.g., a tap/selection gesture) at a location that corresponds to the application icon 706a within the dock region 745. FIG. 7M illustrates displaying the preview interface 710 for the file browser application that corresponds to the application icon 706a over the presentation creation interface 730 in response to detecting the selection of the application icon 706a in FIG. 7L that satisfies the content preview criterion. The preview interface 710 in FIG. 7M is similar to and adapted from the preview interface 710 in FIG. 7B. As such, FIG. 7B and FIG. 7M include similar user interfaces and elements labeled with the same reference number in both figures have the same function, with only the differences described herein for the sake of brevity.

Figure 7N:
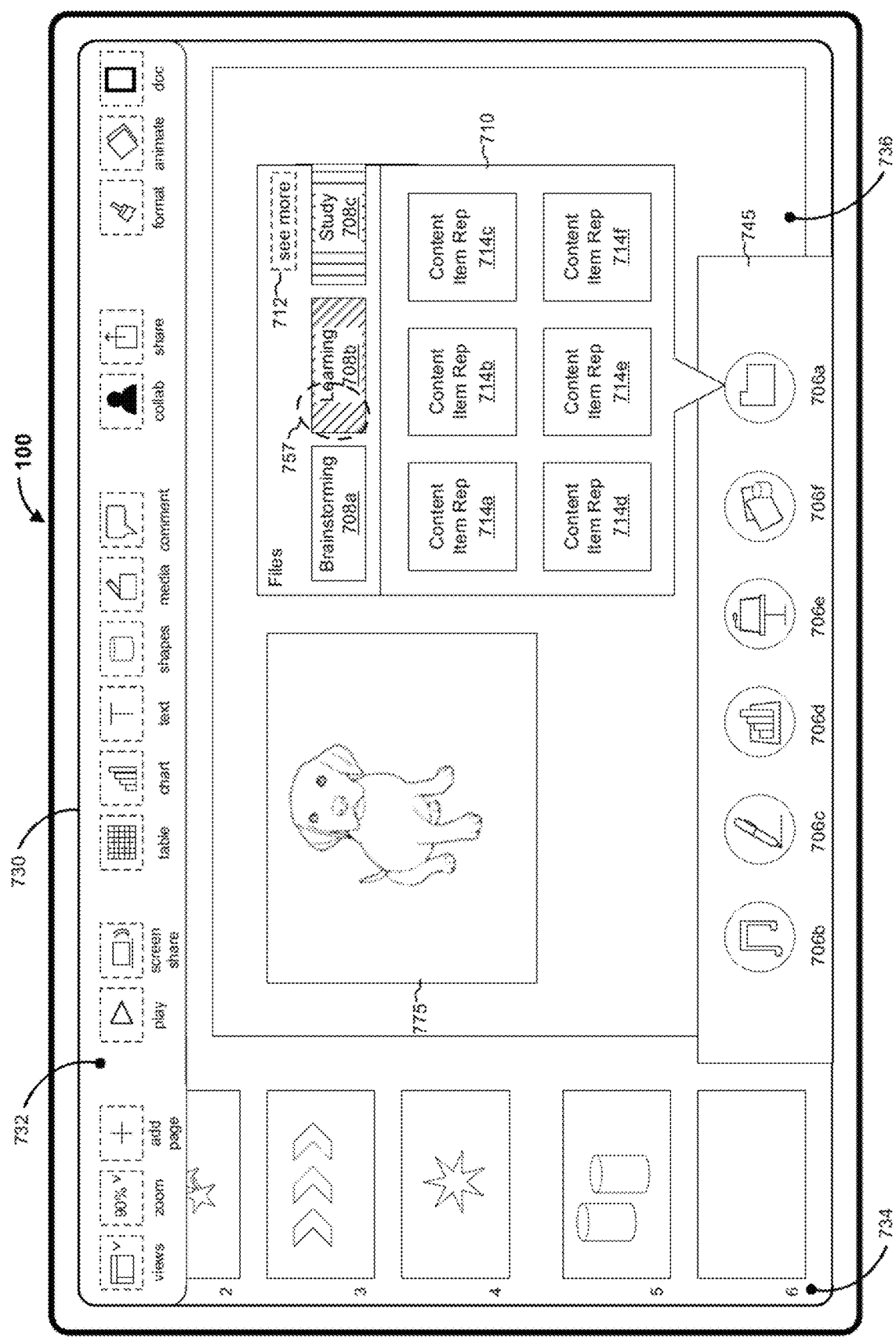

FIGS. 7M-7N show a sequence in which a content item is added to the application interface in response to detecting a drag-and-drop gesture where a content item representation is dragged out of the preview interface and dropped over the application interface. FIG. 7M also illustrates detecting a drag-and-drop gesture with a contact 753 according to motion vector 755 where the content item representation 714a (e.g., associated with an image) is dragged out of the preview interface 710 for the file browser application and dropped over into the content entry region 736 within the presentation creation interface 730. FIG. 7N illustrates displaying a content item 775 (e.g., an image) that corresponds to the content item representation 714a within the content entry region 736 in response to detecting the drag-and-drop gesture in FIG. 7M.

Figure 7O:
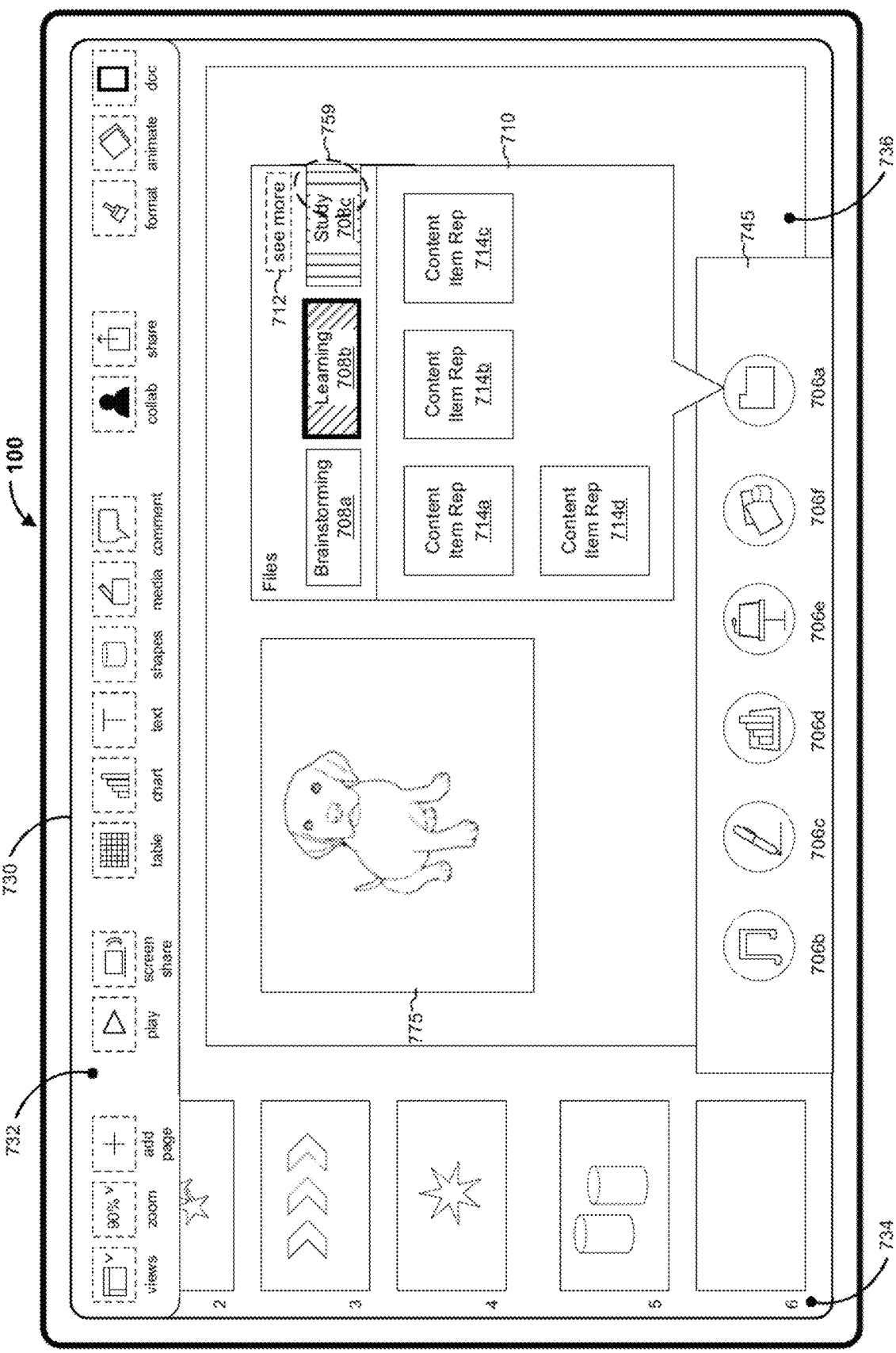

FIGS. 7N-7O show a sequence in which the content item representations within the preview interface are filtered in response to a first filtering operation. FIG. 7N also illustrates detecting a contact 757 (e.g., a tap/selection gesture) at a location that corresponds to the tag representation 708b (e.g., associated with the "Learning" tag) within the preview interface 710 (e.g., the first filtering operation). FIG. 7O illustrates filtering the representations 714 within the preview interface 710 in response to the first filtering operation in FIG. 7N. As shown in FIG. 7O, the representations 714 displayed within the preview interface 710 are filtered to include the content item representations 714a, 714b, 714c, and 714d for the content items that are associated with the "Learning" tag.

FIGS. 7O-7P show another sequence in which the content item representations within the preview interface are further filtered in response to a second filtering operation. FIG. 7O also illustrates detecting a contact 759 (e.g., a tap/selection gesture) at a location that corresponds to the tag representation 708c (e.g., associated with the "Study" tag) within the preview interface 710 (e.g., the second filtering operation). FIG. 7P illustrates filtering the representations 714 within the preview interface 710 in response to the second filtering operation in FIG. 7O. As shown in FIG. 7P, the representations 714 displayed within the preview interface 710 are further filtered to include the content item representations 714a and 714b for the content items that are associated with the "Learning" tag and the "Study" tag.

According to some embodiments, the preview interface 710 is updated to show content item representations for content items that match both the "Learning" tag and the "Study" tag. According to some embodiments, the preview interface 710 is updated to show content item representations for content items that match the "Learning" tag or the "Study" tag. According to some embodiments, the preview interface 710 is updated to show content item representations for content items that match the "Learning" tag and/or the "Study" tag.

FIGS. 8A-8C illustrate a flow diagram of a method 800 of managing tags from a transport interface in accordance with some embodiments. The method 800 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the one or more input devices is on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 800 are, optionally, combined and/or the order of some operations is, optionally, changed.

As described below, the method 800 provides an intuitive way to manage tags from a transport interface. The method reduces the cognitive burden on a user when managing tags from a transport interface, thereby creating a more efficient human-machine interface. For battery-operated electronic devices, enabling a user to manage tags from a transport interface faster and more efficiently conserves power and increases the time between battery charges.

While displaying a content item (e.g., a presentation/slide-deck, note, email, image, message, word processing document, spreadsheet, audio file, video, electronic document, or the like), the device detects (802), via the one or more input devices, a first input that corresponds to selection of a transport affordance. As one example, in FIG. 5A, while the displaying a note within a notes interface 502 associated with a notes application, the device 100 detects a contact 510 selecting the transport affordance 508. As another example, in FIG. 6A, while the displaying a presentation (or a respective slide thereof) within a presentation creation interface 600 associated with a presentation creation application, the device 100 detects a contact 610 selecting the transport affordance 608.

In response to detecting the selection of the transport affordance, the device (804) displays, on the display, a transport interface (e.g., a share sheet displayed as a pop-over panel, pane, window, etc.) provided to perform one or more operations on the content item, including: a tag modification affordance provided to modify tags associated with the content item; and one or more transport option affordances (e.g., sharing affordances and/or operation affordances) associated with different selectable options for performing the one or more operations on the content item. In some embodiments, the transport affordances correspond to exporting the content item to another application, copying the content item, duplicating the content item, saving the content item, pushing the content item to a smart TV (e.g., AppleTV), archiving the content item, moving the content item to a different directory/folder, printing the content item, collaborating with others on the content item, sharing the content item (e.g., via SMS, email, social media platforms, a local interface (AirDrop), etc.), and/or the like. According to some embodiments, the tag modification affordance within the transport interface provides a seamless user experience that requires less time and user inputs when modifying tags associated with a content item, which, additionally, reduces power usage and improves battery life of the device by enabling the user to use the device more quickly and efficiently.

As one example, in response to detecting the selection of the transport affordance 508 in FIG. 5A, the device 100 displays a transport interface 520 over the notes interface 502 in FIG. 5B. As shown in FIG. 5B, the transport interface 520 includes: a plurality of sharing affordances 512 provided to share the content item (e.g., the note in FIG. 5A) via corresponding communication means (e.g., SMS, email, cloud storage, and others); and a plurality of operation affordances 514 provided to perform corresponding operations on the content item (e.g., the note in FIG. 5A). As shown in FIG. 5B, the transport interface 520 also includes a tags region 521 with a thumbnail image 522 of the content item (e.g., the note in FIG. 5A) and metadata 524 associated with the content item (e.g., the name, location, modification date, creation date, creator's name, and/or the like of the note in FIG. 5A). As shown in FIG. 5B, the tags region 521 also includes: tags 526a and 526b that are currently associated with the content item (e.g., the note in FIG. 5A), and a tag modification affordance 528 provided to modify (e.g., remove, add, and/or edit) tags associated with the content item (e.g., the note) in response to selection thereof (e.g., with a tap/selection gesture).

As another example, in response to detecting the selection of the transport affordance 608 in FIG. 6A, the device 100 displays a transport interface 620 over the presentation creation interface 600 in FIG. 6B. As shown in FIG. 6B, the transport interface 620 includes: a plurality of sharing affordances 612 provided to share the content item (e.g., the presentation in FIG. 6A) via corresponding communication means (e.g., SMS, email, cloud storage, and others); and a plurality of operation affordances 614 provided to perform corresponding operations on the content item (e.g., the presentation in FIG. 6A). As shown in FIG. 6B, the transport interface 620 also includes a tags region 621 with a thumbnail image 622 of the content item (e.g., the presentation in FIG. 6A) and metadata 624 associated with the content item (e.g., the name, location, modification date, creation date, creator's name, and/or the like of the presentation in FIG. 6A). As shown in FIG. 6B, the tags region 621 also includes a tag modification affordance 628 provided to modify (e.g., remove, add, and/or edit) tags associated with the content item (e.g., the presentation in FIG. 6A) in response to selection thereof (e.g., with a tap/selection gesture).

In some embodiments, the transport interface includes (806) an indication of one or more nearby users with which the content item can be shared. As one example, in FIG. 5B, the transport interface 520 includes a local sharing affordance 515 provided to share the content item (e.g., the note in FIG. 5A) with one or more users (not shown) via a local interface (e.g., BLUETOOTH, NFC, WiFi, and/or the like). As another example, in FIG. 6B, the transport interface 620 includes a local sharing affordance 615 provided to share the content item (e.g., the presentation in FIG. 6A) with one or more users (not shown) via a local interface (e.g., BLUETOOTH, NFC, WiFi, and/or the like).

In some embodiments, the transport interface includes (808) an indication of one or more tags currently associated with the content item. According to some embodiments, the indication of the tags currently associated a content item within the transport interface provides a seamless user experience that requires less time and user inputs when viewing and modifying tags associated with the content item, which, additionally, reduces power usage and improves battery life of the device by enabling the user to use the device more quickly and efficiently.

As one example, in FIG. 5B, the tags region 521 of the transport interface 520 includes tags 526a and 526b that are currently associated with the content item (e.g., the note in FIG. 5A). In FIG. 5B, the tag 526a corresponds to a "Hawaii" category, and the tag 526b corresponds to a "Lists" category. According to some embodiments, each tag corresponds to a category or subject in order to organize content items such as notes, documents, files, images, media, and the like. According to some embodiments, each tag is associated with a color, pattern, and/or appearance in order to organize content items such as notes, documents, files, images, media, and the like. In some embodiments, each tag is associated with a unique color, pattern, and/or appearance.

In some embodiments, displaying the transport interface that includes the indication of one or more tags currently associated with the content item includes (810): in accordance with a determination that a dimension (e.g., a width dimension) of the indication of the one or more tags currently associated with the content item satisfies a predefined dimensional constraint of the transport interface, displaying the indication of the one or more tags currently associated with the content item includes displaying expanded representations of the one or more tags currently associated with the content item, and, in accordance with a determination that the dimension of the indication of the one or more tags currently associated with the content item does not satisfy the predefined dimensional constraint of the transport interface, displaying the indication of the one or more tags currently associated with the content item includes displaying collapsed representations of the one or more tags currently associated with the content items. According to some embodiments, the expanded and collapsed representations of the tags currently associated a content item within the transport interface provide a seamless user experience that requires less time and user inputs when viewing and modifying tags associated with the content item, which, additionally, reduces power usage and improves battery life of the device by enabling the user to use the device more quickly and efficiently.

As one example, in FIG. 5B, the device 100 displays the tags 526a and 526b within the tags region 521 in accordance with a determination that a dimension of the tags 526a and 526b (e.g., a sum of pixels corresponding to the width of the tags 526a and 526b) satisfies a predefined dimensional constraint of the transport interface (e.g., a predetermined pixel limit). As another example, in FIG. 5F, the device 100 displays the tags representation 529 (e.g., a collapsed representation of the tags 526a, 526b, and 526c) within the tags region 521 in accordance with a determination that a dimension of the tags 526a, 526b, and 526c (e.g., a sum of pixels corresponding to the width of the tags 526a, 526b, and 526c) does not satisfy the predefined dimensional constraint of the transport interface (e.g., the predetermined pixel limit).

In some embodiments, the device (812): detects, via the one or more input devices, a second input that corresponds to selection of the tag modification affordance (e.g., tap or click on the tag modification affordance); and, in response to detecting the selection of the tag modification affordance, replaces display of the transport interface with a tag modification interface (e.g., a pop-over menu, panel, pane, window, etc.) that includes at least one of: one or more selectable tags currently associated with the content item; and one or more selectable suggested tags. According to some embodiments, the tag modification interface provides a seamless user experience that requires less time and user inputs when viewing and modifying tags associated with the content item, which, additionally, reduces power usage and improves battery life of the device by enabling the user to use the device more quickly and efficiently.

In some embodiments, each of the one or more existing tags and the one or more suggested tags in the tag modification interface are associated with a unique color/appearance scheme in order to easily differentiate the tags. In some embodiments, the tag modification affordance also includes a content item region that includes a thumbnail image of the content item and metadata associated with the content item. In some embodiments, the one or more existing tags and the one or more suggested tags are displayed in separate regions. In some embodiments, the one or more existing tags and the one or more suggested tags are displayed in the same region.

As one example, in response to detecting the selection of the tag modification affordance 528 with the contact 518 in FIG. 5B, the device 100 replaces display of the transport interface 520 with a tag modification interface 530 in FIG. 5C. As shown in FIG. 5C, the tag modification interface 530 includes a plurality of selectable tags 532 with first subset that corresponds to tags that are currently associated with the note (e.g., the selectable tags 532a and 532b) as indicated by the indicators 535 (e.g., check mark icons), and a second subset that corresponds to suggested tags (e.g., the selectable tags 532c and 532d) based on frequency of use, recency of use, and/or the like. As shown in FIG. 5C, the tag modification interface 530 also includes the tags region 521 (e.g., similar to and adapted from the tags region 521 within the transport interface 520 in FIG. 5B) and a tag creation field 534 provided to display a tag creation interface 540 in response to selection thereof (e.g., with a tap/selection gesture as shown in FIG. 5C-5D).

In some embodiments, the one or more selectable suggested tags are selected (814) based on at least one of: frequency of use, recency of use, or contextual information associated with the content item. In some embodiments, the one or more selectable suggested tags also include the existing tags with indicator icons (e.g., check mark icons). For example, as shown in FIG. 5C, a second subset of the selectable tags 532 corresponds to suggested tags (e.g., the selectable tags 532c and 532d) based on frequency of use, recency of use, and/or the like.

In some embodiments, the tag modification interface also includes (816) a user-modifiable tag creation field provided to create a new tag to be associated with the content item. For example, as shown in FIG. 5C, the tag modification interface 530 includes a tag creation field 534 provided to display a tag creation interface 540 in response to selection thereof (e.g., with a tap/selection gesture as shown in FIG. 5C-5D). According to some embodiments, the user-modifiable tag creation field provides a seamless user experience that requires less time and user inputs when adding a new association between a tag and a content item, which, additionally, reduces power usage and improves battery life of the device by enabling the user to use the device more quickly and efficiently.

In some embodiments, the device (818): detects, via the one or more input devices, a third input that corresponds to selection of a respective tag among the one or more selectable tags currently associated with the content item (e.g., tap or click on the existing tag); and, in response to detecting the selection of the respective tag, removes the association between the respective tag and the content item. According to some embodiments, the ability to remove an association between a tag and a content from within the tag modification interface provides a seamless user experience that requires less time and user inputs when modifying tags associated with the content item, which, additionally, reduces power usage and improves battery life of the device by enabling the user to use the device more quickly and efficiently.

In some embodiments, the device automatically dissociates the respective tag without further user inputs. In some embodiments, the device displays indicator icons (e.g., check mark icons) proximate to the one or more existing tags. In some embodiments, in response to detecting the selection of the respective tag, the device ceases to display the respective tag within the tag modification interface. As one example, FIGS. 5G-5H show a sequence in which the device 100 removes an association between the content item (e.g., the note) and the tag 526c in response to selection of the tag 526c within the tags region 521 of the tag modification interface 530.

In some embodiments, in response to detecting the selection of the respective tag, the device displays (820), on the display, an option menu that includes a first affordance (e.g., removal affordance) provided to remove the association between the respective tag and the content item when selected and a second affordance (e.g., "see more" or "see all" affordance) provided to display representations of one or more content items associated with the respective tag when selected, where the one or more content items include the content item. For example, the option menu corresponds to a quick action pop-over menu overlaid on the tag modification interface. In some embodiment, a file browser application is launched and displayed, in response to selection of the second affordance, where the file browser application aggregates content items across multiple applications/sources that include the selected existing tag. According to some embodiments, the option menu provides a seamless user experience that requires less time and user inputs when modifying tags associated with the content item, which, additionally, reduces power usage and improves battery life of the device by enabling the user to use the device more quickly and efficiently.

As one example, FIGS. 6F-6G show a sequence in which the device 100 displays an option menu 650 associated with the tag 626a in response to selection of the tag 626a within the tags region 621 of the tag modification interface 630. As shown in FIG. 6G, the option menu 650 includes a "remove tag" affordance 652a provided to remove the association between the content item (e.g., the presentation in FIG. 6A) and the tag 626a in response to selection thereof (e.g., with a tap/selection gesture), and a "show all files with tag" affordance 652b provided to display a content items browsing interface 660 that shows content items associated with the tag 626a in response to selection thereof (e.g., with a tap/selection gesture as shown in FIG. 6G-6H).

In some embodiments, the device (822): detects, via the one or more input devices, a fourth input that corresponds to selection of a respective selectable suggested tag among the one or more selectable suggested tags (e.g., tap or click on the existing tag); and, in response to detecting the selection of the respective selectable suggested tag, associates the respective selectable suggested tag with the content item and displays, on the display, the respective selectable suggested tag among the one or more tags currently associated with the content item. According to some embodiments, the ability to add an association between a tag and a content item from within the tag modification interface provides a seamless user experience that requires less time and user inputs when modifying tags associated with the content item, which, additionally, reduces power usage and improves battery life of the device by enabling the user to use the device more quickly and efficiently.

In some embodiments, in response to detecting the selection of the respective selectable suggested tag, the device displays an indicator icon proximate to the respective selectable suggested tag. As one example, with reference to FIG. 5C, in response to selection of the selectable tag 532c (not shown), the device 100 associates tag 532c (e.g., "Music") with the content item (e.g., the note in FIG. 5A) and also displays an associated tag indicator within the tags regions 521 of the tag modification interface 530 and an indicator 535 (e.g., a check mark indicator) proximate to the tag 532c.

In some embodiments, the device (824): detects, via the one or more input devices, a sequence of one or more inputs that corresponds to inputting a string of one or more characters for a new tag within the tag creation field and completing the string for the new tag; and, in response to detecting completion of the string of one or more characters for the new tag: associates the new tag with the content item; and displays, on the display, the new tag among the one or more tags currently associated with the content item. According to some embodiments, the user-modifiable tag creation field provides a seamless user experience that requires less time and user inputs when adding a new association between a tag and a content item, which, additionally, reduces power usage and improves battery life of the device by enabling the user to use the device more quickly and efficiently.

For example, the sequence of one or more inputs corresponds to speaking characters of a word or phrase for a new tag. In another example, the sequence of one or more inputs corresponds to entering characters of a word or phrase for a new tag via a software keyboard, a physical keyboard, or the like. As one example, FIGS. 5C-5F show a sequence in which a new tag (e.g., "Summer" associated with selectable tag 532e and the tag 526c) is created by entering an associated text string within the creation interface 540 via a software keyboard 545 and the new tag is associated with the content item (e.g., the note in FIG. 5A).

In some embodiments, the device (826): detects, via the one or more input devices, a fourth input that corresponds to selection of a respective tag among the one or more tags currently associated with the content item (e.g., tap or click on the existing tag); and, in response to detecting the selection of the respective tag, displays, on the display, an option menu that includes a first affordance (e.g., removal affordance) provided to dissociate the respective tag with the content item when selected and a second affordance (e.g., a "see more" or "see all" affordance) provided to display representations of one or more content items associated with the respective tag, where the one or more content items include the content item. According to some embodiments, the option menu provides a seamless user experience that requires less time and user inputs when modifying tags associated with the content item, which, additionally, reduces power usage and improves battery life of the device by enabling the user to use the device more quickly and efficiently.

For example, the option menu corresponds to a quick action pop-over menu overlaid on the transport interface. For example, the option menu is similar to or adapted from the option menu 650 in FIG. 6G. In some embodiment, a file browser application is launched and displayed, in response to selection of the second affordance, where the file browser application aggregates content items across multiple applications/sources that include the selected existing tag.

As one example, with reference to FIG. 5B, in response to selection of the tag 526a within the tags region 521 of the transport interface 520 (not shown), the device 100 displays an option menu (e.g., similar to the option menu 650 in FIG. 6G). In this example, the option menu includes a "remove tag" affordance provided to remove the association between the content item (e.g., the note in FIG. 5A) and the tag 526a in response to selection thereof (e.g., with a tap/selection gesture), and a "show all files with tag" affordance provided to display a content items browsing interface that shows content items associated with the tag 526a in response to selection thereof (e.g., with a tap/selection gesture.

In some embodiments, the device (828): detects, via the one or more input devices, a fifth input that corresponds to selection of a respective transport option affordance among the one or more transport option affordances (e.g., tap or click on the existing tag); and, in response to detecting the selection of the respective transport option affordance: in accordance with a determination that the respective transport option affordance corresponds to sharing the content item via a first application, causes the content item to be shared via the first application; and, in accordance with a determination that the respective transport option affordance corresponds to sharing the content item via a second application different from the first application, causes the content item to be shared via the second application.

As one example, with reference to FIG. 5B, in response to selection of the sharing affordance 512a within the transport interface 520 (not shown), the device 100 causes the content item (e.g., the note in FIG. 5A) to be shared by a first application that corresponds to the sharing affordance 512a (e.g., a text messaging or SMS application). As another example, with reference to FIG. 5B, in response to selection of the sharing affordance 512b within the transport interface 520 (not shown), the device 100 causes the content item (e.g., the note in FIG. 5A) to be shared by a second application that corresponds to the sharing affordance 512b (e.g., an email application).

As yet another example, with reference to FIG. 5B, in response to selection of the operation affordance 514a within the transport interface 520 (not shown), the device 100 causes a first operation that corresponds to the operation affordance 514a (e.g., a copy operation) to be performed on the content item (e.g., the note in FIG. 5A). As yet another example, with reference to FIG. 5B, in response to selection of the operation affordance 514c within the transport interface 520 (not shown), the device 100 causes a second operation that corresponds to the operation affordance 514c (e.g., a print operation) to be performed on the content item (e.g., the note in FIG. 5A).

It should be understood that the particular order in which the operations in FIGS. 8A-8C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 900 and 1000) are also applicable in an analogous manner to method 800 described above with respect to FIGS. 8A-8C. For example, the transport interfaces, tag modification affordances, transport option affordances, content items, and selectable tags described above with reference to method 800 optionally have one or more of the characteristics of the transport interfaces, tag modification affordances, transport option affordances, content items, and selectable tags described herein with reference to other methods described herein (e.g., the methods 900 and 1000). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 8A-8C, optionally, implemented by components depicted in FIGS. 1A-1B. For example, the selection inputs, the inputs for removing the association between a tag and a content item, and the inputs for adding an association between a tag and a content item are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9D illustrate a flow diagram of a method 900 of jointly accessible content items within a collaboration interface in accordance with some embodiments. The method 900 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the one or more input devices is on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 900 are, optionally, combined and/or the order of some operations is, optionally, changed.

As described below, the method 900 provides an intuitive way to view jointly accessible content items. The method reduces the cognitive burden on a user when viewing jointly accessible content items, thereby creating a more efficient human-machine interface. For battery-operated electronic devices, enabling a user to view jointly accessible content items faster and more efficiently conserves power and increases the time between battery charges.

The device detects (902), via the one or more input devices, a first input that corresponds to selection of a collaboration affordance. As one example, the collaboration affordance corresponds to one of a plurality of affordances displayed at the bottom of a document management application that also includes a projects affordance and a browse affordance. As one example, in FIG. 6K, the device 100 detects a contact 673 selecting the collaboration view affordance 658*a*.

In response to detecting the selection of the collaboration affordance, the device displays (904), on the display, a collaboration interface (e.g., a project management portal for managing project status for a team of multiple collaborators), including concurrently displaying: a recent-items region that includes a plurality of representations of a plurality of recently modified content items (e.g., a presentation/slide-deck, note, email, image, message, word processing document, spreadsheet, audio file, video, electronic document, or the like) that includes one or more content items that are not jointly accessible by other users; and a collaborative-items region that includes a plurality of representations of a plurality of jointly accessible content items that are jointly accessible by the other users. According to some embodiments, the collaboration interface provides a seamless user experience with increased visibility and contextual information that requires less time and user inputs when viewing recently modified and/or accessed content items and jointly accessible content items, which, additionally, reduces power usage and improves battery life of the device by enabling the user to use the device more quickly and efficiently.

For example, the other users correspond to one or more collaborators, or a specific group of collaborators. In some embodiments, the recent-items region also includes representations of recently viewed content items. In some embodiments, the plurality of representations within the recent-items region correspond to thumbnail images or icons of the associated content items. In some embodiments, the plurality of representations within the collaborative-items region correspond to thumbnail images or icons of the associated content items. In some embodiments, the plurality of representations within the recent-items region includes text descriptions of the associated content items. In some embodiments, the plurality of representations within the collaborative-items region includes text descriptions of the associated content items.

In some embodiments, metadata is displayed proximate to each of the plurality of representations within the recent-items region. For example, the metadata includes the name, size, location, modification date, creation date, creator's name, and/or the like for the associated content items. According to some embodiments, the recent-items region has a different colored background than other regions within the collaboration interface.

In some embodiments, metadata is displayed proximate to each of the plurality of representations within the collaborative-items region. For example, the metadata includes the name, size, location, modification date, creation date, creator's name, and/or the like for the associated content items. According to some embodiments, the jointly accessible content items correspond to a collaboration mode (e.g., live sharing not statically emailed or texted to others) where others users have read and/or write access to the jointly accessible content items.

For example, in response to detecting the selection of the collaboration view affordance 658*a* in FIG. 6K, the device 100 displays a collaboration interface 680 in FIG. 6L. As shown in FIG. 6L, the collaboration interface 680 includes a recent-items region 682 with a plurality of representations of a plurality of recently modified content items and a collaborative-items region 692 with a plurality of representations of a plurality of jointly accessible content items that are jointly accessible by other users. According to some embodiments, the recent-items region 682 includes representations of one or more content items that are not jointly accessible by the other users.

As shown in FIG. 6L, the recent-items region 682 includes content item representations 684*a*, 684*b*, 684*c*, 684*d*, 684*e*, 684*f*, 684*g*, 684*h*, 684*i*, 684*j*, 684*k*, 684*l*, 684*m*, and 684*n* (sometimes collectively referred to herein as the "representations 684"). In some embodiments, the representations 684 correspond to content items that were recently modified and/or viewed by the user of the device 100. In some embodiments, the representations 684 correspond to content items that were recently modified and/or viewed by members of a group of users (e.g., a collaboration or project group). According to some embodiments, at least some of the representation 684 correspond to content items that are not jointly accessible by others user.

As shown in FIG. 6L, the collaborative-items region 692 includes content item representations 694*a*, 694*b*, 694*c*, 694*d*, 694*e*, 694*f*, and 694*g* (sometimes collectively referred to herein as the "representations 694"). In some embodiments, the representations 694 correspond to content items that are jointly accessible to other users. In some embodiments, the other users correspond to members of a group of users (e.g., a collaboration or project group). For example, the group of users is selected by a project leader or administrator. For example, the project leader or administrator also sets privileges (e.g., read and/or write access) for each of the users in the group of users.

In some embodiments, metadata is displayed (906) proximate to each of the plurality of representations of the plurality of jointly accessible content items indicating recent activity associated with a respective shared content item. In some embodiments, the metadata includes information corresponding to the type of activity (e.g., read or write), the time of activity, and/or the like. In some embodiments, the metadata includes information corresponding to the user responsible for the activity. In some embodiments, the metadata includes a badge that indicates any activity (e.g., an "unread messages," "new activity," or activity count indicator). According to some embodiments, the metadata is displayed within the collaboration interface to provide a seamless user experience with additional contextual information that requires less time and user inputs when viewing recently modified and/or accessed content items and jointly accessible content items, which, additionally, reduces power usage and improves battery life of the device by enabling the user to use the device more quickly and efficiently.

For example, in FIG. 6L, the recent-items region 682 includes representations 684 and associated metadata 686a, 686b, 686c, 686d, 686e, 686f, 686g, 686h, 686i, 686j, 686k, 686l, 686m, and 686n. For example, the metadata includes the name, size, location, modification date, creation date, creator's name, and/or the like for the associated content items. For example, in FIG. 6L, the collaborative-items region 692 includes content item representations 694 and associated metadata 696a, 696b, 696c, 696d, 696e, 696f, and 696g. For example, the metadata includes the name, size, location, modification date, creation date, creator's name, and/or the like for the associated content items.

In some embodiments, the recent-items region includes (908) a first affordance provided to display additional representations of the plurality of recently modified content items when selected, and the collaborative-items region includes a second affordance provided to display additional representations of the plurality of jointly accessible content items. For example, in FIG. 6L, the recent-items region 682 includes a "See more" affordance 688 provided to see additional representations of the plurality of recently modified content items in response to selection thereof (e.g., with a tap/selection gesture). Similarly, as another example, in FIG. 6L, the collaborative-items region 692 also includes a "See more" affordance 698 provided to see additional representations of the plurality of jointly accessible content items in response to selection thereof (e.g., with a tap/selection gesture).

In some embodiments, the plurality of recently modified content items corresponds to (910) recently modified content items aggregated from at least one of: one or more storage location, or one or more different application, and the plurality of jointly accessible content items corresponds to jointly accessible content items aggregated from at least one of: two or more storage locations, or two or more different storage services (e.g., cloud storage services). According to some embodiments, the aggregation of recently modified content items and jointly accessible content items across multiple storage locations, application, and/or storage services provides a seamless user experience with increased visibility and contextual information that requires less time and user inputs when viewing recently modified and/or accessed content items and jointly accessible content items, which, additionally, reduces power usage and improves battery life of the device by enabling the user to use the device more quickly and efficiently.

In some embodiments, the different storage locations correspond to one or more local storage devices, one or more remote storage devices, one or more attached/peripheral storage devices, one or more folders/directories, and/or the like. In some embodiments, the different storage services are represented on the device by different applications.

In some embodiments, displaying the collaboration interface includes (912) concurrently displaying a tags region (sometimes also herein called a "projects region") that includes a plurality of tags associated with the plurality of recently modified content items and the plurality of jointly accessible content items. According to some embodiments, the tags region of the collaboration interface provides a seamless user experience with increased visibility and contextual information that requires less time and user inputs when filtering content items based on tags, which, additionally, reduces power usage and improves battery life of the device by enabling the user to use the device more quickly and efficiently.

In some embodiments, the device 100 concurrently displays the tags region in addition to the recent-items region (or a portion thereof). In some embodiments, the device 100 concurrently displays the tags region in addition to the collaborative-items region (or a portion thereof). According to some embodiments, when the collaboration interface is initially displayed, the tags region is not fully visible. For example, the tags region is accessed/viewed by scrolling down within the collaboration interface.

As one example, in FIG. 6M, the device 100 detects a first scrolling gesture (e.g., a swipe or tap-and-drag gesture) with a contact 683 in a first direction (e.g., vertical) within the collaboration interface 680. Continuing with this example, in response to detecting the first scrolling gesture, the device 100 scrolls the collaboration interface 680 in a downward direction. As a result, in FIG. 6N, the collaboration interface 680 includes a projects region 6102 and a collaborators region 6112 in addition to the collaborative-items region 692 and a portion of the recent-items region 682. As shown in FIG. 6N, the projects region 6102 includes a plurality of selectable tags 6104a, 6104b 6104c, 6104d, 6104e, and 6104f (sometimes collectively referred to herein as the "tags 6104"). For example, the tags 6104 correspond to tags that are associated with the content items that correspond to the representations 684 and 694. In another example, the tags 6104 correspond to frequently used tags, recently used tags, and/or the like.

In some embodiments, the device (914): detects, via the one or more input devices, a second input that corresponds to selection of a respective tag among the plurality of tags in the tags region (e.g., tap or click on the respective tag); and, in response to detecting the selection of the respective tag: updates the recent-items region to include a subset of the plurality of representations of the plurality of recently modified content items that is associated with the respective tag (e.g., display representations within the recent-items region for those recently modified content items that are tagged with the respective tag); and updates the collaborative-items region to include a subset of the plurality of representations of the plurality of jointly accessible content items that is associated with the respective tag (e.g., display representations within the recent-items region for recently modified content items that are tagged with the respective tag). According to some embodiments, the ability to filter the recent-items region and the collaborative items region of the collaboration interface based on tags provides a seamless and more customized user experience that requires less time and user inputs when viewing recently modified and/or accessed content items and/or jointly accessible content items, which, additionally, reduces power usage and improves battery life of the device by enabling the user to use the device more quickly and efficiently.

In some embodiments, two or more tags are selected, and the recent-items region and collaborative-items region are sorted accordingly. For example, those content items that match two tags are sorted higher than those content items that match one tag. In some embodiments, instead of filtering within the collaboration interface, the filtered results are shown within a file explorer interface that replaces the collaboration interface. In some embodiments, instead of filtering within the collaboration interface, the filtered results are shown within a projects interface that replaces the collaboration interface.

According to some embodiments, in response to detecting an input that corresponds to selecting a respective tag, and in accordance with a determination that the input satisfies a filtering criterion (e.g., a click input, tap input, or the like), the device 100 filters the plurality of representations of the plurality of recently modified content items within the recent-items region based on the respective tag and also filters the plurality of representations of the plurality of jointly accessible content items within the collaborative-items region based on the respective tag. As one example, FIGS. 6O-6P show a sequence in which the device 100 filters the content item representations displayed within the collaborative-items region 692 of the collaboration interface 680 based on the selected tag 6104f (e.g., the "Finance" tag) in response to detecting the selection of the tag 6104f that satisfies the filtering criterion.

In some embodiments, the device (916): detects, via the one or more input devices, a second input that corresponds to selection of a respective tag among the plurality of tags in the tags region (e.g., tap or click on the respective tag); and, in response to detecting the selection of the respective tag, replaces display of the collaboration interface with a projects interface that includes a first region associated with the respective tag with a plurality of representations of content items associated with the respective tag. According to some embodiments, the projects interface provides a seamless user experience that requires less time and user inputs when viewing content items based on tag/project, which, additionally, reduces power usage and improves battery life of the device by enabling the user to use the device more quickly and efficiently.

For example, the projects interface includes one row for each project/tag. In this example, the user is able to scroll within the rows to see more representations associated with a project/tag. In some embodiments, the plurality of representations of content items associated with the respective tag includes thumbnail images or icons associated with the content items. In some embodiments, the plurality of representations of content items associated with the respective tag includes text descriptions of the content items.

According to some embodiments, in response to detecting an input that corresponds to selecting a respective tag, and in accordance with a determination that the input satisfies a view replacement criterion (e.g., a hover input, double click input, double tap input, long press input, deep press input, or the like), the device 100 replaces display of the collaboration interface with the projects interface with a region associated with the selected tag that includes representations of content items associated with the selected tag in response to detecting the selection of the tag that satisfies the view replacement criterion.

As one example, in FIG. 6T, the device 100 displays the projects interface 6130 with a first project region 6142a associated with the "Brainstorming" tag 6104a, a second project region 6142b associated with the "Motorcycles" tag 6104b, and a third project region 6142c associated with the "Leather Jackets" tag 6104c. In FIG. 6T, the first project region 6142a includes content item representations 6132a, 6132b, 6132c, 6132d, 6132e, and 6132f and associated metadata 6134a, 6134b, 6134c, 6134d, 6134e, and 6134f that correspond to content items associated with the "Brainstorming" tag 6104a. For example, the metadata includes the name, size, location, modification date, creation date, creator's name, and/or the like for the associated content items.

In some embodiments, the projects interface also includes (918) a second region associated with a different tag with a plurality of representations of content items associated with the different tag. For example, the metadata includes the name, size, location, modification date, creation date, creator's name, and/or the like for the associated content items. According to some embodiments, the projects interface provides a seamless user experience with increased visibility and contextual information that requires less time and user inputs when viewing content items based on tag/project, which, additionally, reduces power usage and improves battery life of the device by enabling the user to use the device more quickly and efficiently. For example, in FIG. 6T, the second project region 6142b of the projects interface 6130 includes content item representations 672a, 672b, 672c, 672d, and 672e (sometimes collectively referred to herein as the "representations 672") and associated metadata 676a, 676b, 676c, 676d, and 676e that correspond to content items associated with the "Motorcycles" tag 6104b (e.g., similar to FIG. 6J).

In some embodiments, displaying the collaboration interface includes (920) concurrently displaying a collaborators region that includes a plurality of representations of a plurality of collaborators associated with the plurality of recently modified content items and the plurality of jointly accessible content items. According to some embodiments, the collaborators region of the collaboration interface provides a seamless user experience with increased visibility and contextual information that requires less time and user inputs when filtering content items based on collaborators, which, additionally, reduces power usage and improves battery life of the device by enabling the user to use the device more quickly and efficiently.

In some embodiments, the device 100 concurrently displays the collaborators region in addition to the recent-items region (or a portion thereof). In some embodiments, the device 100 concurrently displays the collaborators region in addition to the collaborative-items region (or a portion thereof). According to some embodiments, when the collaboration interface is initially displayed, the collaborators region is not fully visible. For example, the collaborators region is accessed/viewed by scrolling down within the collaboration interface.

In some embodiments, the plurality of representations of the plurality of collaborators includes thumbnail images or avatars associated with the collaborators. In some embodiments, the plurality of representations of the plurality of collaborators includes a name, handle, quote, blurb, or other text associated with the collaborators. In some embodiments, metadata is displayed proximate to the plurality of representations of the plurality of collaborators includes. For example, the metadata includes the collaborator name, collaborator location, collaborator team/group, collaborator projects, collaborator availability, collaborator blurb, total number of collaborator modifications, time/date of last modification by collaborator, etc.

As one example, in FIG. 6M, the device 100 detects a first scrolling gesture (e.g., a swipe or tap-and-drag gesture) with a contact 683 in a first direction (e.g., vertical) within the collaboration interface 680. Continuing with this example, in response to detecting the first scrolling gesture, the device 100 scrolls the collaboration interface 680 in a downward direction. As a result, in FIG. 6N, the collaboration interface 680 includes a projects region 6102 and a collaborators region 6112 in addition to the collaborative-items region 692 and a portion of the recent-items region 682. As shown in FIG. 6N, the collaborators region 6112 includes a selectable collaborator representations 6114a, 6114b 6114c, 6114d, 6114e, 6114f, and 6114h (sometimes collectively referred to herein as the "collaborator representations 6114").

In some embodiments, each of the collaborator representations 6114 corresponds to person with access to the content items that correspond to the representations 694 within the collaborative-items region 692. For example, a project supervisor authorizes and/or invites users to work and collaborate on a project. In this example, the authorized/invited users are given to read and/or write access to the jointly accessible content items that correspond to the representations 694 within the collaborative-items region 692. In some embodiments, each of the collaborator representations 6114 includes an image, avatar, or portrait of a corresponding collaborator. In some embodiments, metadata is displayed proximate to each of the collaborator representations 6114. For example, the metadata includes the associated collaborator's name, title, access details, phone number, email address, residential address, office location, availability, and/or the like.

In some embodiments, the device (922): detects, via the one or more input devices, a third input that corresponds to selection of a respective representation corresponding to a respective collaborator among the plurality of representations of the plurality of collaborators (e.g., tap or click on the respective collaborator); and, in response to detecting the selection of the respective representation corresponding to the respective collaborator: updates the recent-items region to include a subset of the plurality of representations of the plurality of recently modified content items that is associated with the respective collaborator (e.g., display representations for those content items that have recently been modified by the respective collaborator); and updates the collaborative-items region to include a subset of the plurality of representations of the plurality of jointly accessible content items that is associated with the respective collaborator (e.g., display representations for those content items that were shared by the respective collaborator). In some embodiments, instead of filtering within the collaboration interface, the filtered results are shown within a file explorer interface that replaces the collaboration interface. According to some embodiments, the ability to filter the recent-items region and the collaborative items region of the collaboration interface based on collaborator provides a seamless and more customized user experience that requires less time and user inputs when viewing recently modified and/or accessed content items and/or jointly accessible content items, which, additionally, reduces power usage and improves battery life of the device by enabling the user to use the device more quickly and efficiently.

According to some embodiments, in response to detecting an input that corresponds to selecting a respective representation corresponding to a respective collaborator, and in accordance with a determination that the input satisfies a filtering criterion (e.g., a click input, tap input, or the like), the device 100 filters the plurality of representations of the plurality of recently modified content items within the recent-items region based on the respective collaborator and also filters the plurality of representations of the plurality of jointly accessible content items within the collaborative-items region based on the respective collaborator. As one example, FIGS. 6P-6Q show a sequence in which the device 100 filters the content item representations displayed within the collaborative-items region 692 of the collaboration interface 680 based on the collaborator that corresponds to the selected collaborator representation 6114h in response to detecting the selection of the collaborator representation 6114h that satisfies the filtering criterion.

In some embodiments, the device (924): detects, via the one or more input devices, a third input that corresponds to selection of a respective representation corresponding to a respective collaborator among the plurality of representations of the plurality of collaborators (e.g., tap or click on the respective collaborator); and, in response to detecting the selection of the respective representation corresponding to the respective collaborator, displays, on the display, a user information interface (e.g., a contact card) that includes information associated with the respective collaborator. According to some embodiments, the user information interface provides a seamless user experience that requires less time and user inputs when viewing user information for a collaborator, which, additionally, reduces power usage and improves battery life of the device by enabling the user to use the device more quickly and efficiently.

In some embodiments, the information associated with the respective collaborator corresponds to collaborator metadata. For example, the collaborator metadata includes the collaborator name, collaborator location, collaborator team/group, collaborator projects, collaborator availability, collaborator blurb, total number of collaborator modifications, time/date of last modification by collaborator, etc.

According to some embodiments, in response to detecting an input that corresponds to selecting a respective representation corresponding to a respective collaborator, and in accordance with a determination that the input satisfies a user information preview criterion (e.g., a hover input, double click input, double tap input, long press input, deep press input, or the like), the device 100 displays a user information interface (e.g., a contact card) associated with the respective collaborator. As one example, FIGS. 6Q-6R show a sequence in which the device 100 displays user information interface 6115 for the collaborator that corresponds to the selected collaborator representation 6114c in response to detecting the selection of the collaborator representation 6114c that satisfies the user information preview criterion.

In some embodiments, displaying the collaboration interface includes (926) concurrently displaying a locations region that includes a plurality of representations of a plurality of locations associated with a plurality of content items (e.g., recently modified and jointly accessible content items, or all content items accessible to the user of the device). According to some embodiments, the locations region of the collaboration interface provides a seamless user experience with increased visibility and contextual information that requires less time and user inputs, which, additionally, reduces power usage and improves battery life of the device by enabling the user to use the device more quickly and efficiently.

For example, the plurality of locations corresponds to local storage devices, remote storage devices, attached/peripheral storage devices, folders/directories, and/or the like. In some embodiments, the device 100 concurrently displays the locations region in addition to the recent-items region (or a portion thereof). In some embodiments, the device 100 concurrently displays the locations region in addition to the collaborative-items region (or a portion thereof). In some embodiments, the device 100 concurrently displays the locations region in addition to the recent-items region (or a portion thereof) and the collaborative-items region (or a portion thereof). In some embodiments, the locations region includes a plurality of representations of a plurality of locations associated with a plurality of content items. According to some embodiments, when the collaboration interface is initially displayed, the locations region is not fully visible. For example, the locations region is accessed/viewed by scrolling down within the collaboration interface.

In some embodiments, each of the plurality of representations of the plurality of locations indicates the location via text, an icon, an image, and/or the like. In some embodiments, selection of one of the plurality of representations of the plurality of locations associated causes the collaborative-items and recent-items regions to be filtered within the collaboration interface based on the corresponding storage location. In some embodiments, selection of one of the plurality of representations of the plurality of locations causes the collaborative-items and recent-items regions to be filtered based on the corresponding storage location within a file explorer interface that replaces the collaboration interface.

As one example, in FIG. 6R, the device 100 detects a third scrolling gesture (e.g., a swipe or tap-and-drag gesture) with a contact 695 in the first direction (e.g., vertical) within the collaboration interface 680. Continuing with this example, in response to detecting the third scrolling gesture, the device 100 scrolls the collaboration interface 680 in a downward direction. As a result, in FIG. 6S, the collaboration interface 680 includes a locations region 6122 in addition to a portion of the collaborative-items region 692, the projects region 6102, and the collaborators region 6112.

In FIG. 6S, the locations region 6122 includes storage location representations 6124a, 6124b, 6124c, and 6124d (sometimes collectively referred to herein as the "location representations 6124") and associated metadata 6126a, 6126b, 6126c, and 6126d for different storage locations (e.g., cloud storage services, local storage devices, remote storage devices, and/or attached/peripheral storage devices such as USB devices). For example, the associated metadata includes an indication of access privileges, total capacity, free space, uptime, storage device name, storage device type, and/or the like.

In some embodiments, the device (928): detects, via the one or more input devices, a fourth input that corresponds to navigating within the collaboration interface (e.g., swipe or tap-and-drag gesture); and, in response to detecting the fourth input: in accordance with a determination that the fourth input corresponds to a first input type (e.g., horizontal swipe gesture), scrolls a portion of at least one of the recent-items region or the collaborative-items region substantially horizontally; and, in accordance with a determination that the fourth input corresponds to a second input type (e.g., vertical swipe gesture), scrolls a portion of the collaboration interface substantially vertically. According to some embodiments, the ability to scroll within a region of the collaboration interface or to scroll the collaboration interface itself provides a seamless user experience that requires less time and user inputs when viewing recently modified and/or accessed content items and jointly accessible content items, which, additionally, reduces power usage and improves battery life of the device by enabling the user to use the device more quickly and efficiently.

As one example, FIGS. 6M-6N show a sequence in which the device 100 scrolls the collaboration interface 680 in a downward direction in response to detecting a first scrolling gesture (e.g., a swipe or tap-and-drag gesture) with a contact 683 in a first direction (e.g., vertical) within the collaboration interface 680. As another example, FIGS. 6N-6O show a sequence in which the device 100 scrolls the collaborative-items region 692 of the collaboration interface 680 in a right-to-left direction in response to detecting a second scrolling gesture (e.g., a swipe or tap-and-drag gesture) with a contact 687 in a second direction (e.g., horizontal) within the collaborative-items region 692.

In some embodiments, the device (930): detects, via the one or more input devices, a fifth input that corresponds to selection of a respective representation from among the plurality of representations in the recent-items region or the plurality of representations in the collaborative-items region; and, in response to detecting the selection of the respective representation and in accordance with a determination that the fifth input satisfies a content preview criterion, displays, on the display a preview of a content item associated with the respective representation. In some embodiments, the preview of the content item is overlaid on the collaboration interface. According to some embodiments, the content preview interface provides a seamless user experience that requires less time and user inputs when viewing a preview for a content item, which, additionally, reduces power usage and improves battery life of the device by enabling the user to use the device more quickly and efficiently.

According to some embodiments, in response to detecting an input that corresponds to selecting a respective content item representation, and in accordance with a determination that the input satisfies a content preview criterion (e.g., a click input, tap input, or the like), the device 100 displays a content preview interface for the content item that corresponds to the selected respective content item representation. As one example, FIGS. 6L-6M show a sequence in which the device 100 displays a content preview interface 685 in response to detecting the selection of the content item representation 684j that satisfies the content preview criterion.

In some embodiments, in response to detecting the selection of the respective representation and in accordance with a determination that the fifth input satisfies an application launch criterion, the device (932): launches an application that corresponds to the content item associated with the respective representation; and replaces display of the collaboration interface with an interface associated with the application that includes the content item associated with the respective representation. According to some embodiments, the ability to launch an application through the collaboration interface provides a seamless user experience that requires less time and user inputs, which, additionally, reduces power usage and improves battery life of the device by enabling the user to use the device more quickly and efficiently.

According to some embodiments, in response to detecting an input that corresponds to selecting a respective content item representation, and in accordance with a determination that the input satisfies an application launch criterion (e.g., a hover input, double click input, double tap input, long press input, deep press input, or the like), the device 100 launches an application associated with the content item that corresponds to the selected respective content item representation and replaces display of the collaboration interface with an application interface for the application associated with the content item that corresponds to the selected respective content item representation in response to detecting the selection of the content item representation that satisfies the application launch criterion. For example, the application interface includes the content item that corresponds to the selected respective content item representation.

It should be understood that the particular order in which the operations in FIGS. 9A-9D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 800 and 1000) are also applicable in an analogous manner to method 900 described above with respect to FIGS. 9A-9D. For example, the collaboration interfaces, representations of recently modified content items, representations of jointly accessible content items, selectable tags, representations of collaborators, and representations of location described above with reference to method 900 optionally have one or more of the characteristics of the collaboration interfaces, representations of recently modified content items, representations of jointly accessible content items, selectable tags, representations of collaborators, and representations of location described herein with reference to other methods described herein (e.g., the methods 800 and 1000). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 9A-9D, optionally, implemented by components depicted in FIGS. 1A-1B. For example, the selection inputs, scrolling inputs, and filtering inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10C illustrate a flow diagram of a method 1000 of previewing content items and tags associated with an application in accordance with some embodiments. The method 1000 is performed at an electronic device (e.g., the portable multifunction device 100 in FIG. 1A, or the device 300 in FIG. 3) with a display, a touch-sensitive surface, and one or more sensors to detect intensity of contacts with the touch-sensitive surface. In some embodiments, the display is a touch-screen display and the one or more input devices is on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 1000 are, optionally, combined and/or the order of some operations is, optionally, changed.

As described below, the method 1000 provides an intuitive way to preview content items and tags associated with an application. The method reduces the cognitive burden on a user when previewing content items and tags associated with an application, thereby creating a more efficient human-machine interface. For battery-operated electronic devices, enabling a user to preview content items and tags associated with an application faster and more efficiently conserves power and increases the time between battery charges.

The device displays (1002), on the display, a user interface that includes one or more application icons. In some embodiments, the device displays the one or more application icons on the home screen (e.g., a smart phone or tablet home screen with a plurality of application launch icons and/or widgets or a computer desktop). In some embodiments, the device displays the one or more application icons within a dock on the home screen. In some embodiments, the device displays the one or more application icons within a quick access dock overlaid on an application interface or application window. As one example, in FIG. 7A, the device 100 displays the application icons 702 within the home screen interface 700 outside of the dock region 704. As another example, in FIG. 7A, the device 100 displays the application icons 706 within the dock region 704. As yet another example, in FIG. 7K, the device 100 displays the application icons 706 within the quick access dock region 745.

While displaying the user interface, the device detects (1004), via the one or more input devices, a first input that corresponds to selection of a respective application icon among the one or more application icons.

In response to detecting the selection of the respective application icon, and in accordance with a determination that the first input satisfies a content preview criterion (e.g., a hover input, double click input, double tap input, long press input, deep press input, or the like), the device (1006) displays, on the display, a preview interface (e.g., a pop-over panel, pane, window, or the like) without launching the application, where the preview interface includes: a plurality of representations of a plurality of content items (e.g., presentation/slide-deck, note, email, image, message, word processing document, spreadsheet, audio file, video, electronic document, and/or the like) corresponding to the application associated with the respective application icon; and a plurality of representations of a plurality of tags corresponding to the application associated with the respective application icon. According to some embodiments, the representations of content items and/or tags within the preview interface provide a seamless user experience with additional contextual information that requires less time and user inputs when performing tasks and launching applications, which, additionally, reduces power usage and improves battery life of the device by enabling the user to use the device more quickly and efficiently.

In some embodiments, the plurality of representations of the plurality of content items includes thumbnail images or icons associated with the content items. In some embodiments, the plurality of representations of the plurality of content items includes text descriptions of the content items. In some embodiments, the plurality of representations of the plurality of content items includes metadata associated with the content items. For example, the metadata includes the name, size, location, modification date, creation date, creator's name, and/or the like of the content items.

In some embodiments, the plurality of representations of the plurality of tags corresponds to the tags associated with the content items that correspond to the plurality of representations of the plurality of content items. In some embodiments, the plurality of representations of the plurality of tags corresponds to the recently and/or frequently used tags.

According to some embodiments, in response to detecting an input that corresponds to selecting a respective application icon, and in accordance with a determination that the input satisfies a content preview criterion (e.g., a hover input, double click input, double tap input, long press input, deep press input, or the like), the device 100 displays a preview interface associated with the respective selected application icon. As one example, FIGS. 7A-7B show a sequence in which the device 100 displays the preview interface 710 for the file browser application that corresponds to the application icon 706a in response to detecting the selection of the application icon 706a that satisfies the content preview criterion.

As shown in FIG. 7B, the preview interface 710 for the file browser application includes a plurality of content item representations 714a, 714b, 714c, 714d, 714e, and 714f (sometimes collectively referred to herein as the "representations 714") for content items (e.g., presentations/slide-decks, notes, emails, images, messages, word processing documents, spreadsheets, audio files, videos, electronic documents, and/or the like). In another example, the representations 714 correspond to frequently viewed and/or modified content items, recently viewed and/or modified content items, and/or the like. As shown in FIG. 7B, the preview interface 710 for the file browser application also includes a plurality of tag representations 708a, 708b, and 708c (sometimes collectively referred to herein as the "representations 708") for tags. For example, the representations 708 correspond to tags that are associated with the content items that correspond to the representations 714. In another example, the representations 708 correspond to frequently used tags, recently used tags, and/or the like.

In response to detecting the selection of the respective application icon, and in accordance with a determination that the first input satisfies an application launch criterion (e.g., a click input, tap input, or the like), the device launches (1010) an application associated with the respective application icon. According to some embodiments, in response to detecting an input that corresponds to selecting a respective application icon, and in accordance with a determination that the input satisfies an application launch criterion (e.g., a click input, tap input, or the like), the device 100 launches the application associated with the respective selected application icon and displays an application interface for the application associated with the respective selected application icon. As one example, FIGS. 7I-7J show a sequence in which the device 100 launches a presentation creation application and displays a presentation creation interface 730 associated with the presentation creation application in response to detecting the selection of the application icon 706e that satisfies the application launch criterion.

In some embodiments, the application launch criterion is satisfied (1008) when the first input corresponds to one of: a tap input, or a click input, and the content preview criterion is satisfied when the first input corresponds to one of: a long press input that has a duration that is greater than a press duration threshold, a hover input that has a duration that is greater than a hover duration threshold, a deep press input that has an intensity that is greater than an intensity threshold, a double tap input, or a double click input.

In some embodiments, the plurality of content items is selected (1012) based on at least one of: frequency of use, recency of use, or contextual information associated with the respective application icon. According to some embodiments, the representations of content items within the preview interface provides a seamless user experience with additional contextual information that requires less time and user inputs when performing tasks and launching applications, which, additionally, reduces power usage and improves battery life of the device by enabling the user to use the device more quickly and efficiently.

In some embodiments, the device selects the plurality of content items based on frequently viewed/modified content items associated with the application that corresponds to the selected application icon. In some embodiments, the device selects the plurality of content items based on recently viewed/modified content items associated with the application that corresponds to the selected application icon. In some embodiments, the device sorts the plurality of content items based on content item size, content item name, creator name, last modifier name, frequency of write modifications, frequency of read actions, recency of write modification, recency of read action, and/or the like.

In some embodiments, the plurality of content items is stored across two or more local storage devices, two or more remote storage devices, two or more attached/peripheral storage devices, two or more storage services, and/or the like. In some embodiments, the plurality of content items is stored across two or more storage services (e.g., cloud storage services). In some embodiments, the device displays metadata proximate to each of the plurality of representations of a plurality of content items. For example, the metadata corresponds to the content item name, the content item location, the content item extension, the creation time/date of the content item, the last modification time/date of the content item, the user who created the content item, the user who last modified the content item, the content item size, and/or the like.

In some embodiments, the plurality of tags is selected (1014) based on at least one of: frequency of use, recency of use, or contextual information associated with the respective application icon. According to some embodiments, the representations of tags within the preview interface provides a seamless user experience with additional contextual information that requires less time and user inputs when performing tasks and launching applications, which, additionally, reduces power usage and improves battery life of the device by enabling the user to use the device more quickly and efficiently.

In some embodiments, the device selects the plurality of tags to include tags associated with frequently viewed/modified content items. In some embodiments, the device selects the plurality of tags to include tags associated with recently viewed/modified content items associated with the application that corresponds to the selected application icon. In some embodiments, the device selects the plurality of tags to include frequently used tags across a plurality of applications or a plurality of storage services (e.g., different cloud storage services). In some embodiments, the device selects the plurality of tags to include recently used tags across all applications or storage services (e.g., cloud storage services). In some embodiments, the plurality of tags is sorted based on global usage across all applications or storage services (e.g., cloud storage services). In some embodiments, the plurality of tags is sorted based on global usage across the application or storage service corresponding to the selected application icon. In some embodiments, the plurality of tags is sorted based on local usage of the application or storage service corresponding to the selected application icon.

In some embodiments, the plurality of tags is associated with content items that are stored across two or more local storage devices, two or more remote storage devices, two or more attached/peripheral storage devices, two or more storage services, and/or the like. In some embodiments, the plurality of tags is associated with content items that are stored across two or more storage services (e.g., cloud storage services). In some embodiments, the plurality of tags is associated with content items that correspond to two or more applications.

In some embodiments, the device (1016): detects, via the one or more input devices, a second input that corresponds to selection of a first representation of a first tag among the plurality of representations of the plurality of tags in the preview interface; and, in response to detecting the selection of the first representation associated with the first tag, updates the plurality of representations of the plurality of content items to include content items that are associated with the first tag. According to some embodiments, the ability to filter the representations of content items within the preview interface based on a tag provides a seamless user experience with additional contextual information that requires less time and user inputs when performing tasks and launching applications, which, additionally, reduces power usage and improves battery life of the device by enabling the user to use the device more quickly and efficiently.

For example, the filtered content items are sorted based on at least one of: content item size, content item name, creator name, last modifier name, frequency of write modifications, frequency of read actions, recency of write modification, recency of read action, and/or the like. In some embodiments, in response to detecting the selection of the first representation associated with the first tag, the device also displays an indication that the first tag has been selected such as a badge with a check mark, darkened border, thickened border, changed color, changed appearance state, blinking appearance, and/or the like.

As one example, FIGS. 7N-7O show a sequence in which the device 100 filters the content item representations displayed within the preview interface 710 in response to a first filtering operation that selected the tag representation 708*b* associated with the "Learning" tag. As shown in FIG. 7O, the representations 714 displayed within the preview interface 710 are filtered to include the content item representations 714*a*, 714*b*, 714*c*, and 714*d* for the content items that are associated with the "Learning" tag.

In some embodiments, the device (1018): detects, via the one or more input devices, a third input that corresponds to selection of a second representation of a second tag among the plurality of representations of the plurality of tags in the preview interface; and, in response to detecting the selection of the second representation of the second tag, updates the plurality of representations of the plurality of content items to include content items that are associated with at least one of: the first tag, or the second tag. According to some embodiments, the ability to filter the representations of content items within the preview interface based on two or more tags provides a seamless user experience with additional contextual information that requires less time and user inputs when performing tasks and viewing content items, which, additionally, reduces power usage and improves battery life of the device by enabling the user to use the device more quickly and efficiently.

In some embodiments, content items that match both the first tag AND the second tag are sorted ahead of content items that match the first tag XOR the second tag (e.g., content items that match the first tag or match the second tag, but do not match both the first tag and the second tag). In some embodiments, in response to detecting the selection of the second representation associated of the second tag, the device also displays an indication that the second tag has been selected such as a badge with a check mark, darkened border, thickened border, changed color, changed appearance state, blinking appearance, and/or the like.

As one example, FIGS. 7O-7P show a sequence in which the device 100 further filters the content item representations displayed within the preview interface 710 in response to a second filtering operation that selected the tag representation 708*c* associated with the "Study" tag. As shown in FIG. 7P, the representations 714 displayed within the preview interface 710 are further filtered to include the content item representations 714*a* and 714*b* for the content items that are associated with the "Learning" tag and the "Study" tag.

According to some embodiments, with reference to examples above in steps 1016 and 1018, the preview interface 710 is updated to show content item representations for content items that match both the "Learning" tag and the "Study" tag. According to some embodiments, with reference to examples above in steps 1016 and 1018, the preview interface 710 is updated to show content item representations for content items that match the "Learning" tag or the "Study" tag. According to some embodiments, with reference to examples above in steps 1016 and 1018, the preview interface 710 is updated to show content item representations for content items that match the "Learning" tag and/or the "Study" tag.

In some embodiments, the device (1020): detects, via the one or more input devices, a scrolling input within the preview interface; and, in response to detecting the scrolling input: in accordance with a determination that the scrolling input is detected within a first region of the preview interface that corresponds to the plurality of representations of the plurality of content items and the scrolling input satisfies a first direction criterion (e.g., a substantially vertical swipe or tap-and-drag gesture), updates the plurality of representations of the plurality of content items to show different representations of the plurality of content items within the preview interface; and, in accordance with a determination that the scrolling input is detected within a second region of the preview interface that corresponds to the plurality of representations of the plurality of tags and the scrolling input satisfies a second direction criterion (e.g., a substantially horizontal swipe or tap-and-drag gesture), updates the plurality of representations of the plurality of tags to show different tags of the plurality of tags within the preview interface. According to some embodiments, the ability to scroll a first region of the preview interface that includes the tag representations and also to scroll a second region of the preview interface that includes the content item representations provides a seamless user experience with additional contextual information that requires less time and user inputs when performing tasks and viewing content items, which, additionally, reduces power usage and improves battery life of the device by enabling the user to use the device more quickly and efficiently.

According to some embodiments, in response to detecting a scrolling input within the preview interface, and in accordance with a determination that the scrolling input satisfies a first criterion (e.g., a substantially vertical swipe or tap-and-drag gesture within the second region associated with the plurality of representations of the plurality of content items), the device scrolls the second region associated with the plurality of representations of the plurality of content items. As one example, FIGS. 7G-7H show a sequence in which the device 100 scrolls the second region 758b that includes the plurality of representations of the plurality of content items in a downward direction in response to detecting the first scrolling gesture (e.g., a swipe or tap-and-drag gesture) with a contact 731 in a first direction (e.g., vertical) within the second region 758b of the preview interface 750 that includes the representations 756.

According to some embodiments, in response to detecting a scrolling input within the preview interface, and in accordance with a determination that the scrolling input satisfies a second criterion (e.g., a substantially horizontal swipe or tap-and-drag gesture within the first region associated with the plurality of representations of the plurality of tags), the device scrolls the first region associated with the plurality of representations of the plurality of tags. As one example, FIGS. 7H-7I show a sequence in which the device 100 scrolls the first region 758a that includes the plurality of representations of the plurality of tags in a right-to-left direction in response to detecting the second scrolling gesture (e.g., a swipe or tap-and-drag gesture) with a contact 733 in a second direction (e.g., horizontal) within the first region 758a of the preview interface 750 that includes the representations 754.

In some embodiments, the user interface corresponds to (1022) a home screen (e.g., a smart phone or tablet home screen with a plurality of application launch icons and/or widgets or a computer desktop) that includes a dock region, and the one or more application icons are displayed within the dock region. According to some embodiments, the ability to invoke the preview interface when interacting with an application icon in the dock region provides a seamless user experience with additional contextual information that requires less time and user inputs when performing tasks and launching applications, which, additionally, reduces power usage and improves battery life of the device by enabling the user to use the device more quickly and efficiently. As one example, FIGS. 7A-7B show a sequence in which the device 100 displays the preview interface 710 for the file browser application that corresponds to the application icon 706a in response to detecting the selection of the application icon 706a within the dock region 704 that satisfies the content preview criterion.

In some embodiments, the user interface corresponds to (1024) a home screen (e.g., a smart phone or tablet home screen with a plurality of application launch icons and/or widgets or a computer desktop) that includes the one or more application icons. According to some embodiments, the ability to invoke the preview interface when interacting with an application icon on the home screen and outside of the dock region provides a seamless user experience with additional contextual information that requires less time and user inputs when performing tasks and launching applications, which, additionally, reduces power usage and improves battery life of the device by enabling the user to use the device more quickly and efficiently. As one example, FIGS. 7F-7G show a sequence in which the device 100 displays the preview interface 750 for the application (e.g., the application ABC) that corresponds to the application icon 702f in response to detecting the selection of the application icon 702f within the home screens interface outside of the dock region 704 that satisfies the content preview criterion.

In some embodiments, the device (1026): detects, via the one or more input devices, a drag-and-drop input that corresponds to dragging a respective representation associated with a respective content item among the plurality of representations of the plurality of content items out of the preview interface and dropping the respective representation over a second application icon; and, in response to detecting completion of the drag-and-drop input (e.g., dropping the respective representation onto the second application icon): ceases to display the preview interface; launches a second application associated with the second application icon; and displays, on the display, the respective content item (e.g., an image or the like) within a second user interface that corresponds to the second application (e.g., creating a new email with an image or document). According to some embodiments, the ability to drag a content item representation out of the preview interface and drop the content item representation over an application icon to launch an associated application provides a seamless user experience with additional contextual information that requires less time and user inputs when performing tasks and launching applications, which, additionally, reduces power usage and improves battery life of the device by enabling the user to use the device more quickly and efficiently.

As one example, FIGS. 7B-7D show a sequence in which the device 100 launches a presentation creation application and displays the presentation creation interface 730 associated with the presentation creation application in response to detecting a drag-and-drop input/gesture where the content item representation 714f is dragged out of the preview interface 710 and dropped over the application icon 702h associated with the presentation creation application. As shown in FIG. 7D, the content entry region 736 of the presentation creation interface 730 includes a content item 715 (e.g., an image) that corresponds to the content item representation 714f that was dragged-and-dropped over the application icon 702h in FIGS. 7B-7C.

In some embodiments, the user interface corresponds to (1028) an application (e.g., an email, word processing, PDF creation, spreadsheet, presentation creation, etc. application), and the one or more application icons are displayed within a quick-access dock region overlaid on the user interface that corresponds to the application. According to some embodiments, the ability to invoke the preview interface when interacting with an application icon in the quick access dock region provides a seamless user experience with additional contextual information that requires less time and user inputs when performing tasks and launching applications, which, additionally, reduces power usage and improves battery life of the device by enabling the user to use the device more quickly and efficiently.

For example, the user interface corresponds to an application interface or an application window in full-screen mode. In another example, the user interface corresponds to an application interface or an application window in a tiled-mode. In yet another example, the user interface corresponds to an application interface or an application window in a split-screen-mode. In some embodiments, the device displays the quick-access dock over the user interface in response to a detecting a predefined command (e.g., a predefined key combination such as ALT+TAB, a predefined gesture, a predefine key, selection of a predefined affordance, and/or the like). In some embodiments, the application icons displayed within the quick-access dock are user-customizable.

As one example, FIGS. 7J-7K show a sequence in which the device 100 displays the quick-access dock region 745 over the presentation creation interface 730 in response to detecting a predefined gesture (e.g., a swipe or tap-and-drag gesture) with a contact 741 from a bottom edge of the display area in an upward direction. For example, the quick-access dock region 745 slides up from the bottom edge of the display area in response to detecting the predefined gesture.

In some embodiments, the device (1032): detects, via the one or more input devices, a drag-and-drop input that corresponds to dragging a respective representation associated with a respective content item among the plurality of representations of the plurality of content items out of the preview interface and dropping the respective representation into the user interface that corresponds to the application; and, in response to detecting completion of the drag-and-drop input (e.g., dropping the respective representation into the user interface that corresponds to the application), displays, on the display, the respective content item (e.g., an image or the like) within the user interface that corresponds to the application. According to some embodiments, the ability to drag a content item representation out of the preview interface and drop the content item representation over an application interface to export the associated content item into the application interface provides a seamless user experience with additional contextual information that requires less time and user inputs when performing tasks, which, additionally, reduces power usage and improves battery life of the device by enabling the user to use the device more quickly and efficiently.

In some embodiments, in response to detecting completion of the drag-and-drop input/gesture, the device ceases to display the respective representation in the preview interface. In some embodiments, in response to detecting completion of the drag-and-drop gesture input/gesture, the device maintains display of the respective representation in the preview interface.

As one example, FIGS. 7M-7N show a sequence in which the device 100 displays the content item 775 (e.g., an image) that corresponds to the content item representation 714*a* within the content entry region 736 of the presentation creation interface 730 in response to detecting a drag-and-drop input/gesture where the content item representation 714*a* is dragged out of the preview interface 710 and dropped over the content entry region 736 of the presentation creation interface 730. As shown in FIG. 7N, the content entry region 736 of the presentation creation interface 730 includes a content item 775 (e.g., an image) that corresponds to the content item representation 714*a* that was dragged-and-dropped over the content entry region 736 of the presentation creation interface 730 in FIG. 7M.

It should be understood that the particular order in which the operations in FIGS. 10A-10C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 800 and 900) are also applicable in an analogous manner to method 1000 described above with respect to FIGS. 10A-10C. For example, the application icons, preview interfaces, representations of content items, and representations of tags described above with reference to method 1000 optionally have one or more of the characteristics of the application icons, preview interfaces, representations of content items, and representations of tags described herein with reference to other methods described herein (e.g., the methods 800 and 900). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 10A-10C, optionally, implemented by components depicted in FIGS. 1A-1B. For example, the application icon selection inputs for displaying an associated preview interface, the application icon selection inputs for launching an associated application, the filtering inputs, and the scrolling inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with one or more processors, non-transitory memory, a display, and one or more input devices:
   while displaying a content item that is currently associated with one or more selectable tags, detecting, via the one or more input devices, a first input that corresponds to selection of a transport affordance;
   in response to detecting the selection of the transport affordance, displaying, on the display, a transport interface provided to perform one or more operations on the content item, including:
- a tag modification affordance provided to modify the one or more selectable tags that are currently associated with the content item; and
- one or more transport option affordances associated with different selectable options for performing the one or more operations on the content item;

while displaying the transport interface, detecting, via the one or more input devices, a second input that corresponds to selection of the tag modification affordance that is within the transport interface;

in response to detecting the selection of the tag modification affordance that is within the transport interface, replacing display of the transport interface with a tag modification interface that is provided to modify the one or more selectable tags that are currently associated with the content item, the tag modification interface including one or more selectable suggested tags that are selected based on a recency of use and a tag creation field;

while displaying the tag modification interface, detecting, via the one or more input devices, a third input that corresponds to a selection of the tag creation field;

in response to detecting the selection of the tag creation field that is within the tag modification interface, replacing display of the tag modification interface with a tag creation interface that is provided to create a new tag that is to be associated with the content item, the tag creation interface including an input field provided to create a name for the new tag and a plurality of selectable tag appearance affordances provided to select an appearance for the new tag;

generating the new tag in response to detecting a sequence of characters being entered in the input field and a selection of one of the plurality of selectable tag appearance affordances; and in response to the new tag being generated, automatically associating the new tag with the content item and displaying the new tag among the one or more selectable tags that are currently associated with the content item.

2. The method of claim 1, further comprising, while displaying the tag modification interface:
- detecting, via the one or more input devices, a fourth input that corresponds to selection of a respective tag among the one or more selectable tags currently associated with the content item; and
- in response to detecting the selection of the respective tag, removing the association between the respective tag and the content item.

3. The method of claim 2, further comprising:
- in response to detecting the selection of the respective tag, displaying, on the display, an option menu that includes a first affordance provided to remove the association between the respective tag and the content item when selected and a second affordance provided to display representations of one or more content items associated with the respective tag when selected, wherein the one or more content items include the content item.

4. The method of claim 1, further comprising:
- detecting, via the one or more input devices, a fourth input that corresponds to selection of a respective selectable suggested tag among the one or more selectable suggested tags; and
- in response to detecting the selection of the respective selectable suggested tag, associating the respective selectable suggested tag with the content item and displaying, on the display, the respective selectable suggested tag among the one or more selectable tags currently associated with the content item.

5. The method of claim 1, wherein the one or more selectable suggested tags are selected further based on at least one of: frequency of use, or contextual information associated with the content item.

6. The method of claim 1, wherein the transport interface includes an indication of the one or more selectable tags that are currently associated with the content item.

7. The method of claim 6, wherein displaying the transport interface that includes the indication of the one or more selectable tags that are currently associated with the content item includes:
- in accordance with a determination that a dimension of the indication of the one or more selectable tags that are currently associated with the content item satisfies a predefined dimensional constraint of the transport interface, displaying the indication of the one or more selectable tags that are currently associated with the content item includes displaying expanded representations of the one or more selectable tags that are currently associated with the content item, and
- in accordance with a determination that the dimension of the indication of the one or more selectable tags that are currently associated with the content item does not satisfy the predefined dimensional constraint of the transport interface, displaying the indication of the one or more selectable tags that are currently associated with the content item includes displaying collapsed representations of the one or more selectable tags that are currently associated with the content items.

8. The method of claim 6, further comprising:
- detecting, via the one or more input devices, a fourth input that corresponds to selection of a respective tag among the one or more selectable tags that are currently associated with the content item; and
- in response to detecting the selection of the respective tag, displaying, on the display, an option menu that includes a first affordance provided to dissociate the respective tag with the content item when selected and a second affordance provided to display representations of one or more content items associated with the respective tag, wherein the one or more content items include the content item.

9. The method of claim 1, wherein the transport interface includes an indication of one or more nearby users with which the content item can be shared.

10. The method of claim 1, further comprising:
- detecting, via the one or more input devices, a fourth input that corresponds to selection of a respective transport option affordance among the one or more transport option affordances; and
- in response to detecting the selection of the respective transport option affordance:
  - in accordance with a determination that the respective transport option affordance corresponds to sharing the content item via a first application, causing the content item to be shared via the first application; and
  - in accordance with a determination that the respective transport option affordance corresponds to sharing the content item via a second application different from the first application, causing the content item to be shared via the second application.

11. An electronic device comprising:
a display;
one or more input devices;
one or more processors;
non-transitory memory; and
one or more programs, wherein the one or more programs are stored in the non-transitory memory and configured to be executed by the one or more processors, the one or more programs including instructions for:
while displaying a content item that is currently associated with one or more selectable tags, detecting, via the one or more input devices, a first input that corresponds to selection of a transport affordance;
in response to detecting the selection of the transport affordance, displaying, on the display, a transport interface provided to perform one or more operations on the content item, including:
a tag modification affordance provided to modify the one or more selectable tags that are currently associated with the content item; and
one or more transport option affordances associated with different selectable options for performing the one or more operations on the content item;
while displaying the transport interface, detecting, via the one or more input devices, a second input that corresponds to selection of the tag modification affordance that is within the transport interface;
in response to detecting the selection of the tag modification affordance that is within the transport interface, replacing display of the transport interface with a tag modification interface that is provided to modify the one or more selectable tags that are currently associated with the content item, the tag modification interface including one or more selectable suggested tags that are selected based on a recency of use and a tag creation field;
while displaying the tag modification interface, detecting, via the one or more input devices, a third input that corresponds to a selection of the tag creation field;
in response to detecting the selection of the tag creation field that is within the tag modification interface, replacing display of the tag modification interface with a tag creation interface that is provided to create a new tag that is to be associated with the content item, the tag creation interface including an input field provided to create a name for the new tag and a plurality of selectable tag appearance affordances provided to select an appearance for the new tag;
generating the new tag in response to detecting a sequence of characters being entered in the input field and a selection of one of the plurality of selectable tag appearance affordances; and
in response to the new tag being generated, automatically associating the new tag with the content item and displaying the new tag among the one or more selectable tags that are currently associated with the content item.

12. The electronic device of claim 11, wherein the one or more programs include instructions for, while displaying the tag modification interface:
detecting, via the one or more input devices, a fourth input that corresponds to selection of a respective tag among the one or more selectable tags currently associated with the content item; and
in response to detecting the selection of the respective tag, removing the association between the respective tag and the content item.

13. The electronic device of claim 12, wherein the one or more programs include instructions for:
in response to detecting the selection of the respective tag, displaying, on the display, an option menu that includes a first affordance provided to remove the association between the respective tag and the content item when selected and a second affordance provided to display representations of one or more content items associated with the respective tag when selected, wherein the one or more content items include the content item.

14. The electronic device of claim 11, wherein the one or more programs include instructions for:
detecting, via the one or more input devices, a fourth input that corresponds to selection of a respective selectable suggested tag among the one or more selectable suggested tags; and
in response to detecting the selection of the respective selectable suggested tag, associating the respective selectable suggested tag with the content item and displaying, on the display, the respective selectable suggested tag among the one or more selectable tags currently associated with the content item.

15. The electronic device of claim 11, wherein the one or more selectable suggested tags are selected further based on at least one of: frequency of use, or contextual information associated with the content item.

16. A non-transitory computer readable storage medium storing one or more programs, the one or more programs comprising instructions, which, when executed by an electronic device with a display, and one or more input devices, cause the electronic device to:
while displaying a content item that is currently associated with one or more selectable tags, detect, via the one or more input devices, a first input that corresponds to selection of a transport affordance;
in response to detecting the selection of the transport affordance, display, on the display, a transport interface provided to perform one or more operations on the content item, including:
a tag modification affordance provided to modify the one or more selectable tags that are currently associated with the content item; and
one or more transport option affordances associated with different selectable options for performing the one or more operations on the content item;
while displaying the transport interface, detect, via the one or more input devices, a second input that corresponds to selection of the tag modification affordance that is within the transport interface;
in response to detecting the selection of the tag modification affordance that is within the transport interface, replace display of the transport interface with a tag modification interface that is provided to modify the one or more selectable tags that are currently associated with the content item, the tag modification interface including one or more selectable suggested tags that are selected based on a recency of use and a tag creation field;
while displaying the tag modification interface, detect, via the one or more input devices a third input that corresponds to a selection of the tag creation field;
in response to detecting the selection of the tag creation field that is within the tag modification interface, replace display of the tag modification interface with a tag creation interface that is provided to create a new tag that is to be associated with the content item, the tag creation interface including an input field provided to create a name for the new tag and a plurality of selectable tag appearance affordances provided to select an appearance for the new tag;

generate the new tag in response to detecting a sequence of characters being entered in the input field and a selection of one of the plurality of selectable tag appearance affordances; and in response to the new tag being generated, automatically associate the new tag with the content item and display the new tag among the one or more selectable tags that are currently associated with the content item.

17. The non-transitory computer readable storage medium of claim 16, wherein the tag modification interface includes at least one of: one or more selectable tags currently associated with the content item; and one or more selectable suggested tags.

18. The non-transitory computer readable storage medium of claim 17, wherein the one or more programs further cause the electronic device to:

detect, via the one or more input devices, a third input that corresponds to selection of a respective tag among the one or more selectable tags currently associated with the content item; and in response to detecting the selection of the respective tag, remove the association between the respective tag and the content item.

19. The non-transitory computer readable storage medium of claim 18, wherein the one or more programs further cause the electronic device to:

in response to detecting the selection of the respective tag, display, on the display, an option menu that includes a first affordance provided to remove the association between the respective tag and the content item when selected and a second affordance provided to display representations of one or more content items associated with the respective tag when selected, wherein the one or more content items include the content item.

20. The non-transitory computer readable storage medium of claim 17, wherein the one or more programs further cause the electronic device to:

detect, via the one or more input devices, a third input that corresponds to selection of a respective selectable suggested tag among the one or more selectable suggested tags; and in response to detecting the selection of the respective selectable suggested tag, associate the respective selectable suggested tag with the content item and display, on the display, the respective selectable suggested tag among the one or more selectable tags currently associated with the content item.

* * * * *